US012799825B2

(12) United States Patent
Recker et al.

(10) Patent No.: US 12,799,825 B2
(45) Date of Patent: Nov. 17, 2026

(54) CONTROL SYSTEM FOR HORIZONTAL DIRECTIONAL DRILL

(71) Applicant: Vermeer Manufacturing Company, Pella, IA (US)

(72) Inventors: Clint Recker, Pella, IA (US); Ben Downing, Overland Park, KS (US); Kent Thoreson, Pella, IA (US); Cole Eilander, Ankeny, IA (US); Kevin Burgoni, Ankeny, IA (US); Scott Rempe, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 19/477,954

(22) PCT Filed: Apr. 25, 2024

(86) PCT No.: PCT/US2024/026286
§ 371 (c)(1),
(2) Date: Oct. 23, 2025

(87) PCT Pub. No.: WO2024/226809
PCT Pub. Date: Oct. 31, 2024

(65) Prior Publication Data

US 2026/0117593 A1 Apr. 30, 2026

Related U.S. Application Data

(60) Provisional application No. 63/498,084, filed on Apr. 25, 2023.

(51) Int. Cl.
*E21B 7/04* (2006.01)
*E21B 7/28* (2006.01)
(Continued)

(52) U.S. Cl.
CPC ................ *E21B 7/046* (2013.01); *E21B 7/28* (2013.01); *E21B 21/08* (2013.01); *E21B 47/02* (2013.01);
(Continued)

(58) Field of Classification Search
CPC ... E21B 7/046; E21B 7/28; E21B 7/04; E21B 7/026; E21B 21/08; E21B 21/22;
(Continued)

(56) References Cited

U.S. PATENT DOCUMENTS 5,469,155 A * 11/1995 Archambeault .... E21B 47/0232 340/856.1
6,079,506 A 6/2000 Mercer
(Continued)

FOREIGN PATENT DOCUMENTS

WO 2022140593 A1 6/2022

OTHER PUBLICATIONS

International Search Report and Written Opinion for Application No. PCT/US2024/026286 dated Aug. 19, 2024 (10 pages).

*Primary Examiner* — George S Gray
(74) *Attorney, Agent, or Firm* — Michael Best & Friedrich LLP

(57) ABSTRACT

A control system for a horizontal directional drill includes a user interface, a locator tool, and a controller. The user interface has a first display and a second display. The locator tool measures the rotational position of a drill head of the horizontal directional drill. The controller determines an estimated rotational position of the drill head. The first display is in communication with the locator tool and displays information about the measured rotational position of the drill head. The second display is in communication with the controller and displays information about the estimated rotational position of the drill head. The control
(Continued)

system includes means for calibrating the estimated rotational position of the drill head to substantially match the measured rotational position of the drill head.

25 Claims, 56 Drawing Sheets

(51) Int. Cl.

| | |
|---|---|
| ***E21B 21/08*** | (2006.01) |
| ***E21B 47/02*** | (2006.01) |
| ***E21B 47/135*** | (2012.01) |
| ***G01B 21/22*** | (2006.01) |
| ***G08C 17/02*** | (2006.01) |

(52) U.S. Cl.
CPC ............ *E21B 47/135* (2020.05); *G01B 21/22* (2013.01); *G08C 17/02* (2013.01)

(58) Field of Classification Search
CPC .... E21B 47/02; E21B 47/135; E21B 47/0228; E21B 47/0232; G01B 21/22; G08C 17/02
See application file for complete search history.

(56) References Cited

U.S. PATENT DOCUMENTS

| | | | | |
|---|---|---|---|---|
| 6,408,952 | B1 | 6/2002 | Brand et al. | |
| 6,766,869 | B2 | 7/2004 | Brand et al. | |
| 8,528,663 | B2 | 9/2013 | Boone | |
| 9,122,276 | B2 | 9/2015 | Kraimer et al. | |
| 10,724,347 | B2 | 7/2020 | Greenlee et al. | |
| 11,118,430 | B2 | 9/2021 | Greenlee et al. | |
| 11,182,575 | B2 | 11/2021 | Sakamoto et al. | |
| 11,429,095 | B2 | 8/2022 | Woodruff, III et al. | |
| 2001/0052426 | A1* | 12/2001 | Mercer | E21B 47/13 175/45 |
| 2002/0005297 | A1* | 1/2002 | Alft | E21B 7/046 175/45 |
| 2003/0063013 | A1* | 4/2003 | Jin | E21B 7/046 340/853.3 |
| 2004/0028476 | A1* | 2/2004 | Payne | E21B 44/00 405/184 |
| 2006/0125806 | A1 | 6/2006 | Voyles et al. | |
| 2007/0240903 | A1 | 10/2007 | Alft et al. | |
| 2009/0038850 | A1 | 2/2009 | Brune et al. | |
| 2011/0010024 | A1 | 1/2011 | Salisbury | |
| 2012/0024606 | A1 | 2/2012 | Pirovolou et al. | |
| 2016/0076360 | A1* | 3/2016 | Hall | E21B 7/046 340/854.6 |
| 2018/0050661 | A1* | 2/2018 | Shim | B60R 25/252 |
| 2018/0171718 | A1* | 6/2018 | Greenlee | F16D 63/006 |
| 2020/0291770 | A1 | 9/2020 | Jostes | |
| 2020/0300080 | A1 | 9/2020 | Schmidt | |
| 2021/0026319 | A1 | 1/2021 | Liu et al. | |
| 2021/0285293 | A1* | 9/2021 | Slaughter, Jr. | E21B 7/046 |
| 2021/0404293 | A1 | 12/2021 | Greenlee et al. | |
| 2022/0316325 | A1* | 10/2022 | Jin | E21B 47/13 |
| 2023/0048274 | A1 | 2/2023 | Pfaff et al. | |
| 2023/0332487 | A1 | 10/2023 | Greenlee et al. | |

* cited by examiner

CONTROL SYSTEM FOR HORIZONTAL DIRECTIONAL DRILL

CROSS-REFERENCE TO RELATED APPLICATION

This application claims priority to U.S. Provisional Ser. No. 63/498,084 filed Apr. 25, 2023, the entire contents of which are incorporated herein by reference.

FIELD

The present invention relates to a horizontal directional drilling system, and more specifically, to a control system for a horizontal directional drilling system.

BACKGROUND

Horizontal directional drilling (HDD) systems include a series of drill rods joined end to end to form a drill string that is propelled though the ground by means of powerful hydraulic systems on a HDD machine, having the capacity to rotate while simultaneously pushing or pulling the drill string.

One type of directional drilling machine includes an elongate track (e.g., a rack) that can be aligned at an inclined orientation relative to the ground. A rotational driver (e.g., a gear box) is mounted on the track (e.g., by a carriage) so as to be movable along a drive axis that extends parallel to the length of the track. In certain examples, a rack and pinion drive is used to propel the rotational driver along the track. The rotational driver can include a drive member that is rotated by the rotational driver about the drive axis. The drive member is adapted for connection to a drill rod (e.g., a drill pipe). The drill rod can have a threaded end including either internal threads in a box-end or external threads in a pin-end.

To drill a bore using a directional drilling machine of the type described above, the track is oriented at an inclined angle relative to the ground, and the rotational driver is moved to an upper end of the track. Next, a drill rod is unloaded from a drill rod storage structure (e.g., a magazine) of the directional drilling machine and an upper end of the drill rod is coupled to the drive member of the rotational driver typically by a threaded connection. After the upper end of the drill rod has been coupled to the rotational driver, the lower end of the drill rod is coupled to a drill head if the drill rod is the first drill rod to be introduced into the ground, or to the upper-most drill rod of an existing drill string if the drill string has already been started. Thereafter, the rotational driver is driven in a downward direction along the inclined track while the drive member is concurrently rotated about the drive axis. As the rotational driver is driven down the track, the rotational driver transfers axial thrust and torque to the drill string. The axial thrust and torque is transferred through the drill string to the drill head thereby causing a cutting element (e.g., a bit) of the drill head to rotationally bore through the ground. The length of the bore is progressively increased as drill rods are progressively added to the drill string. The drill rods are most commonly secured together by threaded connections at joints between the drill rods. The drilling process requires numerous instances of adding another rod to the drill string, referred to as the make-up process as this is how one progressively makes up the drill string from individual drill rods.

During the process of creating a bore hole the orientation of the drill head determines the direction that the bore hole will extend. The orientation of the drill head is defined by 1) the pitch of the drill head, the orientation of its longitudinal axis relative to gravity, and 2) the rotational orientation, the rotary position of an asymmetrical characteristic of the drill head. The bore hole will be extended in a direction aligned with the longitudinal axis of the drill head when the drill string is rotated and pushed forward.

A steering correction or deviation may be required in order to direct the path of the bore hole. The bore hole will deviate from the direction aligned with the longitudinal axis of the drill head when the drill string is not rotated while the drill string is pushed forward. The direction that the bore hole advances during a steering correction is determined by the rotational orientation of the drill head. The rotational orientation of the drill head can be changed by rotating the drill string at the surface.

The process of controlling the rotational orientation of a drill head involves rotating an up-hole end of a drill string, while the drill head is connected to the down-hole end. The drill string is made-up of a plurality of drill rods. Individual drill rods are typically ten feet, or fifteen feet, or up to thirty feet in length. A drill string to be comprised of ten drill rods, but the drill string can also be comprised of over one hundred drill rods.

The drill rods are flexible in the longitudinal direction, in order to enable bending through curves to follow a desired bore path. The drill rods are also rotationally or torsionally flexible. This torsional flexibility results in the potential that during the process of positioning the drill head the up-hole end of the drill string may rotate through a measurable angle, before the drill head, at the downhole end of the drill string, will move. That can occur as a result of the fact that torque is needed to rotate the drill head and/or the drill string, to overcome frictional forces that result from the weight of the drill head and drill string being in contact with the ground.

In addition to the friction forces created by the weight of the drill head and drill string, there are forces on the drill string and drill head that are associated with the drill string extending through one or more curved sections. The drill string typically extends along a straight path downward at the start of a bore, and then deviates in direction to a generally horizontal direction, parallel to the ground, when the drill head is at the desired depth. A curved section of the bore will typically affect one or two drill rods.

There will be some force and resulting energy needed to bend each affected drill rod through that deviation or curvature, and then to rotate the drill string. Torque will be needed to rotate the drill string in order to overcome the resistance to the bending of the drill rods. In addition, the bending forces will result in additional force of the ground acting against the outer surface of the affected drill rods, which will result in additional torque to overcome the associated frictional force.

This characteristic results in a situation where it may be difficult to control the rotational orientation of the drill head. The initial movement of the drill head requires torque to overcome the static friction against the drill head and the drill string associated with the weight and the bending of the drill string.

Once the drill head and drill string begin to move, the rotational movement will be opposed by dynamic friction. The dynamic friction is typically lower than the static friction, thus once the drill head and drill string begin to move, to rotate, the torque needed to keep them moving will be lower. In order to generate the torque needed at the drill head, at the down hole end of the drill string, the up-hole end of the drill string will have been rotated through an angle due to the torsional flexibility of the drill string In some cases the up-hole end of the drill string may rotate through ten or twenty or up to ninety degrees of rotation before the torque transferred to the drill head is adequate to overcome static friction. The torsional deflection of the drill string effectively makes the drill string a torsional spring, and the energy stored in the torsional deflection may be adequate to overcome dynamic friction, so that once the drill head starts to rotate it may continue to rotate even if the up-hole end of the drill string is not rotated any further. This can be described as a delayed, and inconsistent rotational response that may make it difficult to control the orientation of the drill head.

An additional complication can arise from potential delay in the transfer of data from the sensor mounted in the drill head to the operator. The data from the drill head sensor is embedded in an electromagnetic (EM) signal generated by a sensor package mounted in the drill head, often times called a sonde or transmitter. That EM signal is detected by an above ground receiver often times called a locator. There are several types of information embedded in the EM signal generated by the sonde or transmitter including the pitch of the drill head, the temperature of the sonde or transmitter, and battery status information. The sonde or transmitter is a battery powered device, generating a signal that can pass through thirty to fifty feet of the ground. The rate that data can be transferred by this device to the locator may be limited by the fact that it is a battery powered device, designed to generate a signal that can pass through the ground at these intended depths, for an extended period of time. The result being, there can be a delay in the transfer of the measured data of the drill head's rotational orientation to the drill operator. This can be described as a delayed measurement response.

The delayed rotation response, combined with the delayed measurement response, makes it challenging in some situations to control the rotational orientation of the drill head. Operators of the drills are able to observe various aspects of this system and are able to make informed compensations when operating the controls manually, in order to achieve adequate control. In most cases this process is relatively straight forward to control manually. However, in some instances such as long bores that have a complicated bore path, with several curvatures, this may be a difficult process that requires the operator to use a trial-and-error technique.

There is a desire to automate this control, to reduce the operating demands on the operator, or to enable more autonomous operation, in which the machine is able to automatically, without any human interaction, control the rotation of the up-hole end of the drill string to achieve a specified rotational orientation of the drill head at the down-hole end of the drill string.

SUMMARY

In one aspect, the present disclosure provides a method of controlling a position of a drill head of a horizontal directional drill. The method includes determining a measured rotational position of the drill head; determining an estimated rotational position of the drill head; evaluating if the measured rotational position of the drill head is reliable; determining if the estimated rotational position of the drill head substantially matches the measured rotational position of the drill head; and when the estimated rotational position of the drill head does not substantially match the measured rotational position of the drill head, updating the estimated rotational position of the drill head to substantially match the measured rotational position of the drill head.

In some aspects, the method includes a remote locator device configured to determine the measured rotational position of the drill head.

In some aspects, the method includes a controller of the horizontal directional drill determining the estimated rotational position of the drill head.

In some aspects, evaluating if the measured rotational position of the drill head is reliable includes evaluating a signal strength of a signal received from a transceiver coupled to the drill head.

In some aspects, evaluating if the measured rotational position of the drill head is reliable includes an operator approving or denying the reliability of the measured rotational position of the drill head.

In some aspects, the method includes an operator approving or denying the reliability of the measured rotational position of the drill head using an input device on the horizontal directional drill.

In some aspects, the method includes an operator approving or denying the reliability of the measured rotational position of the drill head using an input device remote from the horizontal directional drill.

In some aspects, when the measured rotational position of the drill head is not reliable, the method is ended without updating the estimated rotational position of the drill head to substantially match the measured rotational position of the drill head.

In some aspects, an operator determines if the estimated rotational position of the drill head substantially matches the measured rotational position of the drill head.

In some aspects, updating the estimated position of the drill head includes the operator using an input device to update the estimated position of the drill head. The input device is on the horizontal directional drill.

In some aspects, updating the estimated position of the drill head includes the operator using an input device to update the estimated position of the drill head. The input device is remote from the horizontal directional drill.

In some aspects, a controller of the horizontal directional drill determines if the estimated rotational position of the drill head substantially matches the measured rotational position of the drill head.

In some aspects, a controller automatically updates the estimated position of the drill head.

In some aspects, the method further includes displaying the estimated rotational position of the drill head and the measured rotational position of the drill head on a display on the horizontal drilling machine.

In some aspects, the method further includes displaying the estimated rotational position of the drill head and the measured rotational position of the drill head on a display remote from the horizontal drilling machine.

In some aspects, the method further includes displaying a plurality of prompts to an operator during the method.

In some aspects, the method further includes simultaneously performing an automated rod addition sequence.

In some aspects, when the estimated rotational position of the drill head matches the measured position of the drill head, the method further includes steering the drill head to a target steering position.

In some aspects, an operator sets the target steering position using an input device on the horizontal directional drill.

In some aspects, an operator sets the target steering position using an input device remote from the horizontal directional drill.

In some aspects, steering the drill head to the target steering position begins in response to an input from an operator.

In some aspects, steering the drill head to the target steering position includes a controller of the horizontal directional drill rotating an output spindle of the horizontal directional drill until the estimated drill head position matches the target steering position.

In some aspects, the method includes a controller of the horizontal directional drill controlling a thrust mechanism to drive the drill head a target distance.

In some aspects, an operator sets the target distance using an input device on the horizontal directional drill.

In some aspects, an operator sets the target distance using an input device remote from the horizontal direction drill.

In another aspect, the present disclosure provides a control system for a horizontal directional drill. The control system includes a user interface having a first display and a second display; a locator tool configured to measure a rotational position of a drill head of the horizontal directional drill; and a controller configured to determine an estimated rotational position of the drill head. The first display is in communication with the locator tool and displays information about the measured rotational position of the drill head. The second display is in communication with the controller and displays information about the estimated rotational position of the drill head. The control system further includes means for calibrating the estimated rotational position of the drill head to substantially match the measured rotational position of the drill head.

In some aspects, the means for calibrating includes confirming the reliability of the measured rotational position of the drill head with an input device on the horizontal directional drill.

In some aspects, the means for calibrating includes confirming the reliability of the measured rotational position of the drill head with an input device remote from the horizontal directional drill.

In some aspects, the means for calibrating includes the controller determining if the estimated rotational position of the drill head substantially matches the measured rotational position of the drill head.

In some aspects, the means for calibrating includes the controller updating the estimated rotational position of the drill head to substantially match the measured rotational position of the drill head.

In some aspects, the means for calibrating includes determining if the estimated rotational position of the drill head substantially matches the measured rotational position of the drill head with an input device on the horizontal directional drill.

In some aspects, the means for calibrating includes updating the estimated rotational position of the drill head to substantially match the measured rotational position of the drill head with an input device on the horizontal directional drill.

In some aspects, the means for calibrating includes determining if the estimated rotational position of the drill head substantially matches the measured rotational position of the drill head with an input device remote from the horizontal directional drill.

In some aspects, the means for calibrating includes updating the estimated rotational position of the drill head to substantially match the measured rotational position of the drill head with an input device remote from the horizontal directional drill.

In some aspects, the user interface includes an input device configured to allow an operator to interact with the second display.

In some aspects, a transceiver is configured to provide communication between the controller and the locator tool.

In some aspects, the control system includes a remote device in communication with the controller.

In some aspects, the remote device includes the second display and an input device.

In some aspects, the remote device is a wearable device that can be worn by an operator.

In some aspects, the remote device is configured to wirelessly communicate with the controller via a wireless communication system.

In some aspects, the remote device is a cellular device and is configured to communicate with the controller via a cellular modem.

In some aspects, the control system includes a remote joystick that is configured to interact with the remote device.

In some aspects, the control system includes a lockout control in communication with the controller. The lockout control is configured to initiate a command to shut off the horizontal directional drill.

In some aspects, the controller is further configured to simultaneously perform an automated rod addition sequence.

In some aspects, the control system further includes means for steering the drill head to a target steering position when the estimated rotational position of the drill head matches the measured position of the drill head.

In some aspects, the means for steering the drill head to a target steering position includes setting the target steering position using an input device on the horizontal directional drill.

In some aspects, the means for steering the drill head to a target steering position includes setting the target steering position using an input device remote from the horizontal directional drill.

In some aspects, the means for steering the drill head to a target steering position includes the controller of the horizontal directional drill rotating an output spindle of the horizontal directional drill until the estimated drill head position matches the target steering position.

In some aspects, the control system further includes a means for pushing the drill head a target distance.

In some aspects, the means for pushing the drill head to the target distance includes the controller managing a thrust mechanism of the horizontal directional drill to move the drill head the target distance.

In some aspects, the means for pushing the drill head to the target distance includes setting a target distance using an input device on the horizontal directional drill.

In some aspects, the means for pushing the drill head to the target distance includes setting a target distance using an input device remote from the horizontal directional drill.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
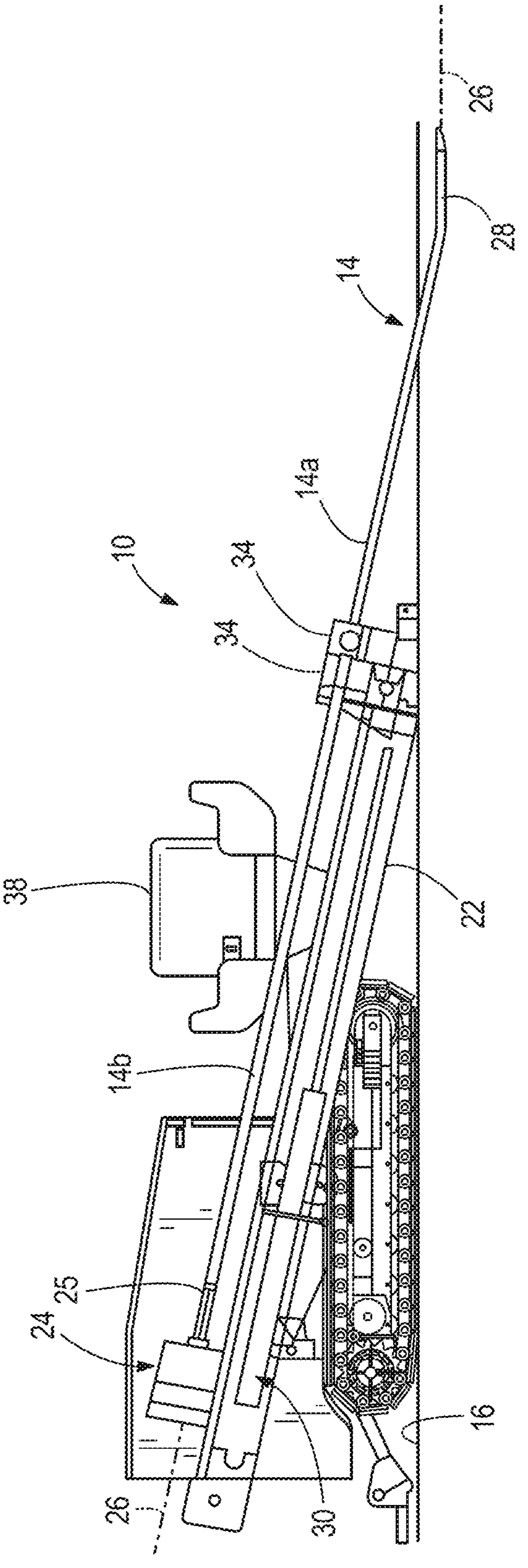
FIG. 1 is a side view of a horizontal directional drilling machine.

The horizontal directional drilling machine 10 of FIG. 1 is adapted for pushing a drill string 14 into the ground 16 in a first or down-hole direction, and for pulling the drill string 14 from the ground 16 in a second or up-hole direction opposite the down-hole direction. The drill string 14 includes a plurality of drill rods (e.g., two of the drill rods 14*a*, 14*b* are shown and referred to below) that are connected end-to-end, by sequential couplings made on the drilling machine 10. A drill head 28 (e.g., a boring tool) is generally mounted at a remote or down-hole end of the drill string 14 to facilitate driving the drill string 14 into the ground 16. The drill head 28 may include, for example, a cutting bit assembly, a starter rod, a fluid hammer, a sonde holder, as well as other components. Each of the drill rods 14*a*, 14*b* includes a mechanism for connection therebetween, such as threaded ends. A pin-end having external threads on one end of one rod 14*a*, for example, may be threaded into a box-end having internal threads on the adjacent rod 14*b*. The series of rods coupled in such a manner comprises the drill string 14.

The drilling machine 10 includes an elongated guide or track 22 (e.g., rack) that can be positioned by an operator at any number of different oblique angles relative to the ground 16. A rotational driver 24 is mounted on the track 22 and includes an output shaft or drive spindle 25. The rotational driver 24 is adapted for rotating the drill string 14 in forward and reverse directions about a longitudinal axis 26 of the drill string 14. Rather than directly engaging the drill string 14 with the drive spindle 25, a sub saver can be provided as a separate element for establishing a drive connection between the rotational driver 24 and the drill string 14. A thrust mechanism 30 is provided for propelling the rotational driver 24 along the track 22. For example, the thrust mechanism 30 drives the rotational driver 24 to advance in a forward/downward direction to push the drill string 14 into the ground 16.

Referring still to FIG. 1, the drilling machine 10 further includes gripping units 34 for use in coupling and uncoupling the drill rods 14*a* and 14*b* of the drill string 14. The gripping units 34 can be configured as vise grips that, when closed by one or more hydraulic vise cylinders grip the drill string 14 with sufficient force to prevent the drill string 14 from being rotated by the rotational driver 24.

Figure 4:
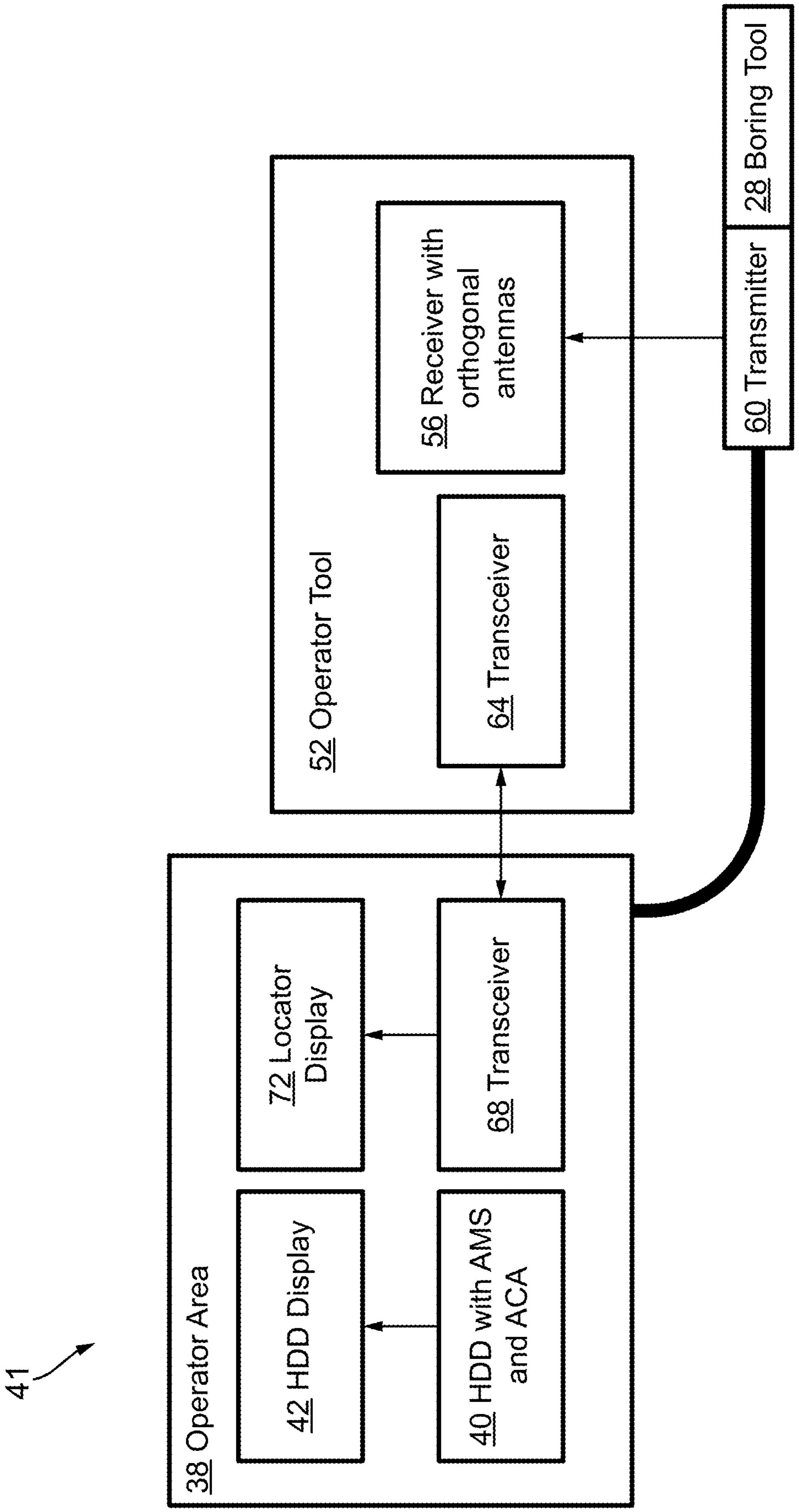
FIG. 4 is a schematic of the system architecture of the horizontal directional drilling control system of FIG. 3 according to an embodiment of the disclosure.

The drilling machine 10 further includes a controller 40 (FIG. 4). The controller 40 is configured to, among other things, control the direction, speed, and torque produced by a motor of the rotational driver 24. The controller 40 is also configured to control the rotation of the spindle 25 to adjust the position the drill head 28. The controller 40 may include one or more electronic processors and one or more memory devices. The controller 40 may be communicably connected to one or more sensors or other inputs, such as described herein. The electronic processor may be implemented as a programmable microprocessor, an application specific integrated circuit (ASIC), one or more field programmable gate arrays (FPGA), a group of processing components, or with other suitable electronic processing components. The memory device (for example, a non-transitory, computer-readable medium) includes one or more devices (for example, RAM, ROM, flash memory, hard disk storage, etc.) for storing data and/or computer code for completing the or facilitating the various processes, methods, layers, and/or modules described herein. The memory device may include database components, object code components, script components, or other types of code and information for supporting the various activities and information structure described in the present application. According to one example, the memory device is communicably connected to the electronic processor and may include computer code for executing one or more processes described herein. The controller 40 may further include an input-output ("I/O") module. The I/O module may be configured to interface directly interface with one or more devices, such as a power supply, sensors, displays, etc. In one embodiment, the I/O module may utilize general purpose I/O (GPIO) ports, analog inputs/outputs, digital inputs/outputs, and the like.

The process of adding a new rod to the drill string 14 can include an automated machine cycle that utilizes transducers which measure the movements of the drilling machine 10 and can be activated with the controller 40. This automated process is called a Single Button Rod Exchange (SBRE) or "Sabre" feature, which includes hardware in the form of additional sensors, and control algorithms to control the process to add rods, and to monitor for process abnormalities. The SBRE process is described in detail in PCT/US2021/064939, filed on Dec. 22, 2021, the contents of which are incorporated by reference herein. The SBRE module includes an automated machine sequence (AMS). The AMS is a module which adds the new rod to the drill string 14. The SBRE module can be used in conjunction with an auto calibration algorithm (ACA) described herein. The ACA establishes the correlation between the angle of the rotational position of the spindle 25 and the measured position of the drill head 28. The SBRE process may also be referred to as the Auto Rod Exchange (ARE) process.

Figure 2:
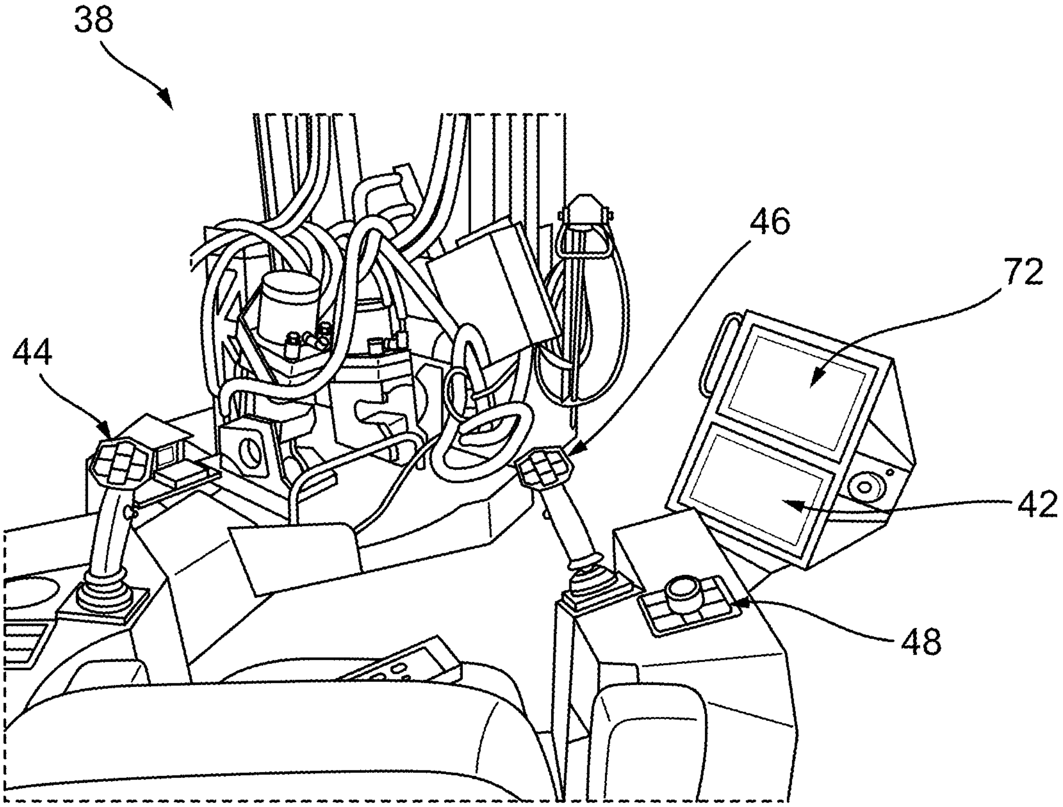
FIG. 2 is a detailed view of an operator area of the horizontal directional drilling machine of FIG. 1 according to an embodiment of the disclosure.

Turning to FIG. 2, the drilling machine 10 may further include an operator area 38 where an on-machine operator can sit and interact with the controller 40. The operator area 38 (e.g., the user interface) includes a drill display 42, a first joystick 44 (e.g., a left joystick), a second joystick 46 (e.g., a right joystick), and a VDC dial 48. As discussed in more detail below, the drill display 42 includes screens with prompts to make it easier for an on-machine operator to control the orientation of the drill head 28 by allowing the machine controls to rotate the drill head 28 to a specified orientation. The on-machine operator uses the first joystick 44, the second joystick 46, and the dial 48 to respond to the prompts on the drill display 42.

Figure 3:
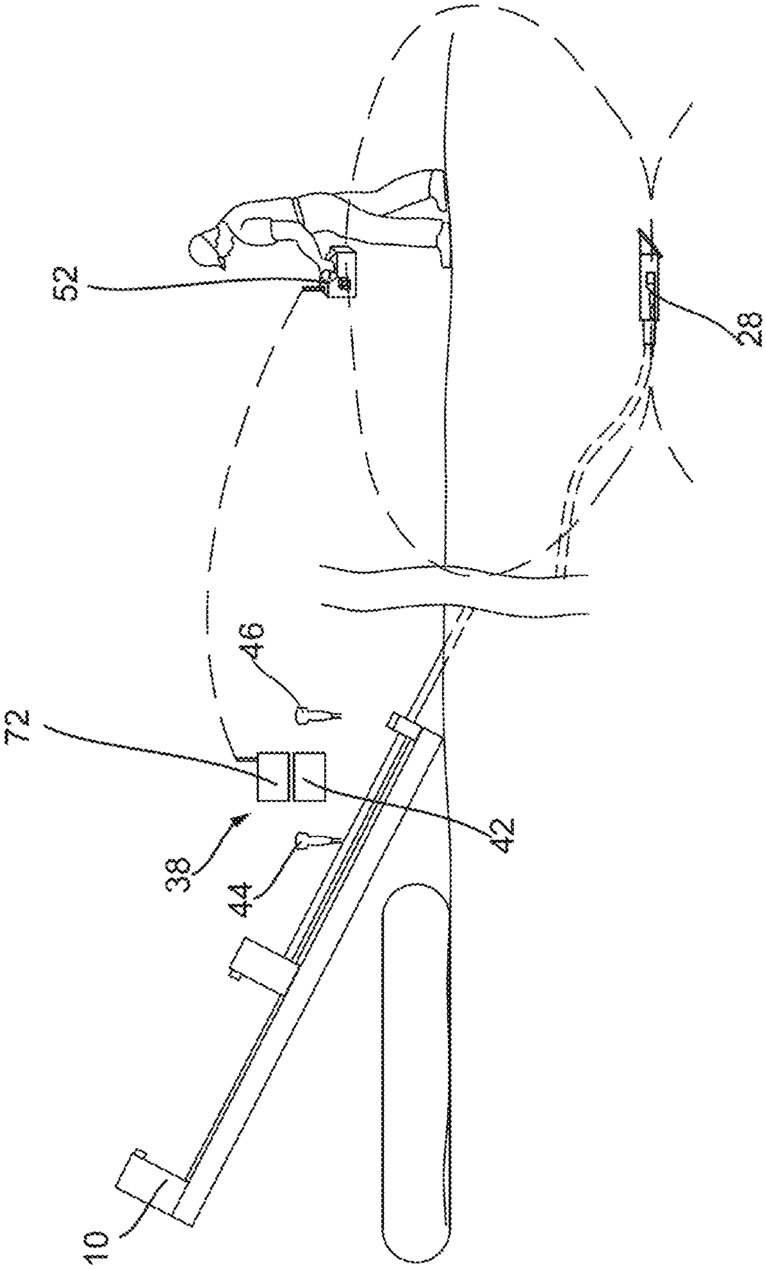
FIG. 3 is a schematic of a horizontal directional drilling machine control system according to an embodiment of the disclosure.

With reference to FIGS. 3 and 4, a locator tool 52 may be used to locate the drill head 28 when the drill head 28 is underground. Specifically, the locator tool 52 may be used to determine the rotational orientation of the drill head 28. The locator tool 52 may be a handheld device. More specifically, as a non-limiting example, the locator tool 52 may be the Digitrak Falcon F5 Locator System. The locator tool 52 includes a receiver 56 that receives information (e.g., signals) from a transmitter 60 located on the drill head 28. In the illustrated embodiment, the receiver 56 includes a set of antennas (e.g., orthogonal antennas). The transmitter 60 is a rotational sensor that determines the clock position of the drill head 28, the rotational speed of the drill head 28, and the rotational direction of the drill head 28. The "clock position" should be understood to be the angular displacement from a vertical axis that extends through the spindle 25. The transmitter 60 may be operatively connected to other devices/transducers used to measure the orientation of the drill head that may include an accelerometer, set of magnets, or other sensors. The data from these transducers is transferred by the transmitter 60. The locator tool 52 further includes a transceiver 64 that allows the locator tool 52 to communicate with the transceiver 68 of a locator display 72 (e.g., a first display), such that an operator can see the information about the position of the drill head 28. The locator display 72 is located in the operator area 38.

FIG. 4 illustrates a simplified system architecture of the control system 41 for controlling the drilling machine 10. The control system 41 includes the drill head 28 having the transmitter 60, the locator tool 52, and the operator area 38 (e.g., the user interface) which allows the on-machine operator to interact with the controller 40 (e.g., send user inputs to the controller 40 to initiate processes or set values). In the illustrated embodiment, the controller 40 and the locator tool 52 are separate electronic systems that do not send and receive information therebetween. The on-machine operator is used to integrate the information from the locator tool 52 with the information from the drilling machine controller 40. The drill display 42 (e.g., the second display) and the locator display 72 use specific graphics, discussed below in detail, to easily show the on-machine operator an estimated clock position of the drill head (e.g., the Drill Head Position Indicator, DHPI) and the measured clock position of the drill head 28 (e.g., the drill head position, DHP). In general, the drill display 42 displays information about the estimated rotational position of the drill head 28, and the locator display 72 displays information about the measured rotational position of the drill head 28. The estimated position of the drill head 28 may be determined by a rotary encoder that is positioned on the spindle 25. The rotary encoder is configured to send and receive signals to/from the controller 40.

Figure 5:
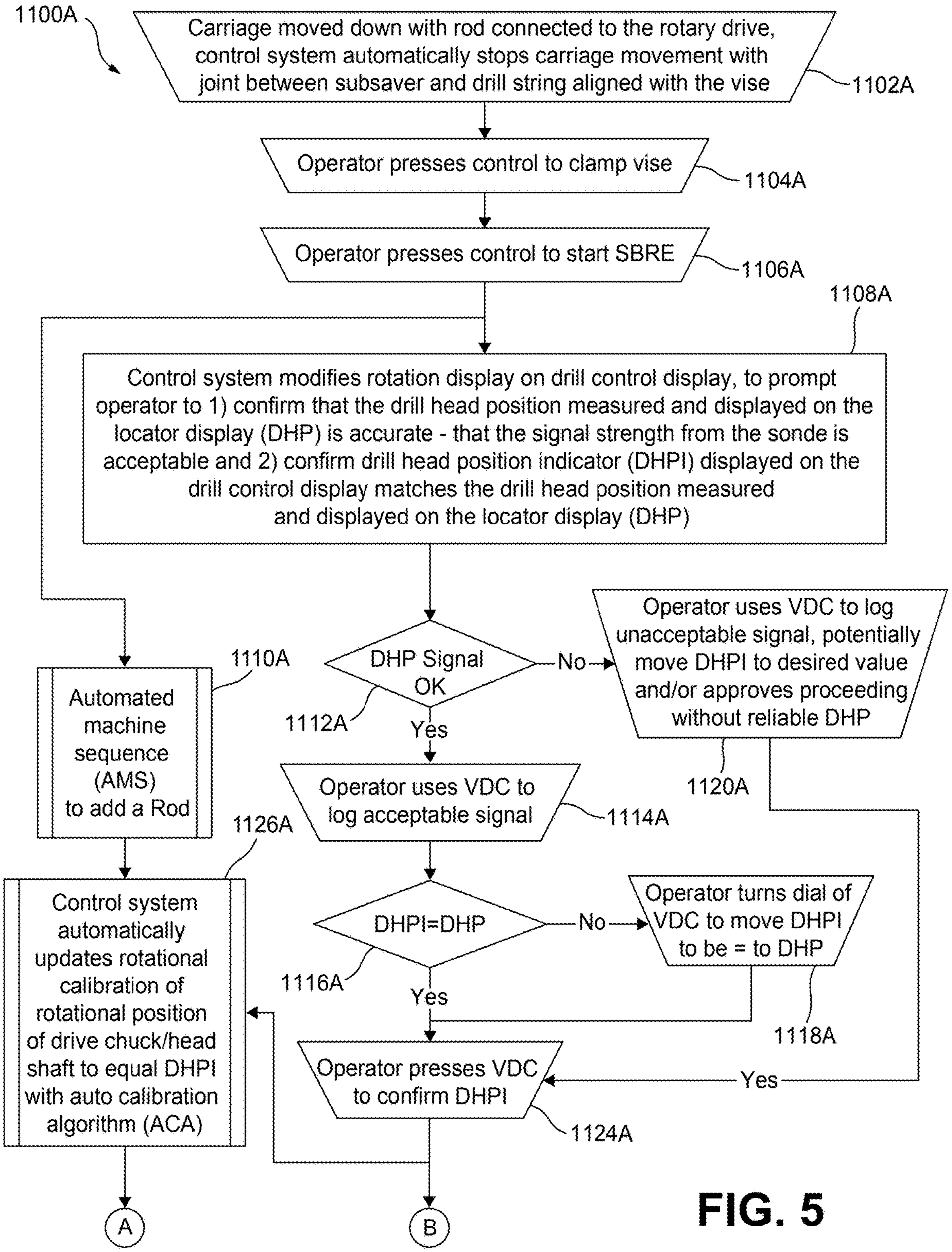
FIG. 5 is flow chart illustrating a calibration method for the horizontal drilling control system of FIG. 3 according to an embodiment of the disclosure.
Figure 5:
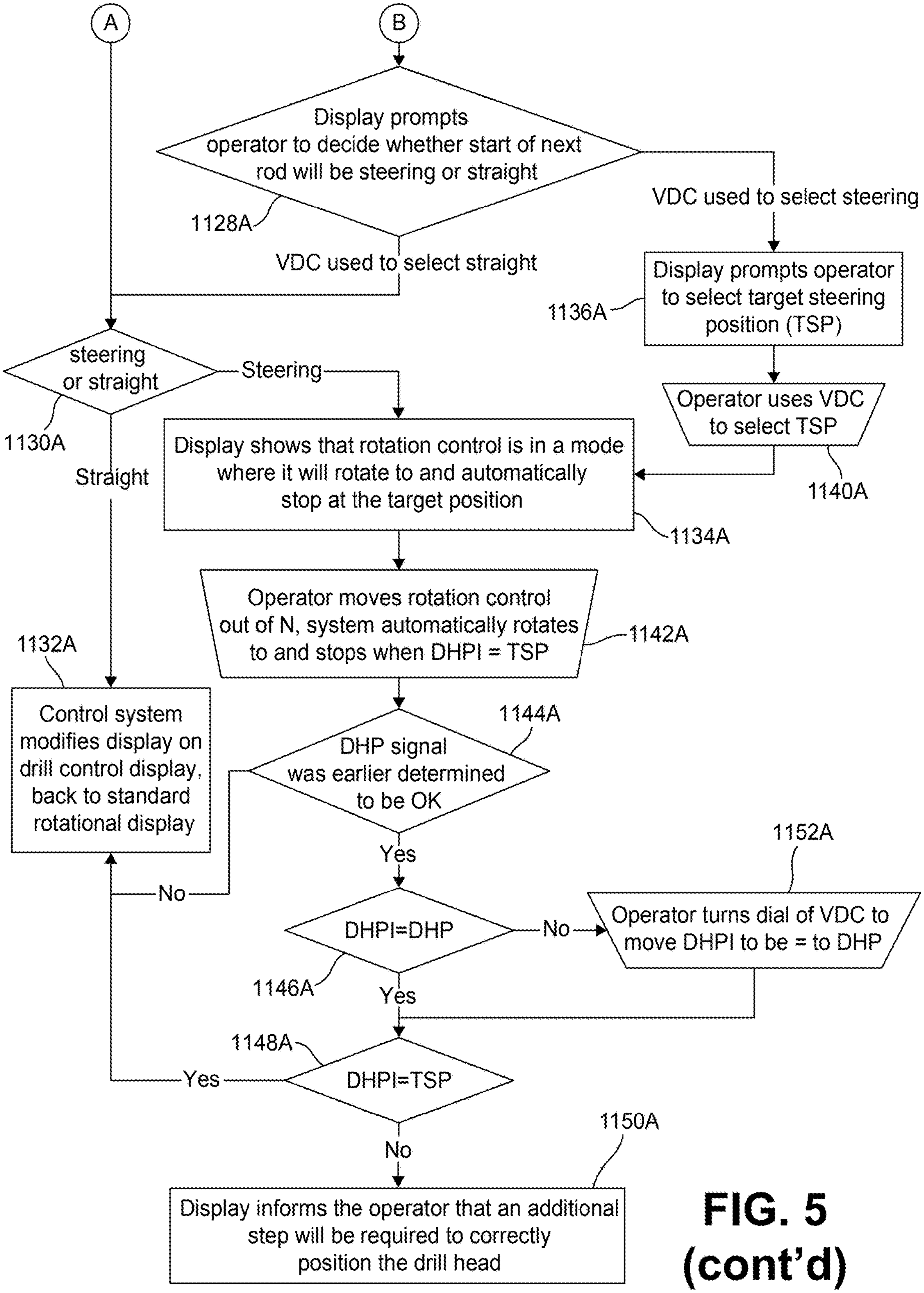

FIG. 5 illustrates a method 1100A for calibrating an estimated position of the drill head 28 to the clock position of the drill head 28. The method 1100A includes calibrating the data from the drilling machine 10, which is displayed on the drill display 42, with the data from the locator tool 52, which is displayed on the locator display 72. The method 1100A further includes automatically moving the drill head 28 to a desired position. The method 1100A is a manual calibration method that includes a first operator (e.g., an on-machine operator) located at the operator area 38 and a second operator (e.g., a locator tool operator) that is positioned remote from the drilling machine 10 and is at the location above the drill head 28. FIGS. 6-20 illustrate the screen displays of the locator display 72 and the drill display 42 during the method 1100A. During the method 1100A, the drill display 42 shows the on-machine operator prompts that make it easier to control the drill head orientation by allowing the controller 40 to rotate the drill head 28 to a specified orientation by rotating the spindle 25. During the method 1100A, the on-machine operator will consider data generated by the drill head locator tool 52 and interact with data on the drill display 42 from the controller 40 to enable the controller 40 to automatically rotate the drill head 28 to a desired location.

Because the calibration of the drill head 28 will change as the drill string 14 changes, the calibration method 1100A is initiated each time a new drill rod is added to the drill string 14. More specifically, the change is due to the fact that the threaded joints between the drill rods are not identical, when a new drill rod is added to the drill string 14, and torqued-up, the relationship between the rotational position of the drive spindle 25 (measured by the encoder) and the clock position of the drill head 28 will be different than it was for the previous rod.

Figure 6:
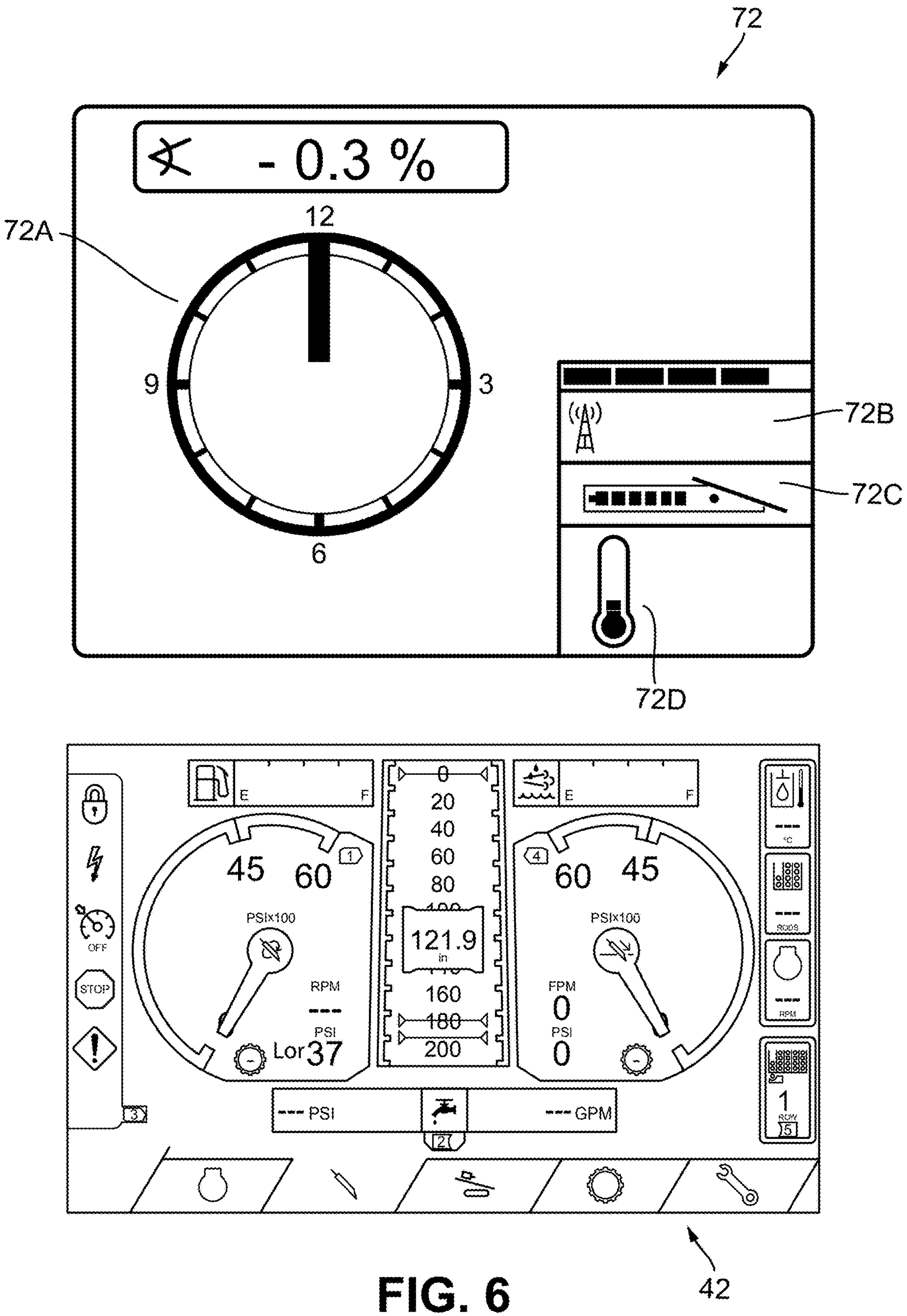
FIG. 6 is a schematic showing exemplary screen displays for STEP 1102A of the method of FIG. 5.

The method 1100A begins when the track 22 (e.g., the carriage) of the drilling machine 10 is moved down with a rod connected to the spindle 25. The controller 40 automatically stops the movement of the track 22 with the joint between the sub saver and the drill string 14 aligned with the vise 34 (STEP 1102A). With reference to FIG. 6, the locator display 72 shows the measured clock position 72A of the drill head 28, the signal strength 72B of the transmitter 60, the battery life 72C of the transmitter 60, and the temperature 72D of the transmitter 60. The measured position of the drill head 28 is referred to the Displayed Head Position (DHP). The drill display 42 displays the position of the rotational driver 24 on the track 22, the rotational speed of the drill head 28, and the thrust force of the drilling machine 10.

At STEP 1104A, the on-machine operator presses the control (e.g., the first joystick 44) to clamp the vise 34. Once the vise 34 is clamped, the on-machine operator presses the control (e.g., the first joystick 44) to start the SBRE process (STEP 1106A).

After the on-machine operator starts the SBRE process, the controller 40 modifies the rotation display on the drill display 42 to prompt the user to (1) confirm the accuracy of the information displayed on the locator display 72 and (2) confirm that the information displayed on the drill display 42 matches the information displayed on the locator display 72 (STEP 1108A). The on-machine operator confirms the accuracy of the information displayed on the locator display 72 by confirming that the signal strength from the transmitter 60 (e.g., the sonde) is acceptable and reliable. The on-machine operator confirms that the information displayed on the drill display 42 matches the information displayed on the locator display 72 by comparing the measured clock position 72A (e.g., the DHP) on the locator display 72 with the estimated position of the drill head 28 (e.g., Drill Head Position Indicator; DHPI), displayed on the drill display 42. In some embodiments, confirming the reliability of the measured data may additionally include confirming that the measured battery life 72C of the transmitter 60 and the measured temperature 72D of the transmitter 60 are acceptable. In some embodiments, confirming the reliability of the measured data may additionally include confirming that the signal between the locator tool 52 and the locator display 72 is acceptable.

Additionally, after the SBRE process/AMS is started, the controller 40 of the drill head begins to add the new rod (STEP 1110A). STEP 1110A may be performed simultaneously with STEP 1108A, such that the on-machine operator is prompted to interact with the drill display 42 while the SBRE/AMS is occurring in the background.

Figure 7:
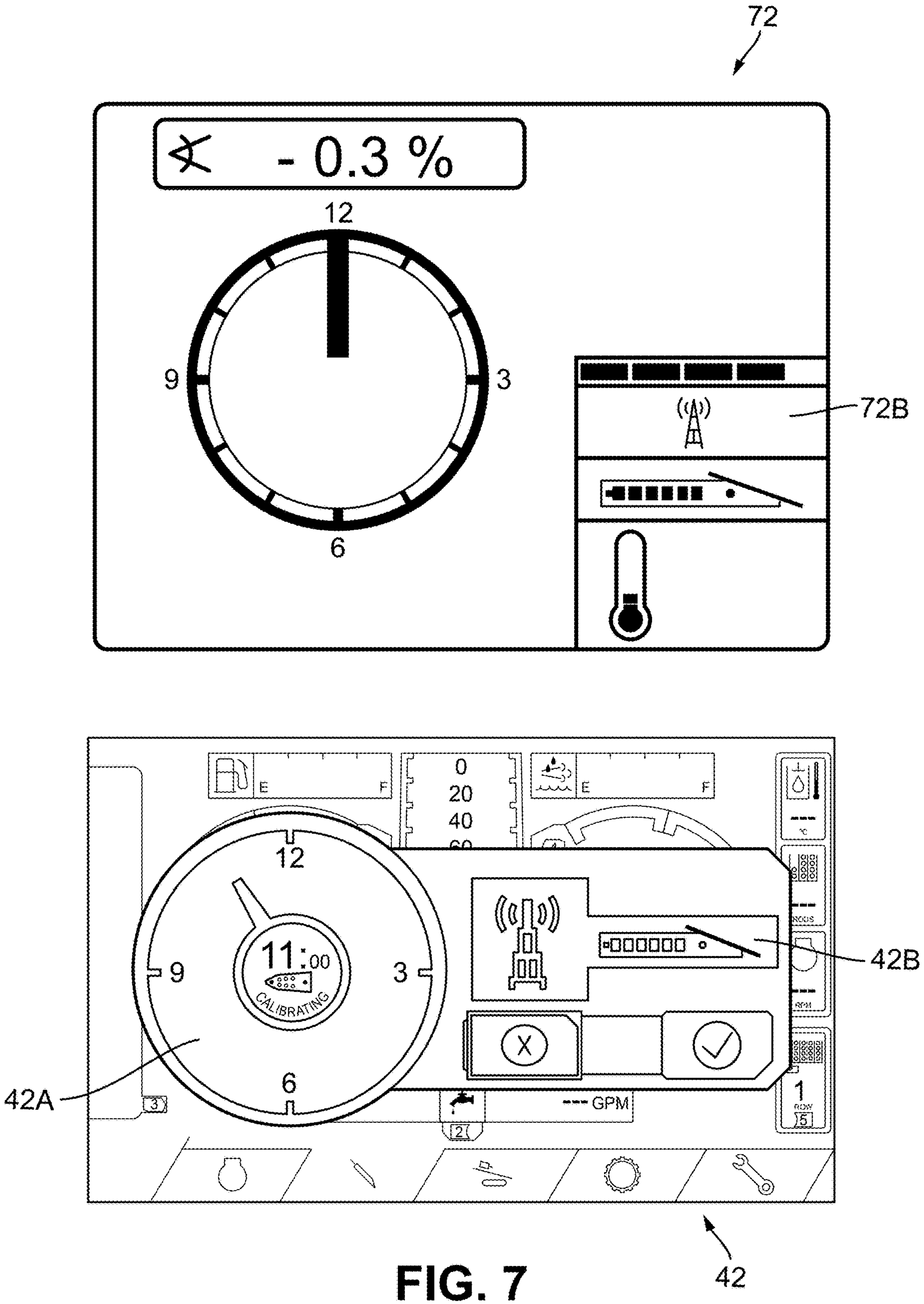
FIG. 7 is a schematic showing exemplary screen displays for STEP 1112A of the method of FIG. 5.
Figure 8:
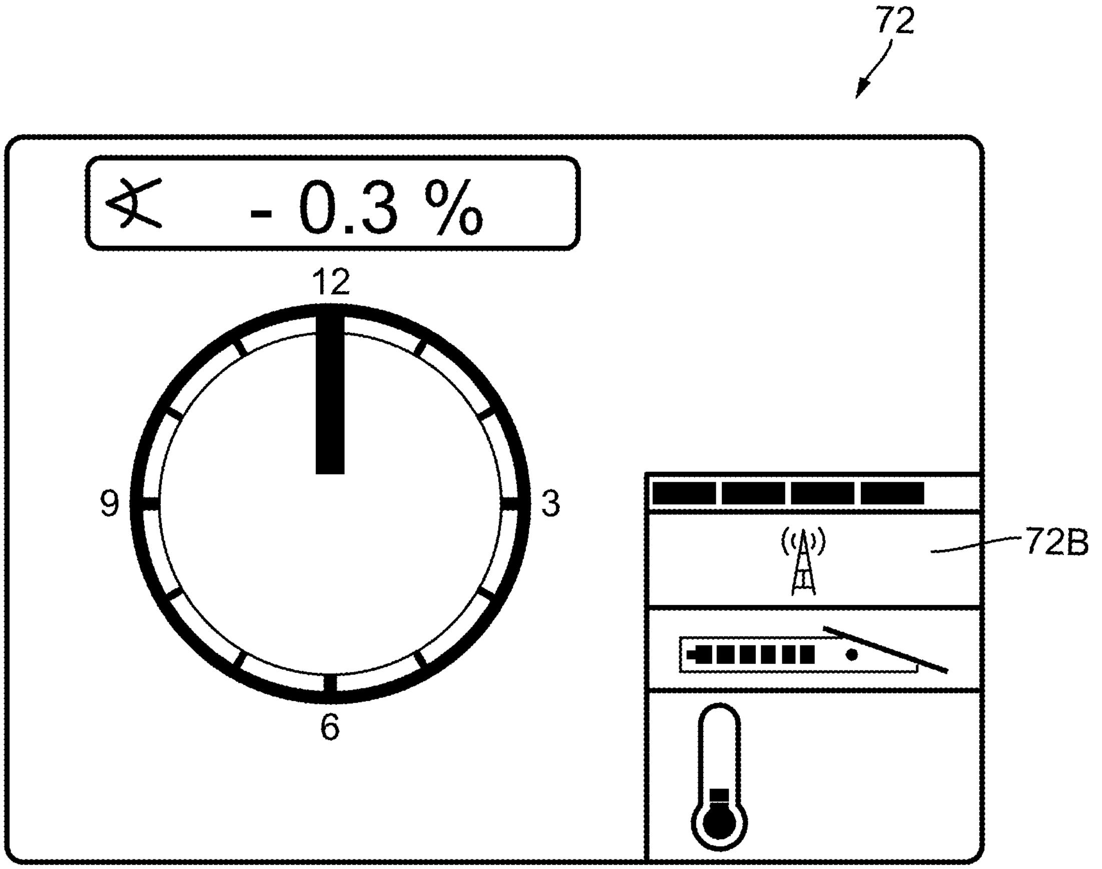
FIG. 8 is a schematic showing exemplary screen displays for STEP 1114A of the method of FIG. 5.
Figure 8:
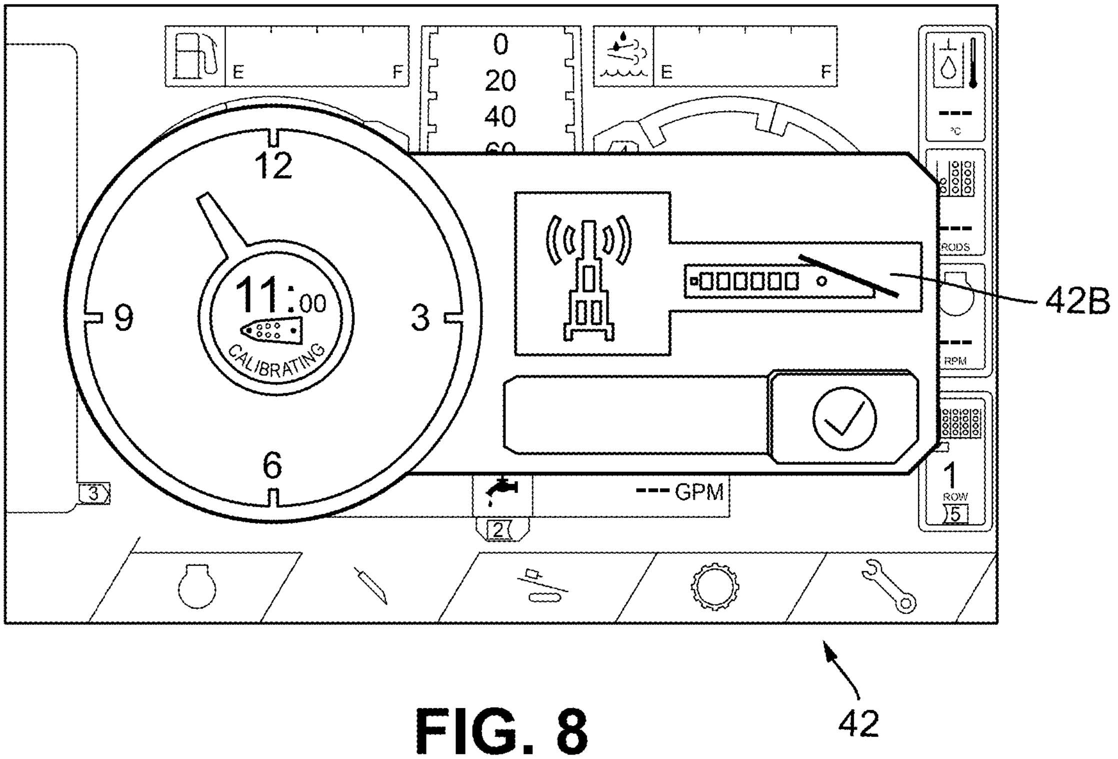

At STEP 1112A, the on-machine operator confirms that the measured signal 72B of transmitter 60 is acceptable. Said another way, the on-machine operator evaluates if the measured information is reliable by evaluating the signal of the transmitter 60. With reference to FIG. 7, the drill display 42 displays a prompt 42B to the on-machine operator asking the on-machine operator if the measured signal 72B should be accepted. The drill display 42 also shows the indicated or estimated position of drill head (e.g., the DHPI) 42A. The locator display 72 still displays the measured signal 72B of the transmitter 60. If the on-machine operator determines that the measured signal 72B is acceptable, the on-machine operator uses the VDC 48 to "approve" the measured signal 72B and log the acceptable signal (STEP 1114A) with a second user input. FIG. 8 shows the on-machine operator approving the measured signal 72B of the transmitter 60.

Figure 9:
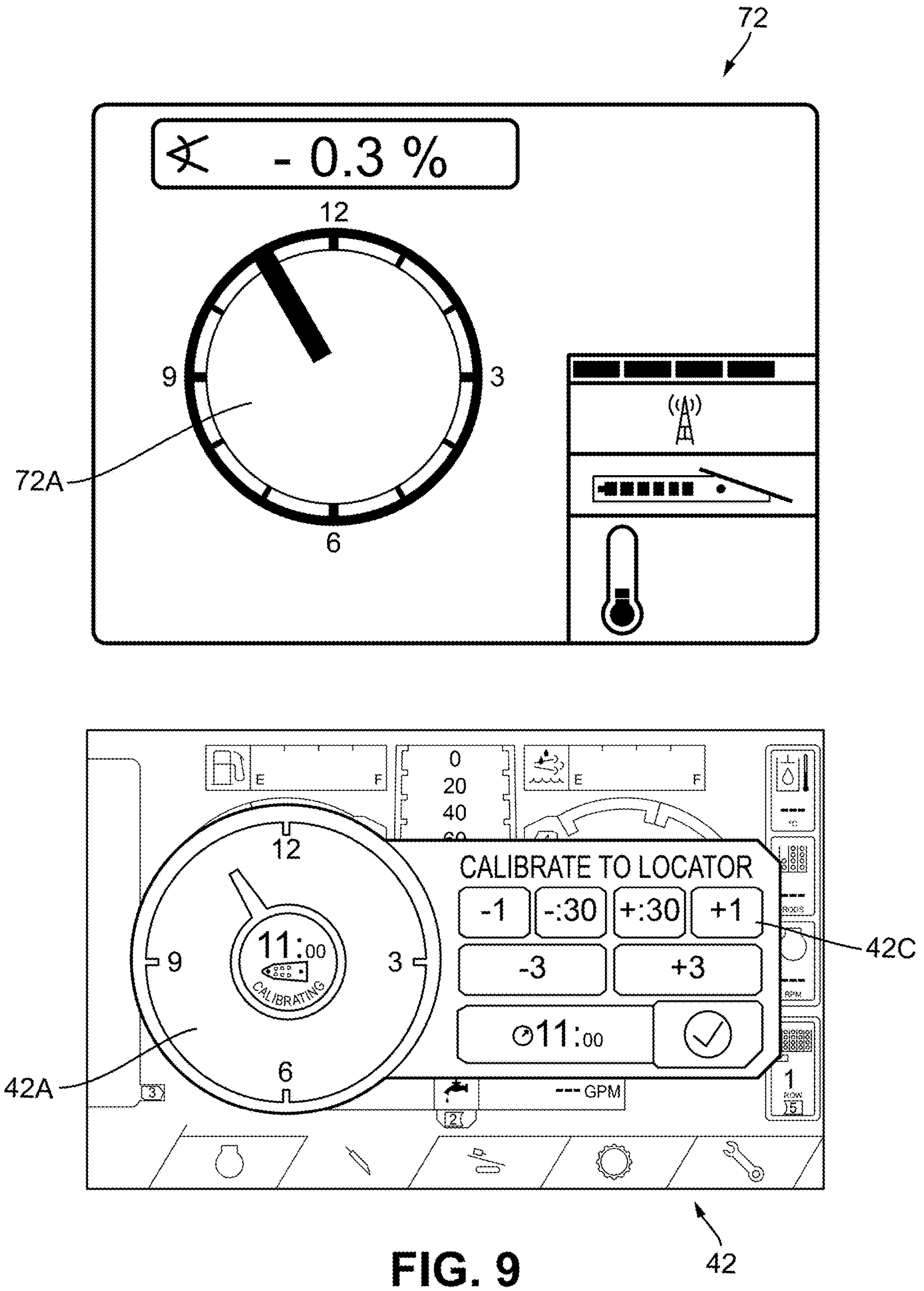
FIG. 9 is a schematic showing exemplary screen displays for STEP 1116A of the method of FIG. 5.
Figure 10:
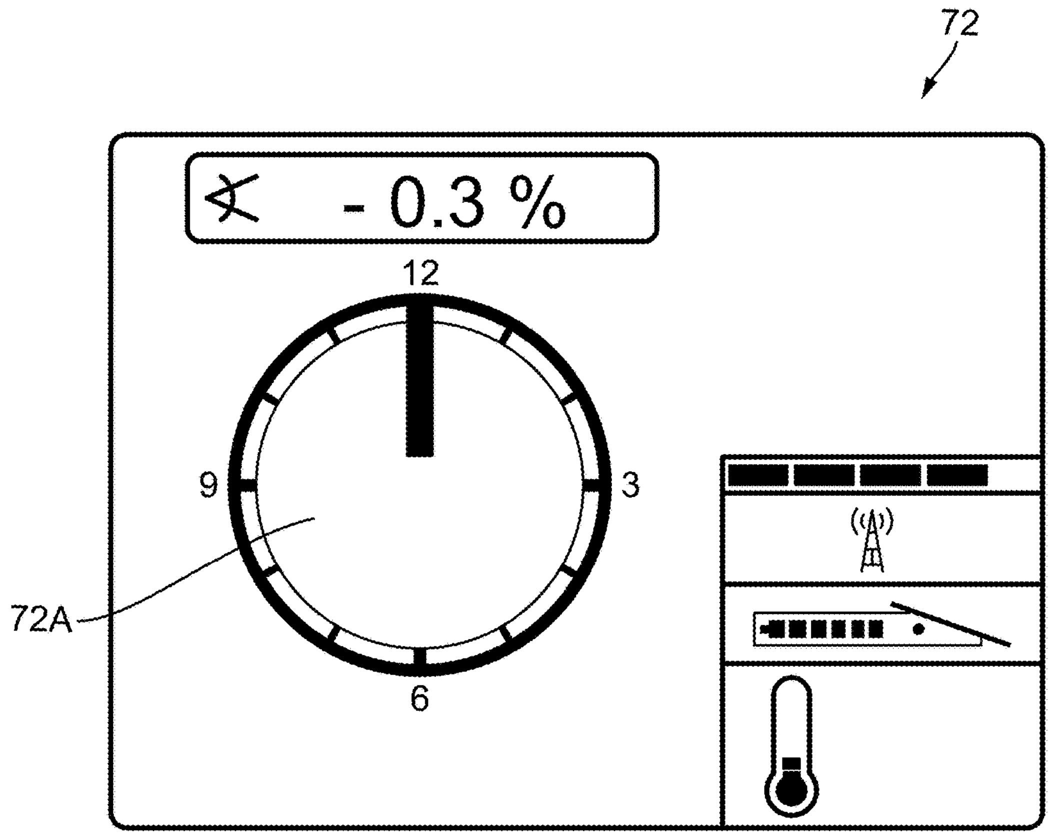
FIG. 10 is a schematic showing exemplary screen displays for STEP 1118A of the method of FIG. 5.
Figure 10:
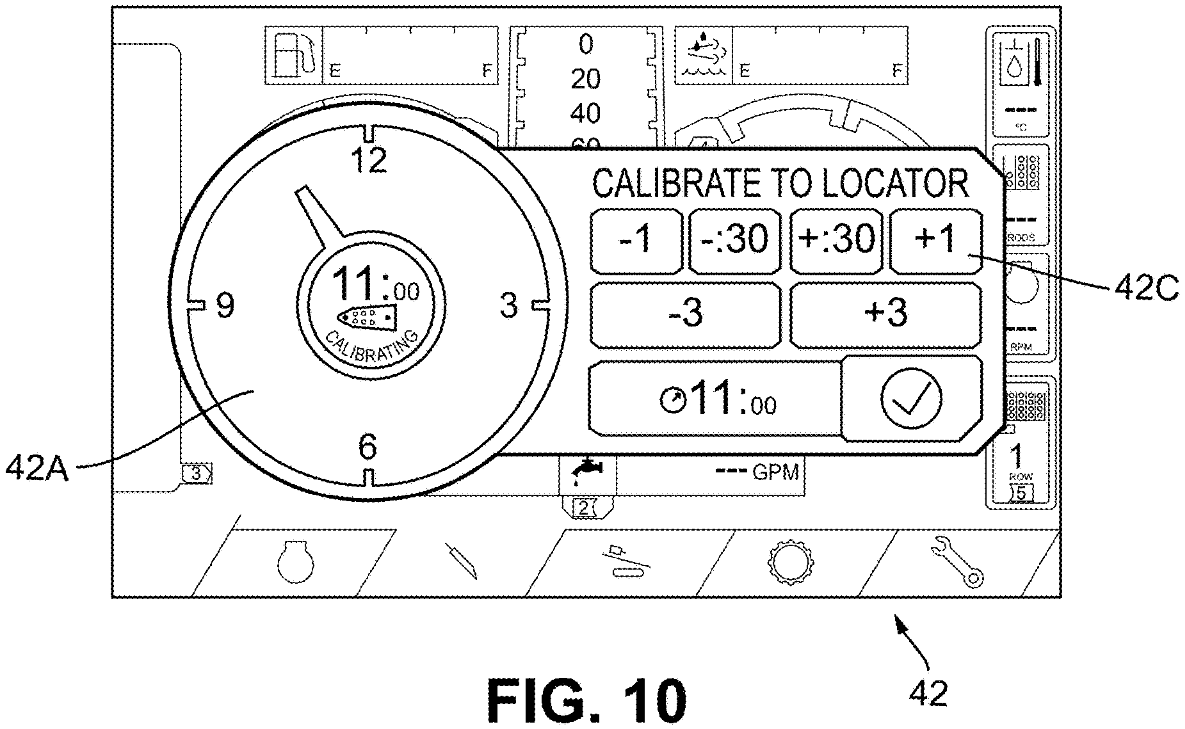

At STEP 1116A, the on-machine operator confirms that the estimated position of the drill head 28 42A (e.g., the DHPI) on the drill display 42 matches the measured clock position 72A (e.g., the DHP) on the locator display 72. Said another way, the on-machine operator determines if the estimated position of the drill head 28 needs to be recalibrated or updated to match the measured position of the drill head 28. With reference to FIG. 9, the drill display 42 displays a prompt 42C to the on-machine operator which asks if the DHPI matches the DHP. If the on-machine operator determines that the DHPI 42A on the drill display 42, does not match the DHP 72A on the locator display 72, then the on-machine operator uses the VDC 48 to set the DHPI 42A on the drill display 42 to be the same as DHP 72A on the locator display 72 (STEP 1118A). FIG. 10 illustrates an instance when the DHPI does not match the DHP. The locator display 72 shows that the DHP 72A is at the "12 o'clock" position, while the drill display 42 shows that the DHPI 42A is at the "11 o'clock" position. The prompt 42C allows the on-machine operator to input a second user input to the controller and move the DHPI 42A on the drill display 42.

Figure 11:
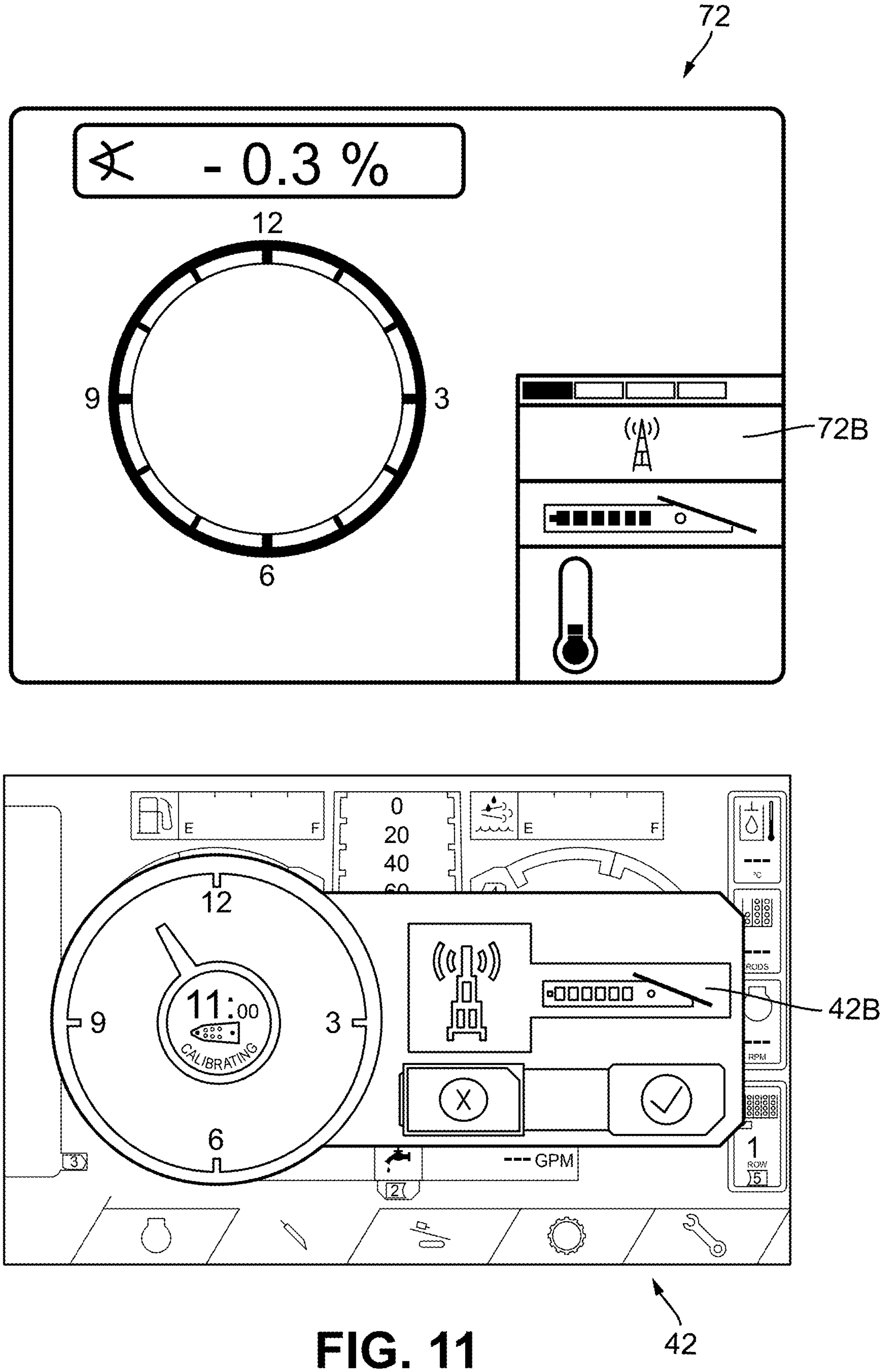
FIG. 11 is a schematic showing exemplary screen displays for STEP 1120A of the method of FIG. 5.

If the on-machine operator determines that the measured signal 72B is unacceptable, the on-machine operator uses the VDC 48 to input a user input to the controller 40 to "disapprove" the measured signal 72B and log the unacceptable signal (STEP 1120A). FIG. 11 shows the on-machine operator disapproving the measured signal 72B of the transmitter 60. As shown on the locator display 72, the measured signal 72B is low. The on-machine operator may also use the VDC 48 to move the DHPI 42A on the drill display 42 to a desired value. The on-machine operator may also use the VDC 48 to allow the method 1110A to continue without having reliable data from the locator tool 52.

Figure 12:
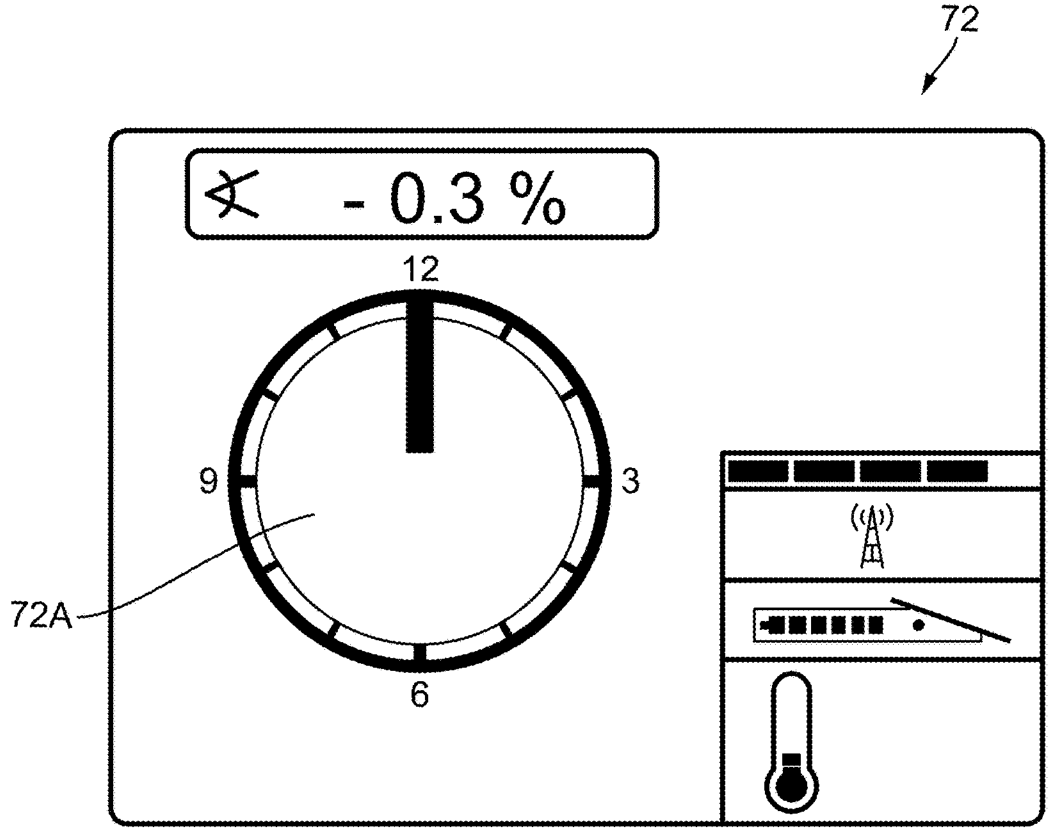
FIG. 12 is a schematic showing exemplary screen displays for STEP 1124A of the method of FIG. 5.
Figure 12:
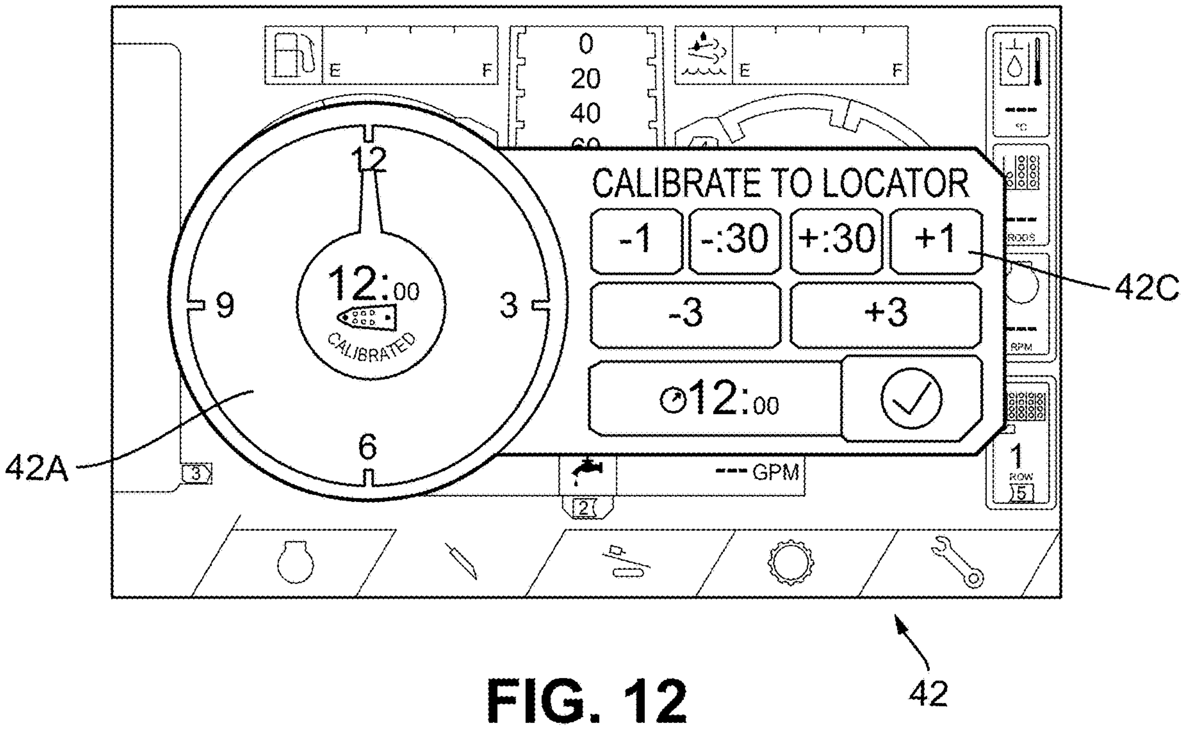

Once the DHPI 42A on the drill display 42 matches the DHP 72A on the locator display 72, or is similar enough, the on-machine operator uses the VDC 48 to confirm the DHPI 42A (STEP 1124A). FIG. 12 illustrates the on-machine operator confirming that the DHPI 42A matches the DHP 72A. The DHPI 42A on the drill display 42 and the DHP 72A on the locator display 72 are at the "12 o'clock" position.

The Auto Calibration Algorithm (ACA) (STEP 1226A) begins after the AMS process has been completed (STEP 1110A) and after the on-machine operator confirms the DHPI (STEP 1124A). The ACA is a control system that automatically updates the rotational calibration of the rotational position of the spindle 25 to equal the DHPI 42A on the drill display 42.

Figure 13:
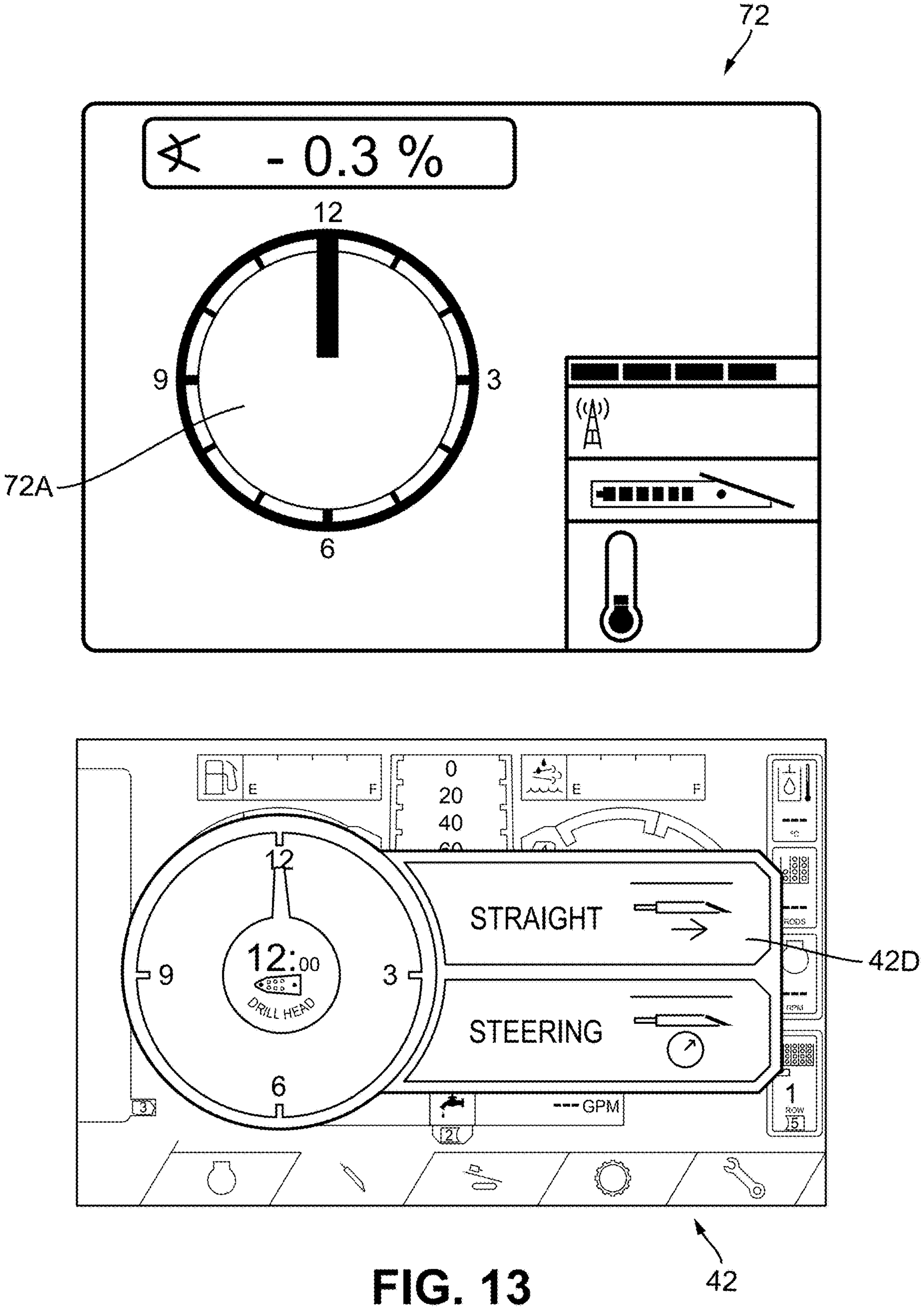
FIG. 13 is a schematic showing exemplary screen displays for STEP 1128A of the method of FIG. 5.

At STEP 1128A, the on-machine operator is prompted to decide if the next boring action will be straight or steering. FIG. 13 illustrates the prompt 42D for the on-machine operator to select "steering" or "straight". The on-machine operator can use the VDC 48 to select "steering" or "straight." If the on-machine operator selects "straight," the controller 40 of the drilling machine 10 sets to the straight mode (STEP 1130A). Then, the controller 40 modifies the display on the drill display 42 to show the standard rotational display (FIG. 6) (STEP 1132A) and the control process 1100A is complete. The controller 40 returns the drilling machine 10 to the normal drilling mode.

Figure 14:
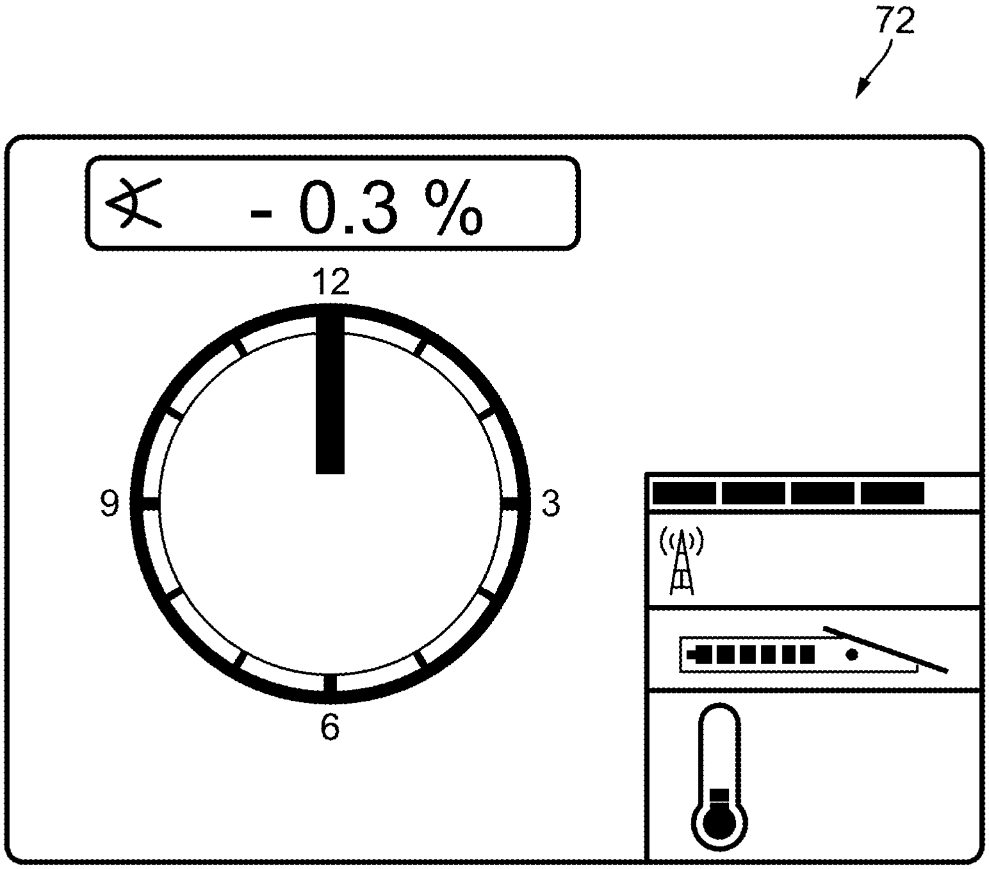
FIG. 14 is a schematic showing exemplary screen displays for STEP 1136A of the method of FIG. 5.
Figure 14:
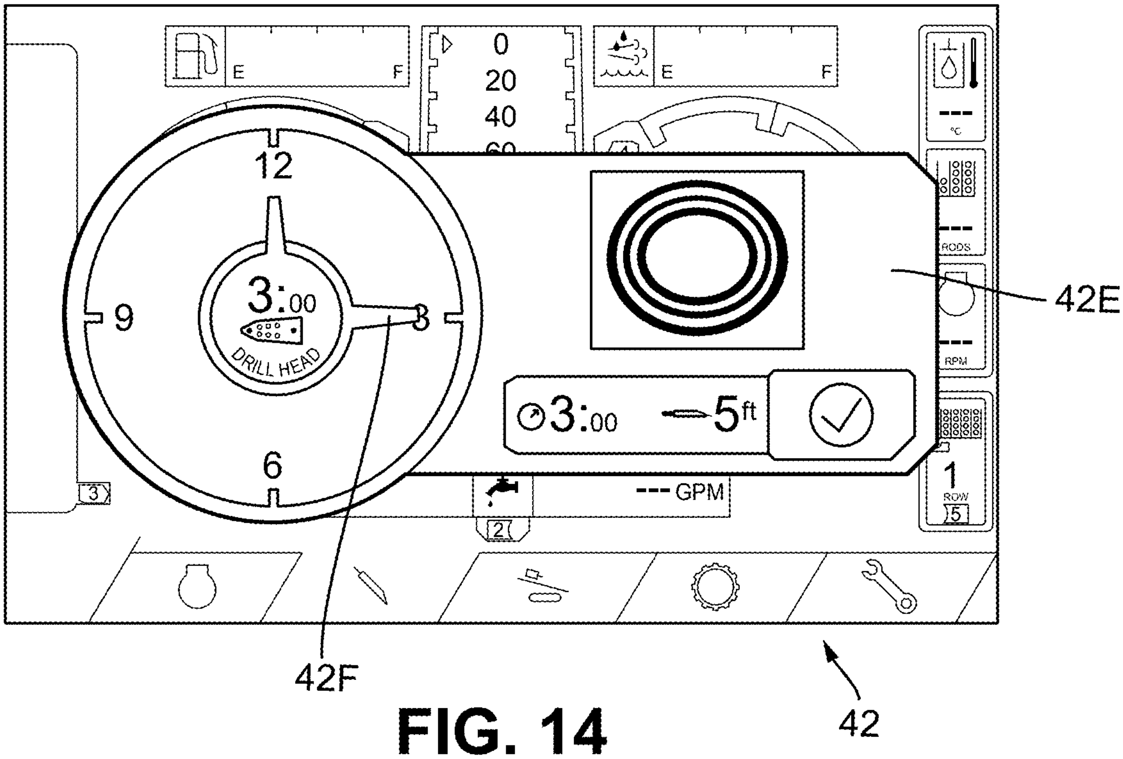
Figure 15:
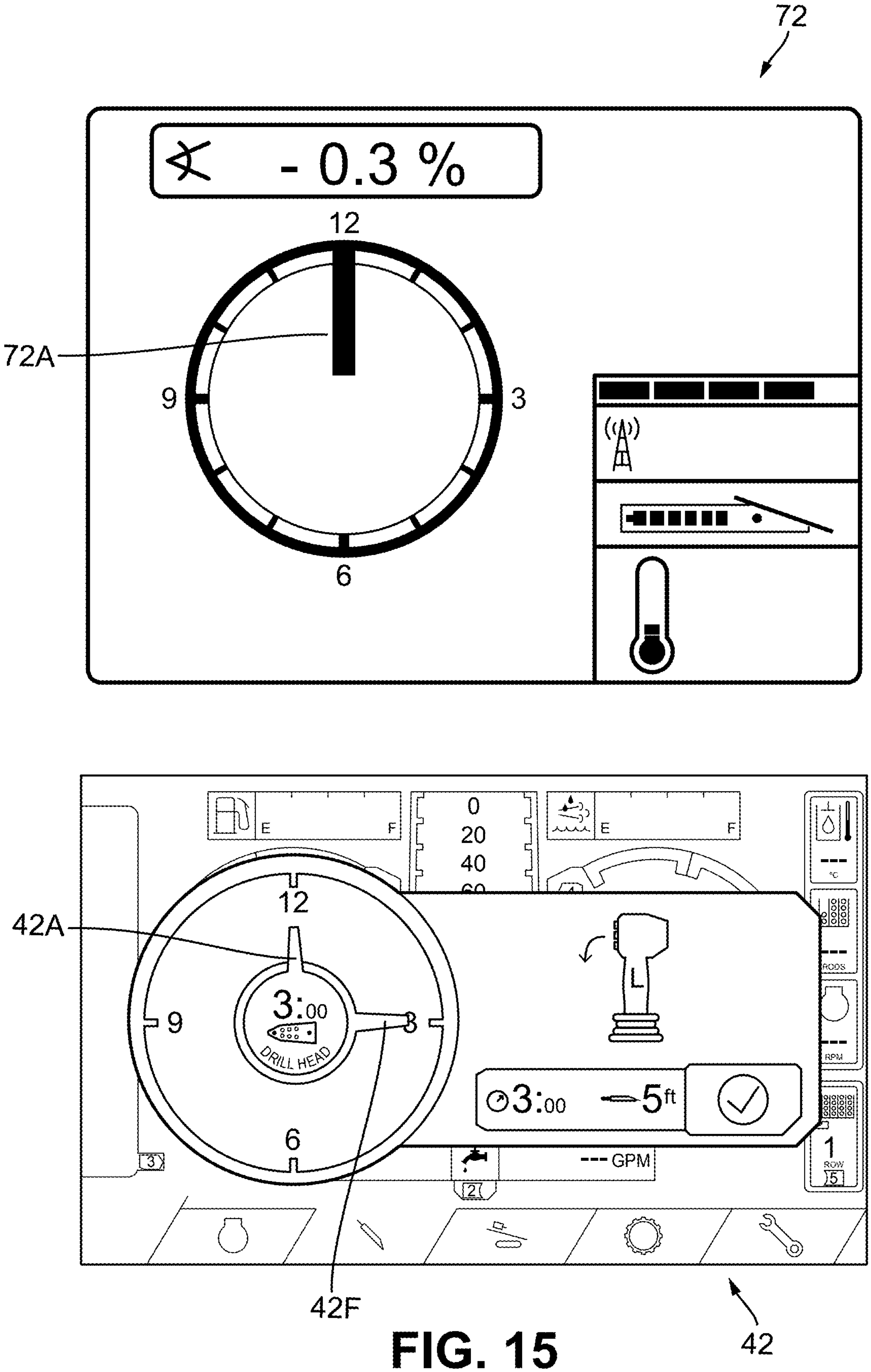
FIG. 15 is a schematic showing exemplary screen displays for STEP 1142A of the method of FIG. 5.
Figure 47:
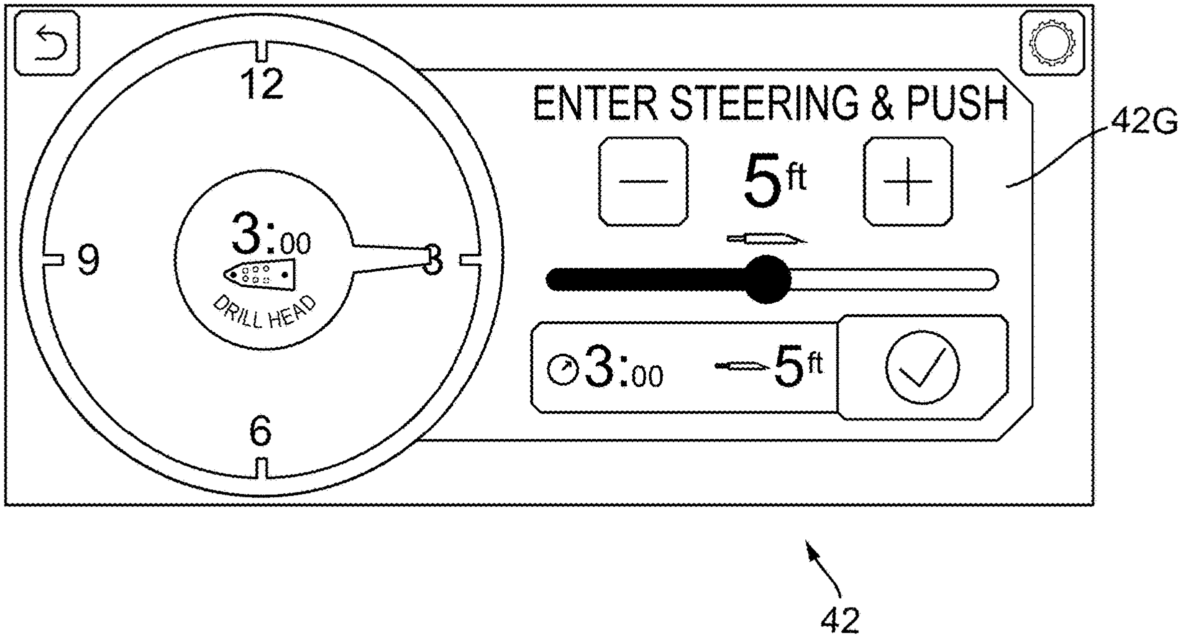
FIG. 47 is a schematic showing an exemplary screen display prompting an input for a target distance.

If the on-machine operator selects "steering," the on-machine operator is prompted to select the Target Steering Position (TSP) 42F (STEP 1136A). With reference to FIG. 47, the drill display 42 displays a prompt 42G for the on-machine operator to set the TSP 42F. FIG. 14 illustrates a confirmation prompt 42E on the drill display 42 for the on-machine operator to confirm the TSP 42F. At STEP 1140A, the on-machine operator uses the VDC 48 to select the TSP 42F. The on-machine operator selected the "3 o'clock" position as the TSP 42F. At STEP 1134A, the drill display 42 shows the on-machine operator that the rotation control mode is selected and the controller 40 will automatically stop at the TSP 42F. FIG. 15, illustrates the drill display 42 showing that the rotation control mode is selected. FIG. 15 also indicates to the on-machine operator that they need to move the rotation control to initiate the automatic rotation (STEP 1142). Said another way, the on-machine operator needs to move the first joystick 44 out of neutral (N) to initiate the automatic rotation. The automatic rotation ends when the DHPI 42A on the drill display 42 matches the TSP 42F. In some embodiments, a button, knob, the second joystick 46, or other device may be used instead of the first joystick 44.

Figure 16:
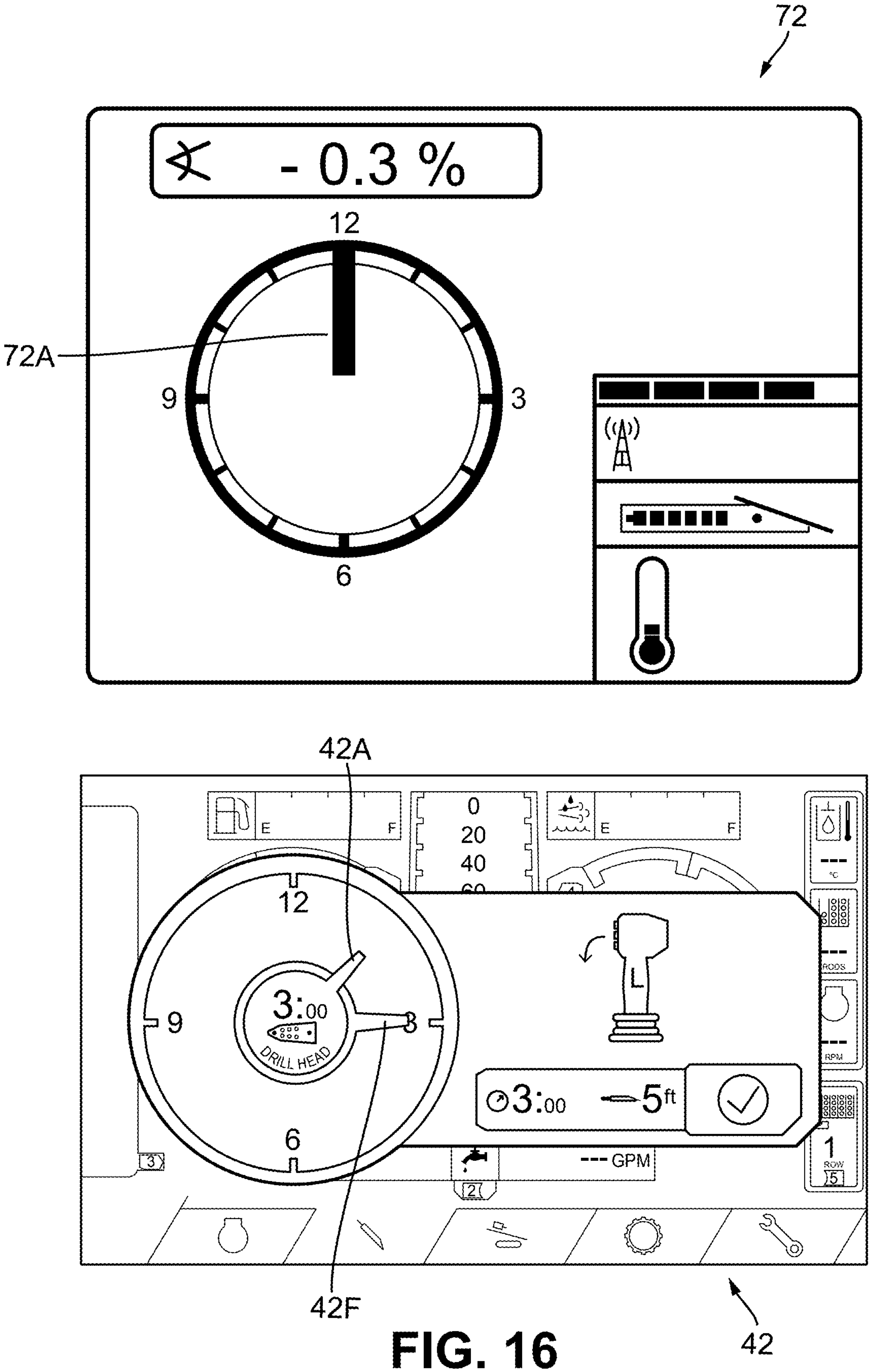
FIG. 16 is a schematic showing another exemplary screen displays for STEP 1142A of the method of FIG. 5.
Figure 17:
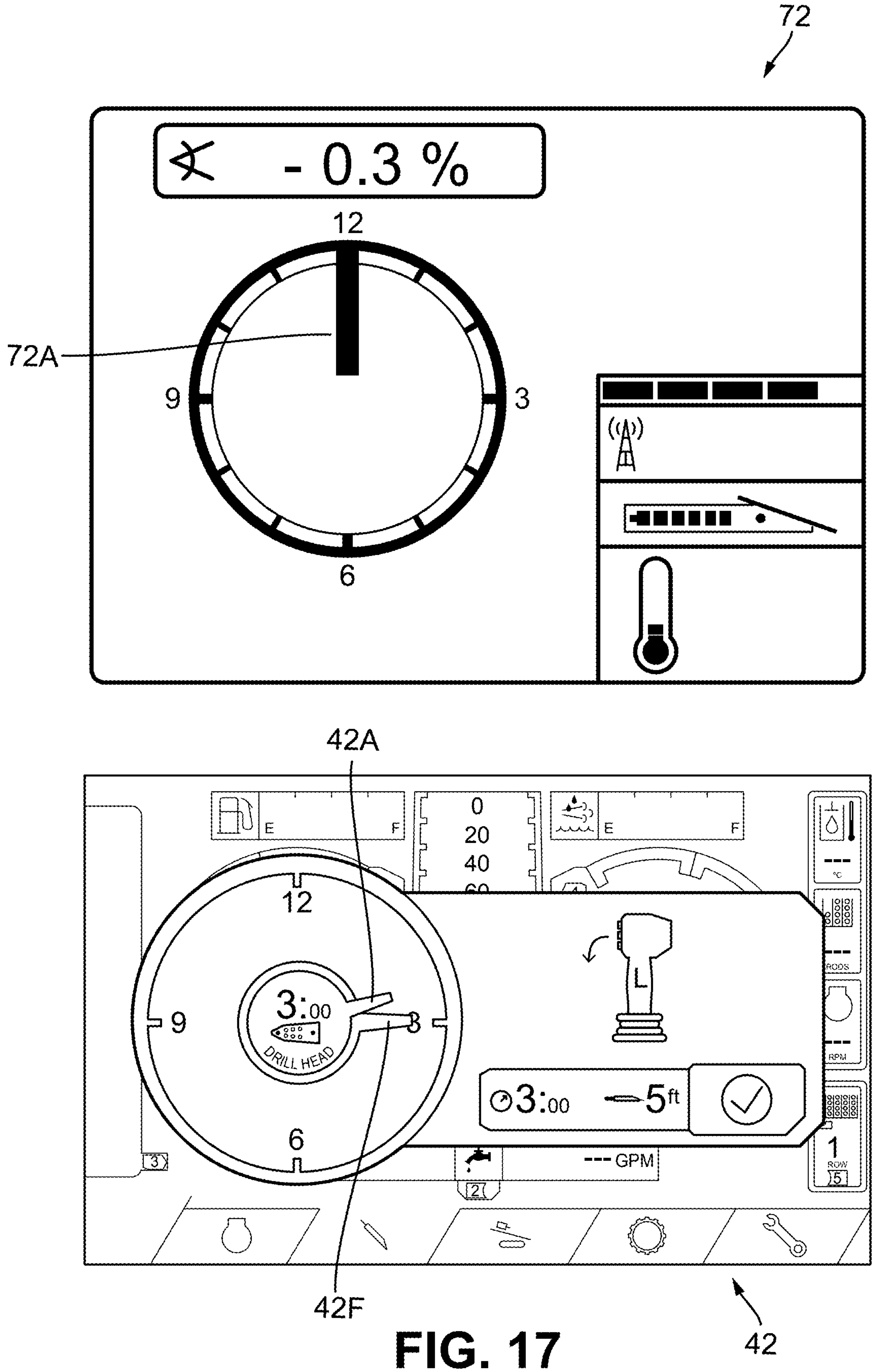
FIG. 17 is a schematic showing yet another exemplary screen displays for STEP 1142A of the method of FIG. 5.
Figure 18:
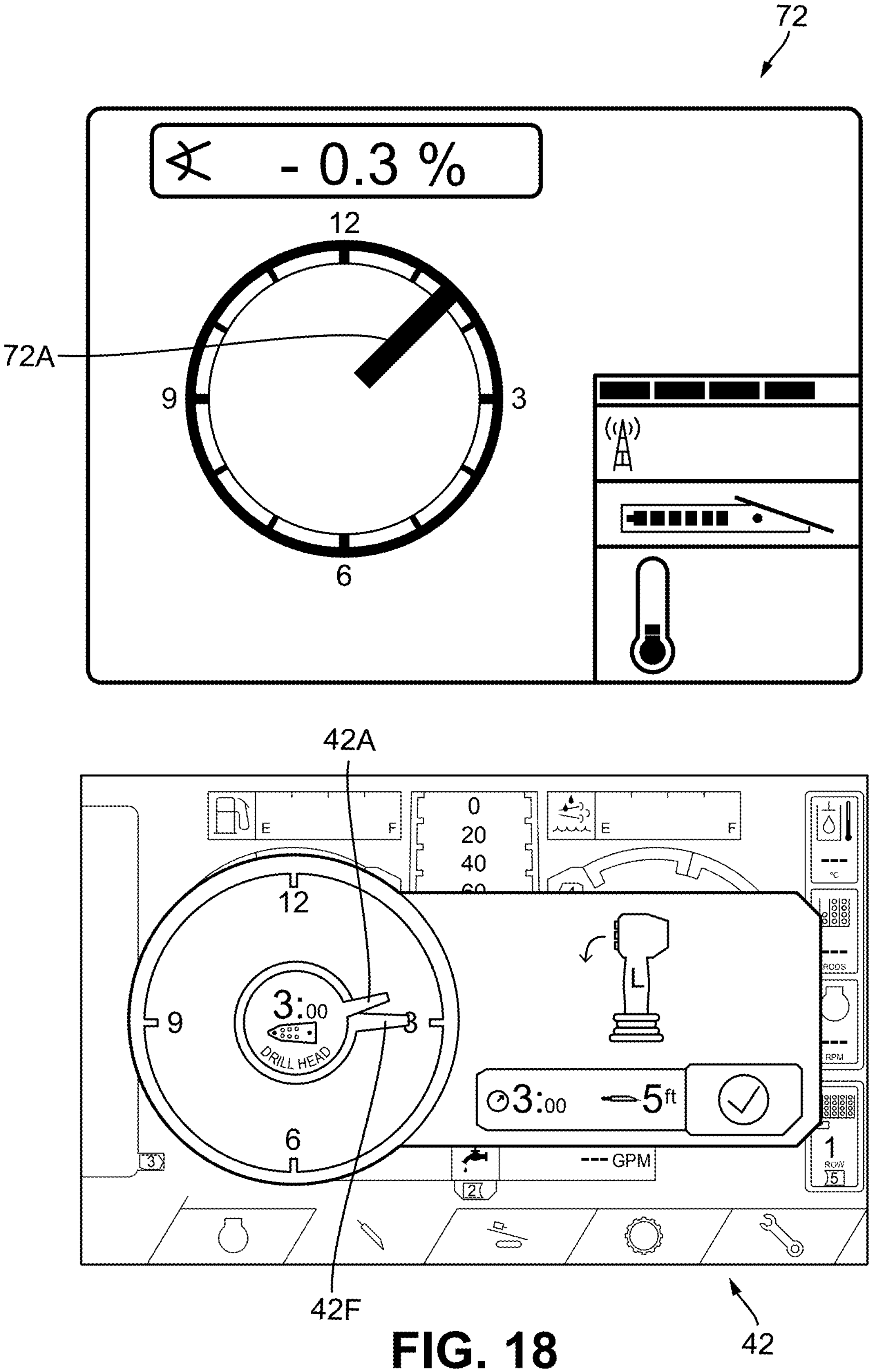
FIG. 18 is a schematic showing still another exemplary screen displays for STEP 1142A of the method of FIG. 5.

FIGS. 16-18 illustrate the locator display 72 and the drill display 42 during the steering process. The drill display 42 shows the DHPI 42A approaching the TSP 42F. The locator display 72 shows the measured position of the drill head 28 (e.g., the DHP 72A). The screen displays illustrate a delay between the movement of the drill head 28 shown on the drill display 42 and the measured position of the drill head 28 shown on the locator display 72. For example, FIG. 18 shows the DHPI 42A on the drill display 42 to be at the "2:45" clock position while the DHP 72A is at the "1:30" clock position. There will typically be a difference between the DHPI 42A and the DHP 72A for a short period of time (variable, sometimes less than a second, sometimes by up to 5 seconds) after the drill head 28 rotates, due to delayed measurement response.

At STEP 1144A, the controller 40 reconfirms that the on-machine operator has previously approved the signal 72B. If the signal has not been approved, STEP 1132A is initiated such that the calibration method 1100A can be restarted. If the signal has been approved, STEP 1146A is initiated.

Figure 20:
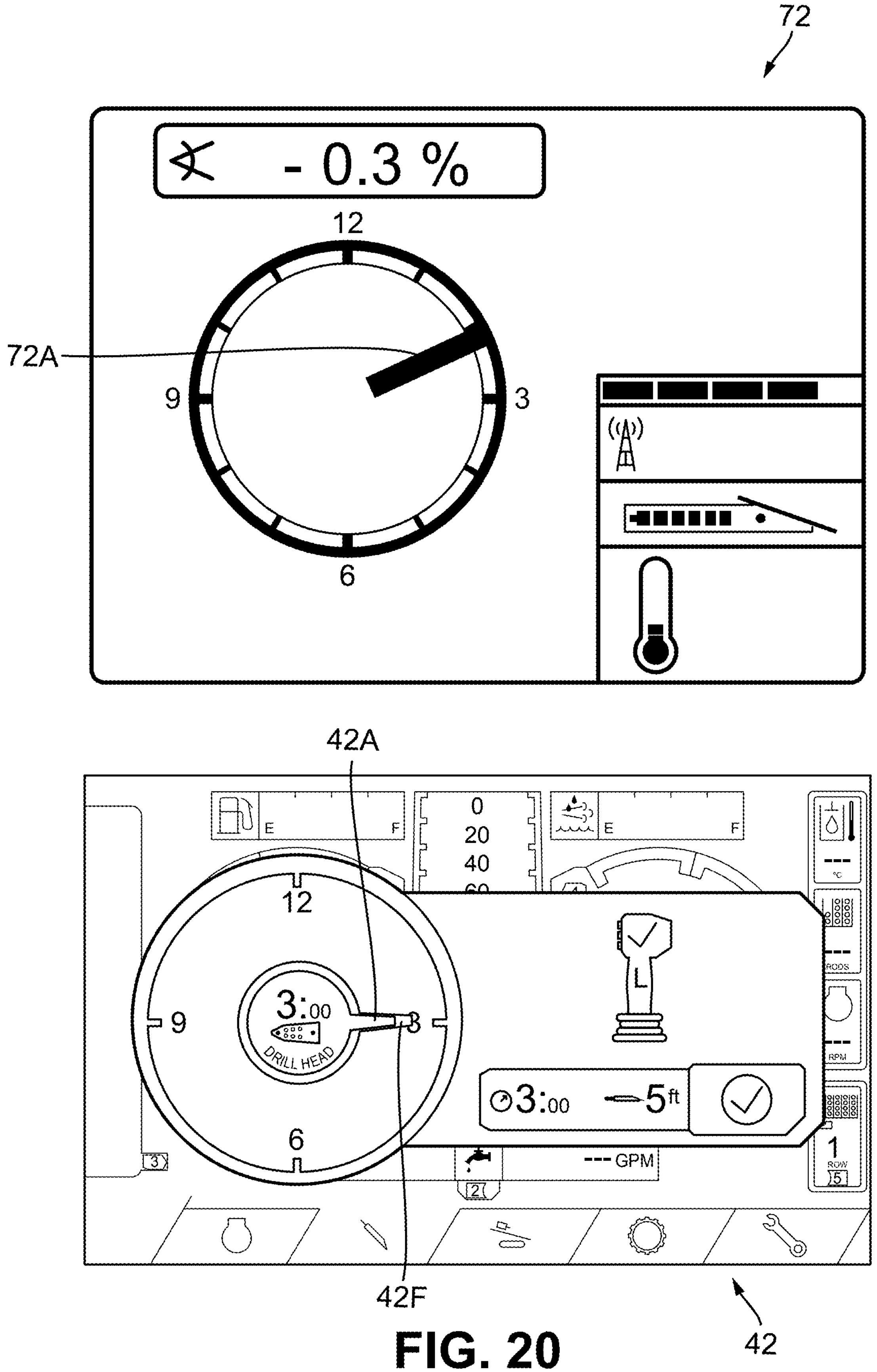
FIG. 20 is a schematic showing exemplary screen displays for STEP 1152A of the method of FIG. 5.

At STEP 1146A, the on-machine operator confirms that the DHPI 42A on the drill display 42 matches the DHP 72A on the locator display 72. If the DHPI 42A does not match the DHP 72A, as shown in FIG. 20, the on-machine operator can turn the dial of the VDC 48 to move the DHPI 42A on the drill display 42 to match the DHP 72A on the locator display 72 (STEP 1152A).

Figure 19:
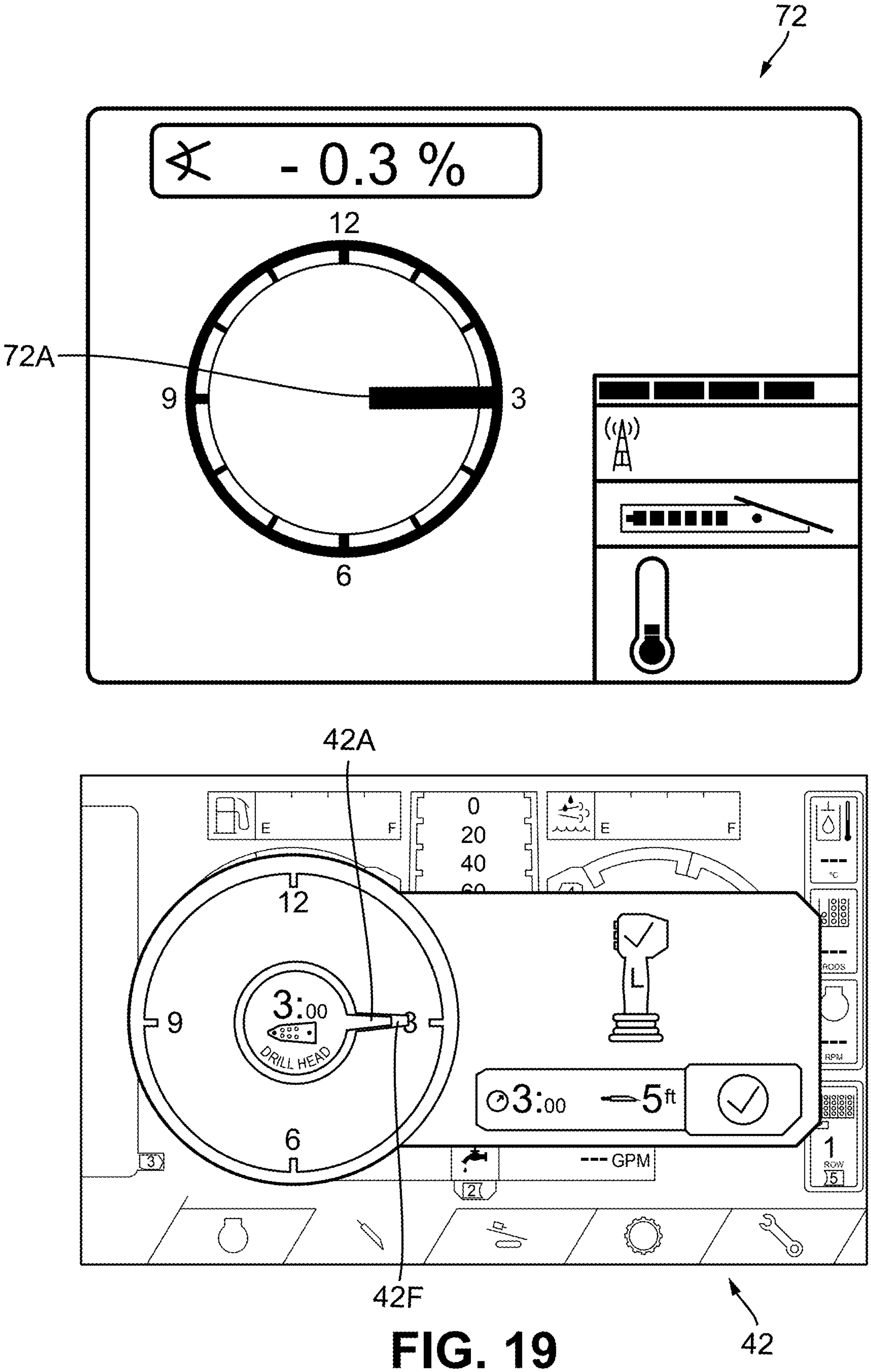
FIG. 19 is a schematic showing exemplary screen displays for STEP 1132A of the method of FIG. 5.

Once the DHPI 42A on the drill display 42 matches the DHP 72A on the locator display 72, as shown in FIG. 19, the on-machine operator confirms that the DHPI 42A matches the TSP 42F on the drill display 42. If the DHPI 42A matches the TSP 42F, STEP 1132A is initiated and the method 1100A is completed. Additionally, the controller 40 stops the drilling machine 10 from rotating when DHPI 42A matches the TSP 42F.

In addition to setting a steering amount, in some embodiments, the on-machine operator may be prompted to set a target distance or amount (e.g., 1 ft, 5 ft, 6 ft, etc.) the drill head 28 should be pushed or moved underground after the drill head 28 is rotated to the proper steering orientation. FIG. 47 illustrates the prompt 42G for setting the target distance on the drill display 42. The on-machine operator can use the VDC 48 to set the target distance. The drill display 42 shown in FIG. 14 displays a confirmation prompt 42E that allows the on-machine operator to confirm that the target distance has been set for 5 ft, for example. Once the drill head 28 has been rotated to the TSP, the controller 40 controls, or manages, the thrust mechanism 30 to automatically move the drill head 28 the target distance in response to an input from the on-machine operator (e.g., moving the first joystick 44 out of neutral). The controller 40 may use sensors on the drilling machine 10 to determine when the target distance is achieved. While the drilling machine 10 is pushing the drill head 28 the target distance, the drill display 42 may show a progress bar to the on-machine operator showing the position of the drill head 28. Additionally, during movement to the target distance, the controller 40 may modify the display on the drill display 42 to show the standard rotational display (FIG. 6) (STEP 1132A) with the updated translational position of the rotational driver 24 along the track 22. After the drill head 28 has been moved the target distance, the controller 40 automatically stops the thrust mechanism 30 from pushing the drill head 28 and the control process 1100A is complete. Moving the drill head 28 to a target distance, rather than moving the drill head 28 a full rod length, may be useful when the drill head 28 is near an obstacle and the operators want more precision and control of the drill head 28.

The on-machine operator may also be prompted to set a target distance to move the drill head 28 if "straight" is selected at STEP 1128A/1130A. The operation is the same as described above for use in conjunction with steering.

If the DHPI 42A does not match the TSP 42F, STEP 1150A is initiated. The DHPI 42A may not match the TSP 42F when there is significant torsional deflection of the drill rod. STEP 1150A includes displaying a prompt to the on-machine operator that additional steps are required to position the drill head 28. The additional steps could include automatic/coordinated longitudinal movement to reduce the frictional drag.

Although the calibration method 1100A is described in sequential steps, it will be appreciated that some of the steps may be completed in a different order, some of the steps may be completed simultaneously, and some of the steps may be omitted.

The method 1100A allows the desired drill head orientation to be achieved with the controller 40 and the control system 41 at least as quickly as the desired drill head orientation could be achieved with manual control. By allowing the controller 40 to automatically stop rotation at the desired rotational position (e.g., the TSP) this will eliminate the need for an operator to develop associated skill(s).

The method 1100A illustrates how the drill head 28 can be positioned in preparation for making a steering correction after a new rod is added to the drill string 14. In an alternative embodiment, a system architecture can be developed that would allow an operator to stop boring, check the rotational calibration, then select a target clock position, before enabling the machine to rotate to that specific clock position in a process that does not include the step of adding a drill rod. This would allow for a mid-rod steering correction. The method 1100A illustrates the method of adding a drill rod occurring simultaneously with positioning the drill head. The two processes, adding a drill rod and positioning the drill head, can be utilized separately/independently. If the positioning process is implemented separately from the process of adding a drill rod, the process will include the step of verifying the reliability/accuracy of the drill head position data.

During drilling performed with a mud motor, the downhole motor that is powered by the flow of drilling fluid, generating torque to rotate the drill bit, there is significant torsional deflection of the drill rod. In some cases, the torque generated by the mud motor may change the position of the up-hole end of the drill string 14. In that case, the DHPI 42A and the DHP 72A may both change, and drift away from the TSP 42F. In other cases, the drill string 14 could deflect, and the clock position of the drill head 28 could change, while the position of the up-hole end of the drill string 14 does not change. In this situation, the DHP 72A would change while the DHPI 42A would not change. To help combat this issue, the drill display 42 may be updated to make it easier for the operator, and/or draw the operator's attention to, to monitor the comparison between DHPI, DHP and TSP, potentially giving priority to comparing the DHP to the TSP during the method 1100A.

In some embodiments the assessment of the reliability of the measured drill head position data could include control system algorithms as an alternative to prompting the operator for that assessment.

Figure 21:
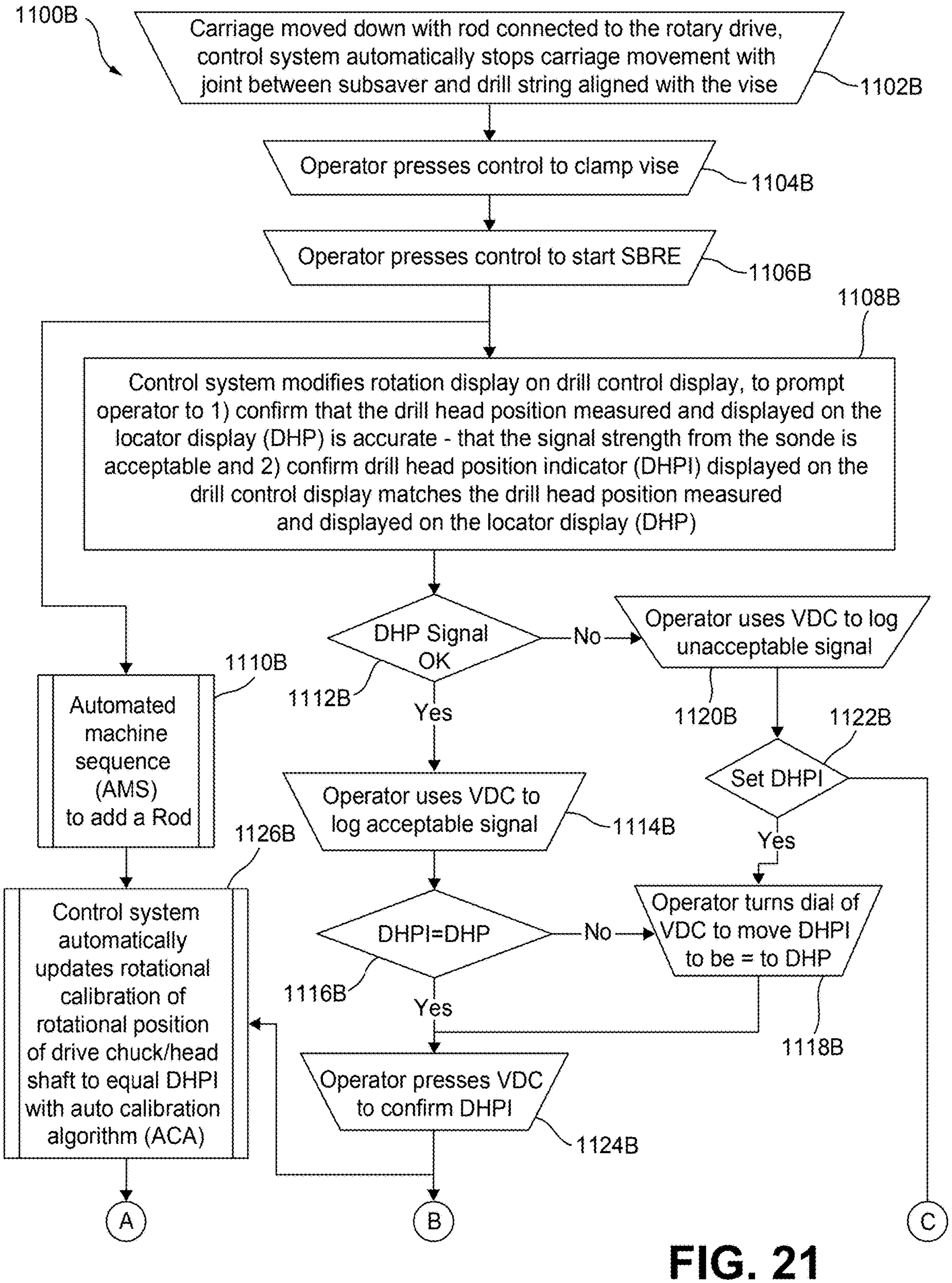
FIG. 21 is another flow chart illustrating a calibration method for the horizontal drilling control system of FIG. 3 according to an embodiment of the disclosure.
Figure 21:
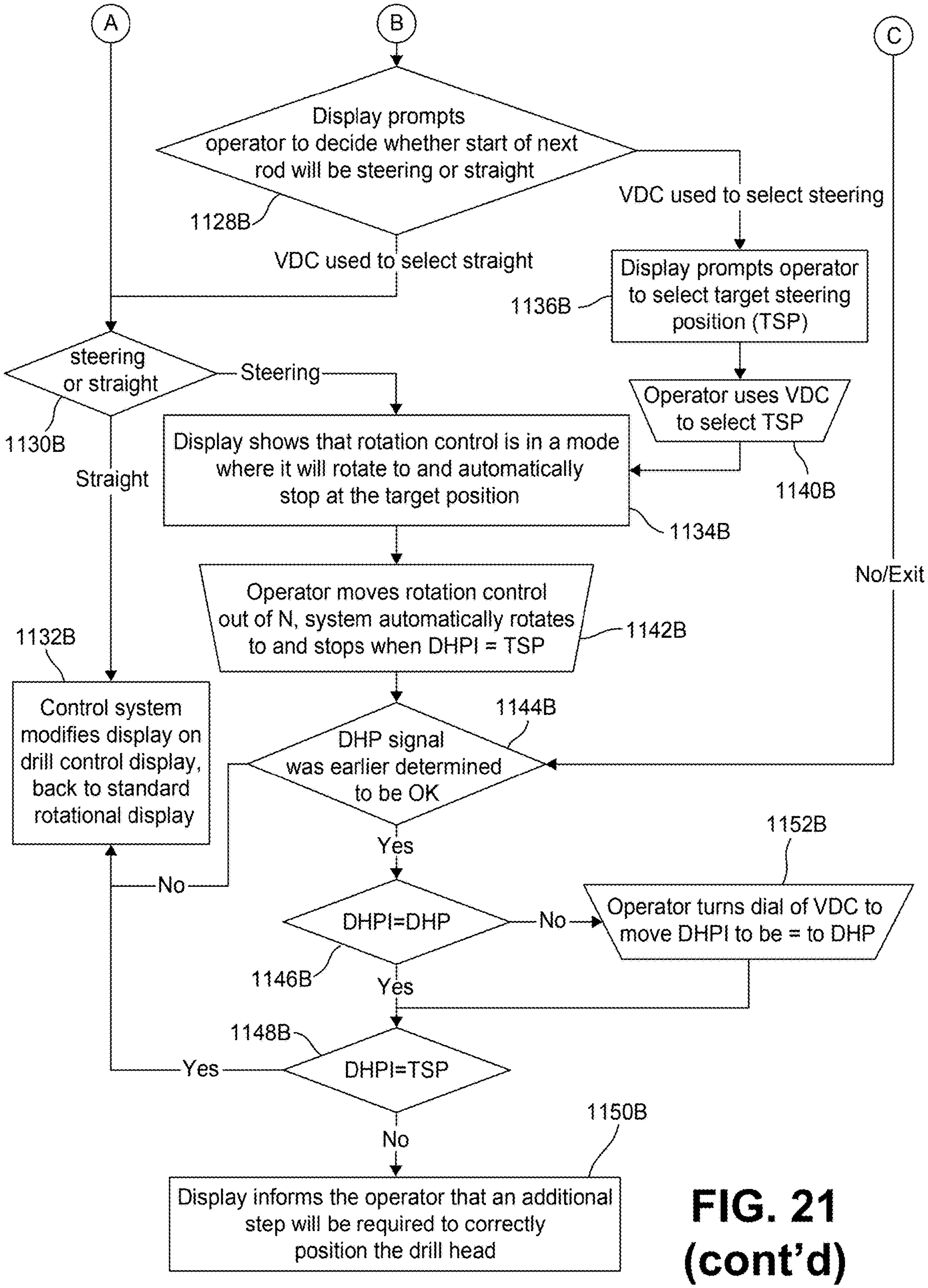

FIG. 21 illustrates a method 1100B for calibrating an estimated position of the drill head 28 to the clock position of the drill head 28. The method 1100B is similar to the method 1100A (FIG. 5), but the method 1100B includes the option to exit the method when the signal 72B from the transmitter 60 is unacceptable. Many of the steps of the method 1100B are similar to the steps of the method 1100A. Accordingly, the preceding description and drawings are relied upon for a disclosure of the steps that might not be described in detail here.

Figure 22:
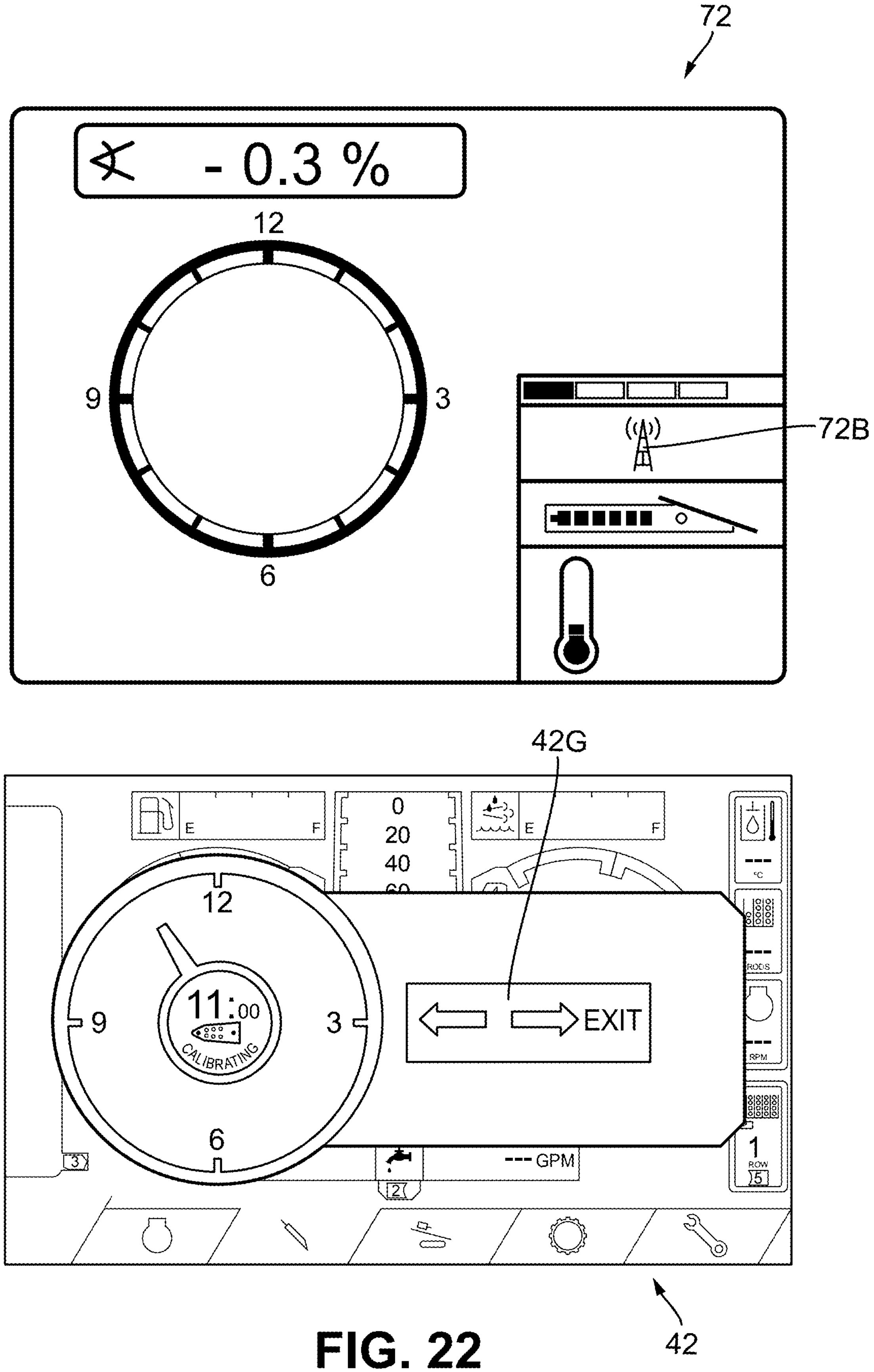
FIG. 22 is a schematic showing exemplary screen displays for STEP 1122B of the method of FIG. 21.
Figure 23:
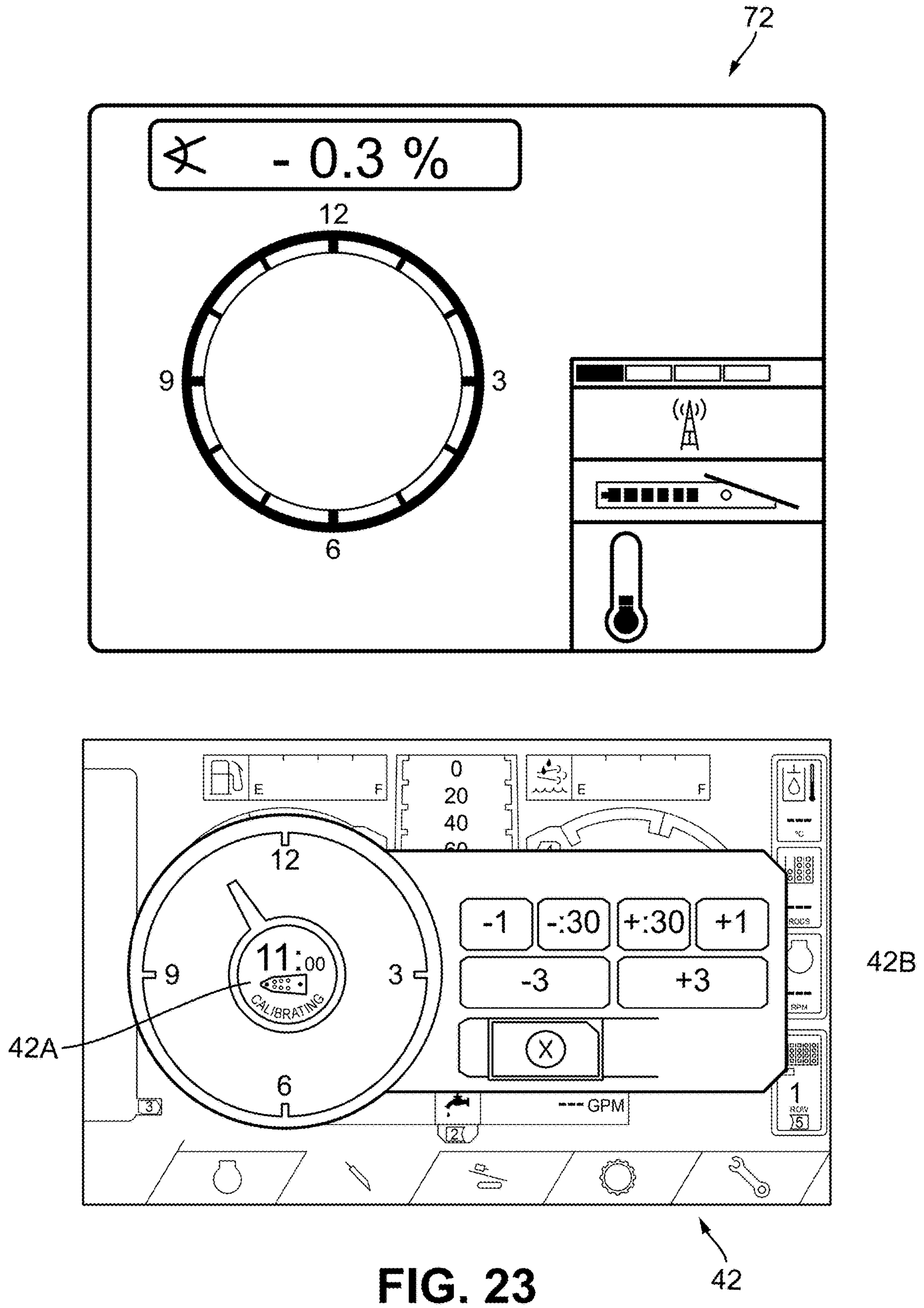
FIG. 23 is a schematic showing exemplary screen displays for STEP 1118B of the method of FIG. 21.

The method 1100B includes additional steps for dealing with an unacceptable signal from the transmitter 60. At STEP 1120B, the on-machine operator uses the VDC 48 to log the unacceptable signal. At STEP 1122B, the on-machine operator has the opportunity to set the DHPI 42A. If the on-machine operator does not want to set the DHPI 42A, the STEP 1144B is initiated such that the method 1100B can be ended/exited. FIG. 22 shows the prompt 42G on the drill display 42 for exiting the calibration process. If the on-machine operator wants to set the DHPI 42A, the on-machine operator uses the VDC 48 to set the DHPI 42A to be the same as the DHP 72A (STEP 1118B), as shown in FIG. 23.

Figure 24:
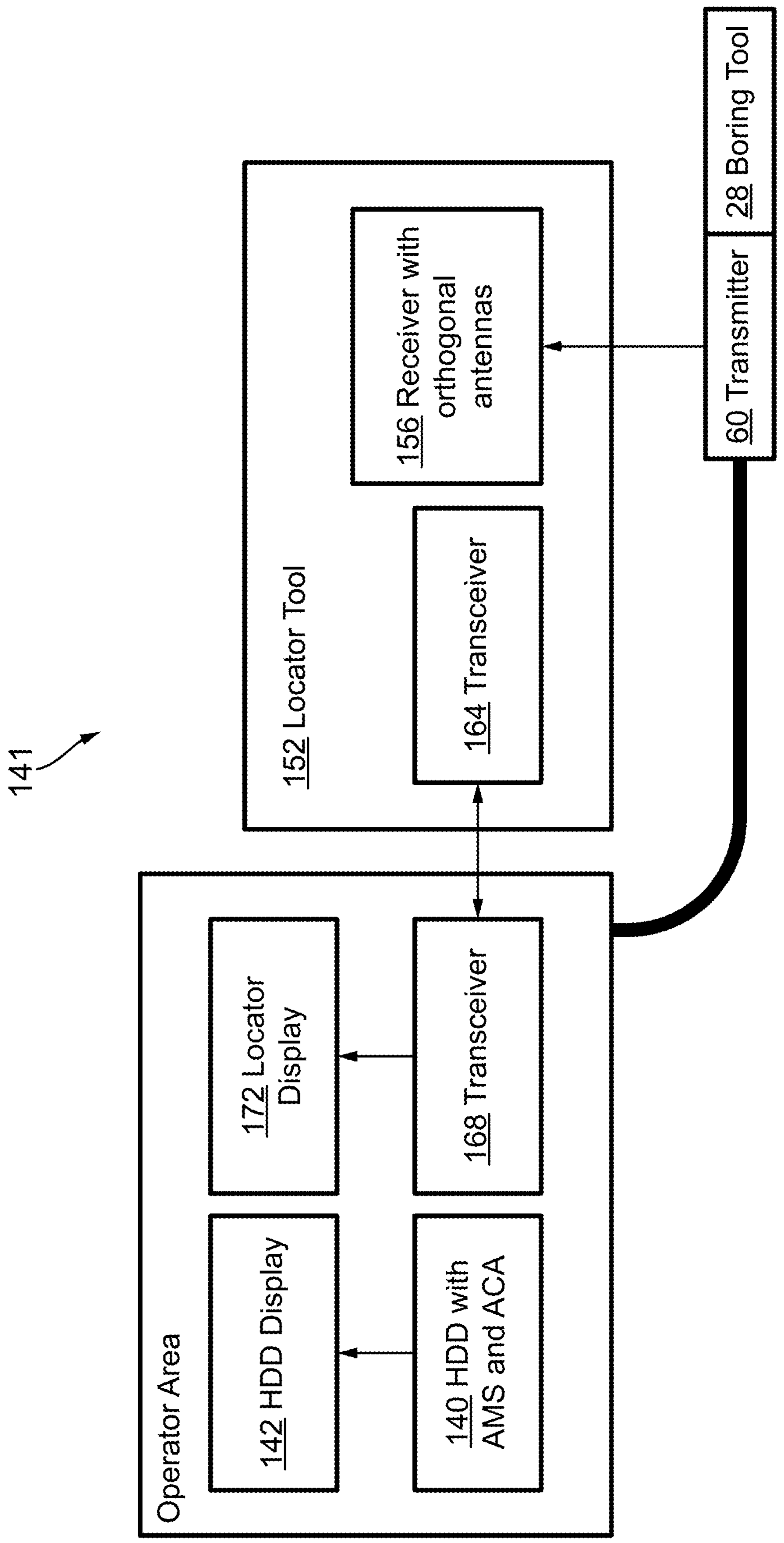
FIG. 24 is another schematic of the system architecture of the horizontal directional drilling control system of FIG. 3 according to an embodiment of the disclosure.
Figure 25:
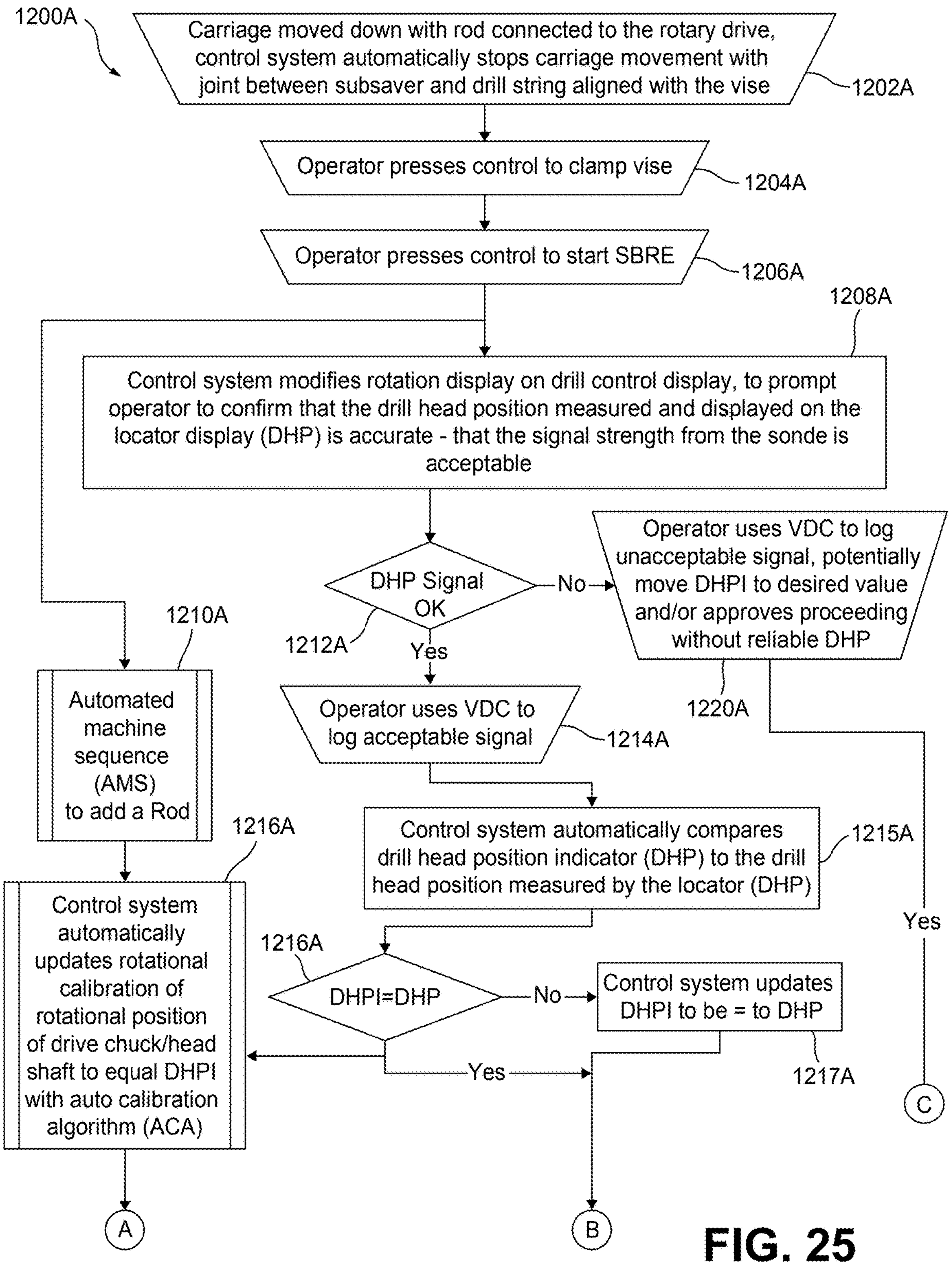
FIG. 25 is a flow chart illustrating a calibration method for the horizontal drilling control system of FIG. 3 and the system architecture of FIG. 24 according to an embodiment of the disclosure.
Figure 25:
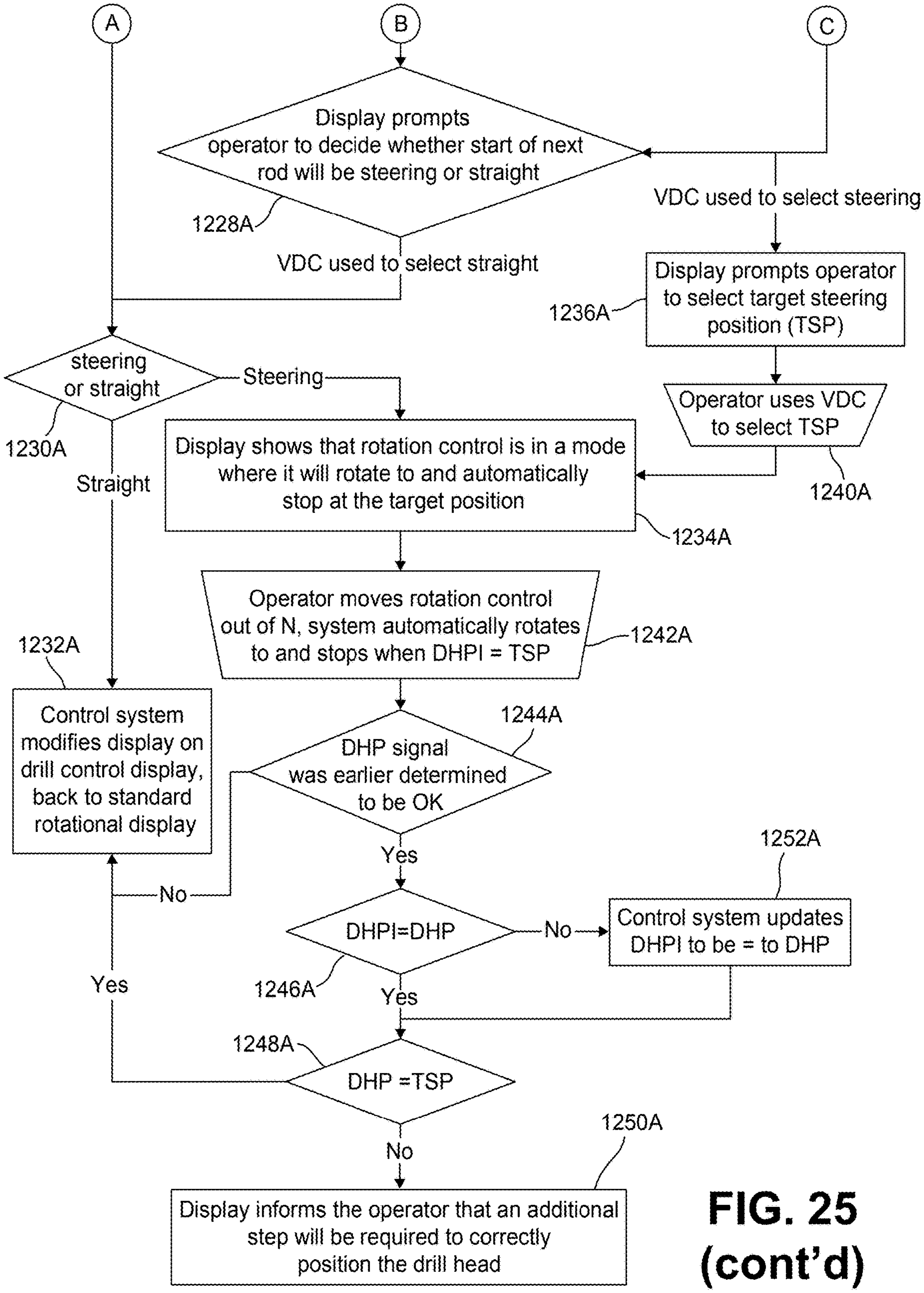

FIGS. 24-25 illustrate a control system 141 and a method 1200A for calibrating the estimated position of the drill head 28 to the clock position of the drill head 28. The control system 141 and the method 1200A are similar to the control system 41 (FIG. 4) method 1100A (FIG. 5), but the control system 141 is integrated such that the method 1200A allows for automatic calibration. Many of the steps of the method 1200A are similar to the steps of the method 1100A and, many of the features of the control system 141 are similar to the features of the control system 41. Accordingly, the preceding description and drawings are relied upon for a disclosure of the steps and features that might not be described in detail here.

FIG. 24 illustrates the system architecture of the control system 141. The control system 141 includes the drill head 28 having the transmitter 60, a locator tool 152, and an operator area having a drill display 142 and a locator display 172. The locator tool 152 includes a receiver 156 that is configured to receive information from the transmitter 60 and a transceiver 164 that is configured to communicate with the transceiver 168 of the locator display 172. The drill display 142 is configured to communicate with the controller 140. The system architecture of the control system 141 is similar to the system architecture of the control system 41, but the control system 141 allows the controller 140 to communicate with the transceiver 168 of the locator display 172 such that the controller 140 can communicate with the locator tool 152. For example, the drill head 28 clock position data as generated by the locator tool 152 is available to the controller 140.

FIG. 25 illustrates a method 1200A for calibrating an estimated position of the drill head 28 to the clock position of the drill head 28. The method 1200A includes calibrating the data from the drilling machine 10, which is displayed on the drill display 142, with the data from the locator tool 152, which is displayed on the locator display 172. The method 1200A further includes automatically moving the drill head 28 to a desired position. The method 1200A is an automatic calibration method that includes a first operator (e.g., an on-machine operator) located at the operator area and a second operator (e.g., a locator tool operator) that is positioned away from the drilling machine 10 and is at the location above the drill head 28. During the method 1200A, the drill display 142 shows the on-machine operator prompts that make it easier to control the drill head orientation by allowing the controller 140 to rotate the drill head 28 to a specified orientation. During the method 1200A, the on-machine operator will consider data generated by the drill head locating system 1152, interact with data on the drill display 142 from the controller 140, to enable the controller 140 to automatically rotate the drill head 28 to a desired location. Additionally, the controller 140 will automatically recalibrate the DHPI.

The method 1200A is similar to the method 1100A, such that only the differences will be discussed in detail. Several of the functions in 1100A that require input from the on-machine operator are now done automatically with the controller 140. However, the on-machine operator still needs to confirm the signal of the transmitter 60 is acceptable (STEP 1208A) and still selects the Target Steering Position (STEP 1240A). In some embodiments, the controller 140 can include algorithms which assesses the reliability of the data from the locator tool 152. In some embodiments, the controller 140 uses artificial intelligence to determine the reliability of the data from the locator tool 152 and if it is acceptable for use.

The method 1200A includes new STEP 1215A, which is initiated once the on-machine operator approves the signal of the transmitter 60. At STEP 1215A, the controller 140 automatically compares the drill head position indicator (DHPI) with the drill head position (DHP) measured by the locator tool 152. Additionally, at STEP 1217A, the controller 140 automatically updates the DHPI to match the DHP if at STEP 1215A they were not the same or not within a certain range of each other (e.g., within 5%). The controller 140 repeats this automatic recalibration process, as needed, at STEP 1252A.

The controller 140 can automatically alert the on-machine operator and prompt some type of follow-up action, if the DHP or the DHPI changes relative to the TSP. As explained above, this is a common issue during when there is significant torsional deflection of the drill rod.

In some embodiments, the control system 141 includes a remote device. The remote device is configured to provide a command to rotate the drill head 28 through a specific angle. The method to control the drill head 28 would include: observing of the existing drill head orientation from the locator tool 152; deciding what the target orientation, TSP, is; and calculating an angle through which the drill head 28 needs to be rotated in order to arrive at the TSP.

Figure 26:
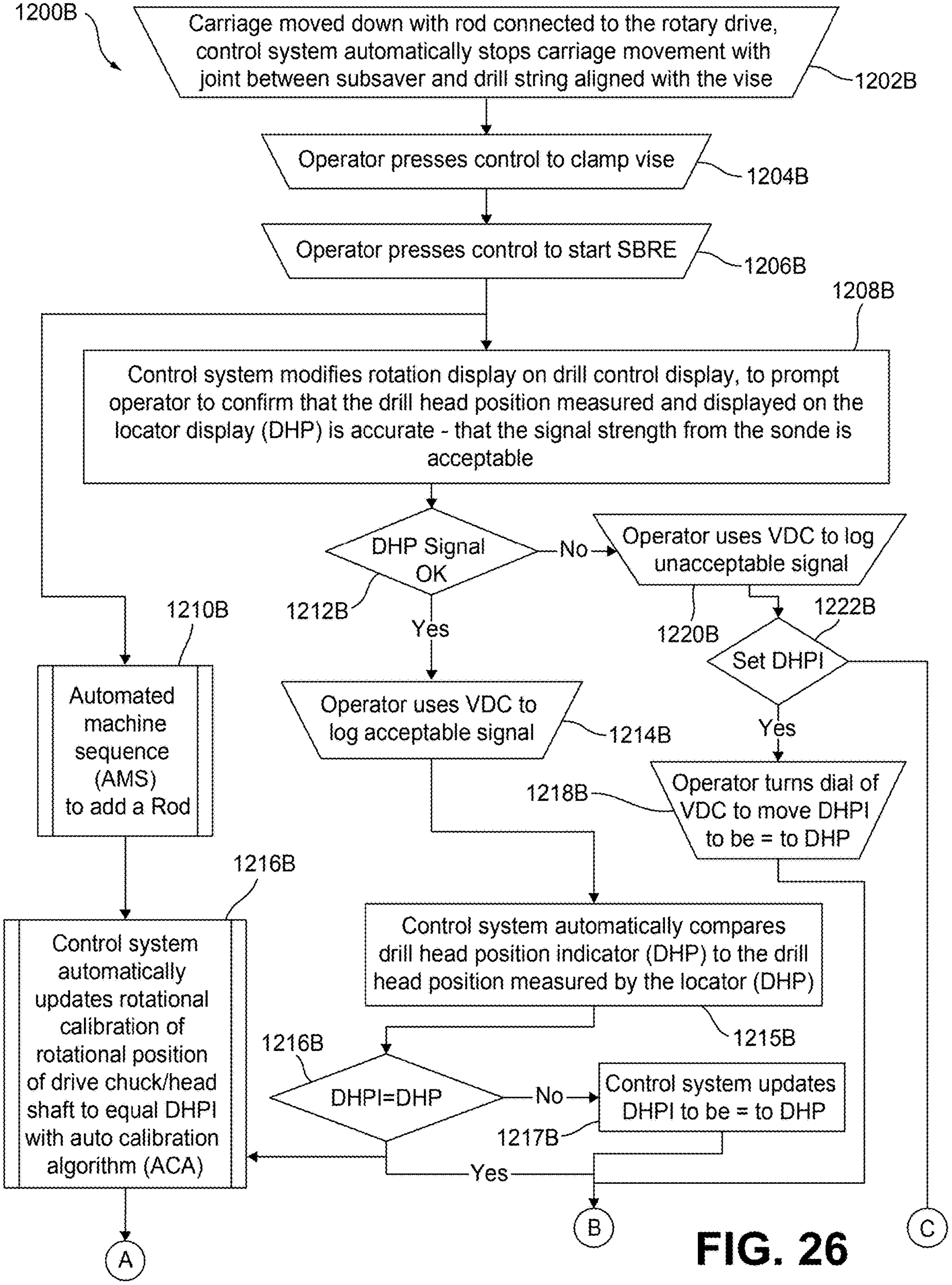
FIG. 26 is another flow chart illustrating a calibration method for the horizontal drilling control system of FIG. 3 and the system architecture of FIG. 24 according to an embodiment of the disclosure.
Figure 26:
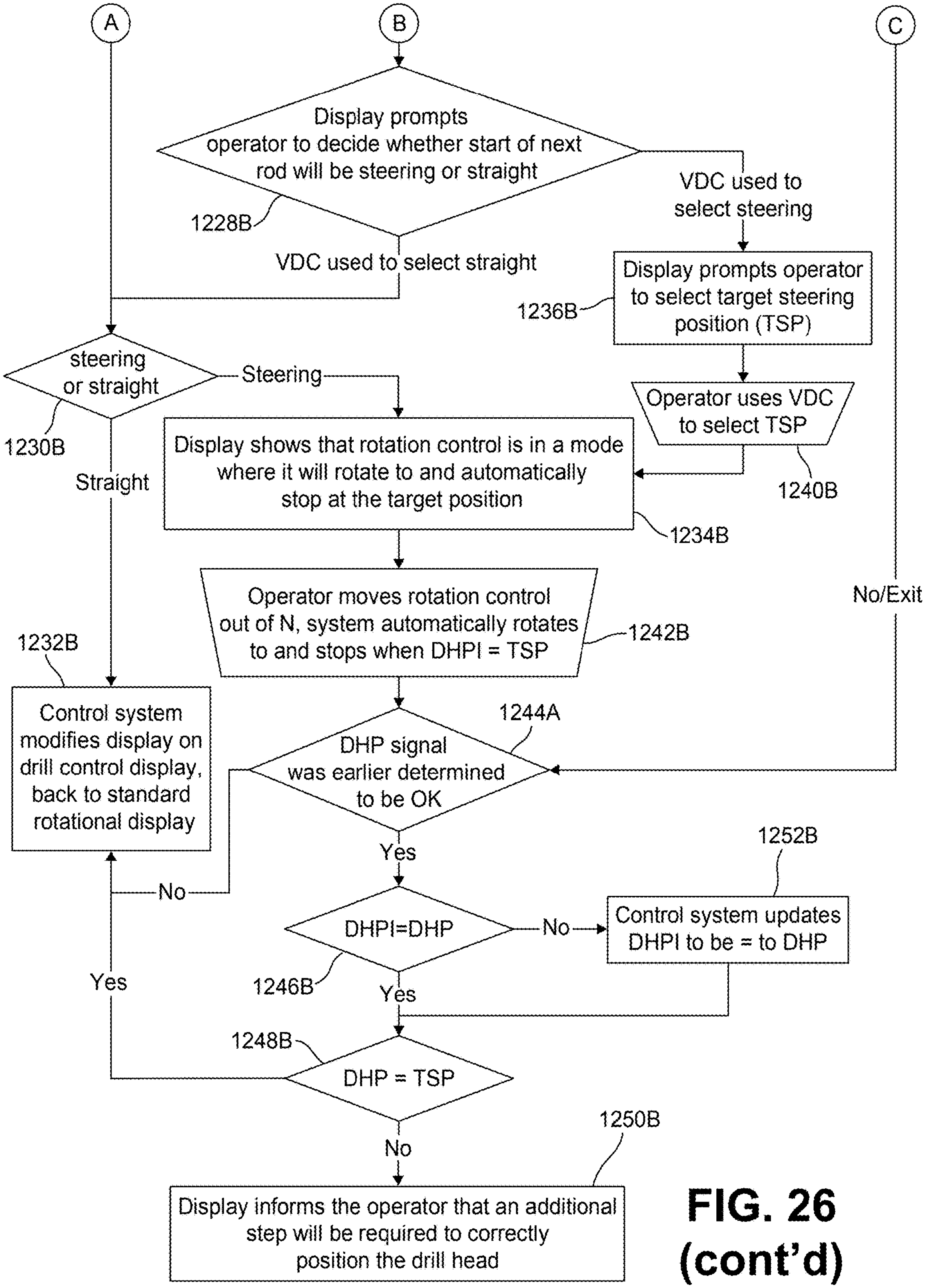

FIG. 26 illustrates a method 1200B for calibrating the estimated clock position of the drill head to the measured clock position of the drill head 28. The method 1200B is similar to the method 1200A (FIG. 25), but the method 1200B includes the option to exit the method when the signal from the transmitter 60 is unacceptable. Many of the steps of the method 1200B are similar to the steps of the method 1200A. Accordingly, the preceding description and drawings are relied upon for a disclosure of the steps that might not be described in detail here.

The method 1200B includes additional steps for dealing with an unacceptable signal from the transmitter 60. The method 1200B includes STEPS 1220B, 1222B, and 1218B which are similar to STEPS 1120B, 1122B, and 1118B of method 1100B (FIG. 21). Accordingly, these STEPS will not be discussed in detail.

Figure 27:
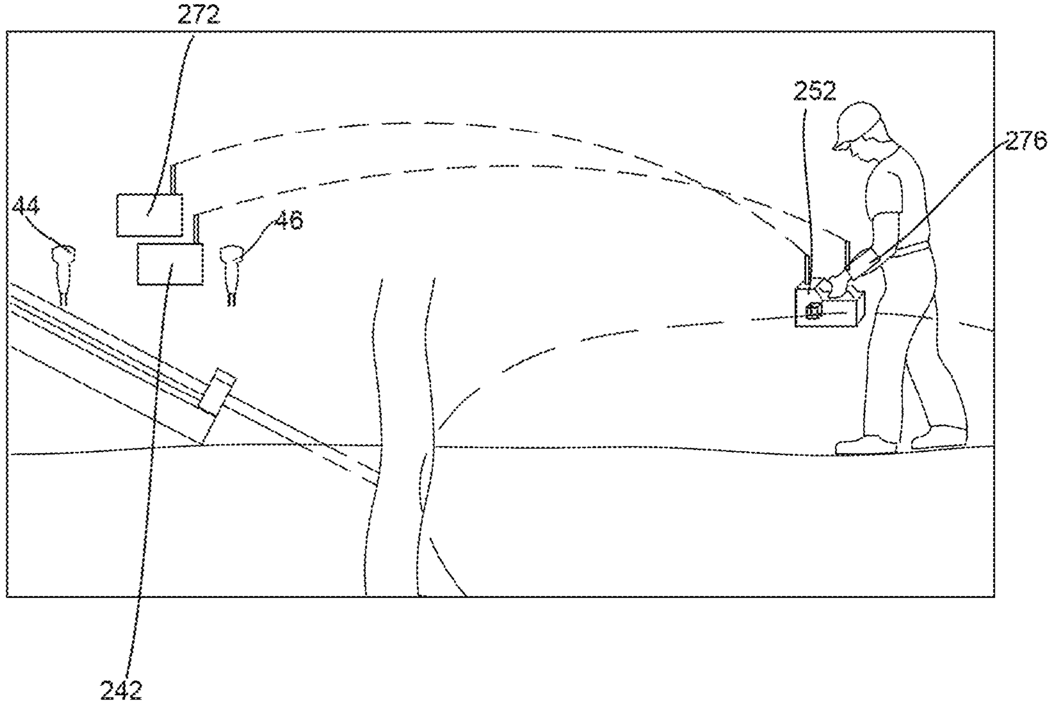
FIG. 27 is a schematic of a horizontal directional drilling system control system according to an embodiment of the disclosure.
Figure 28:
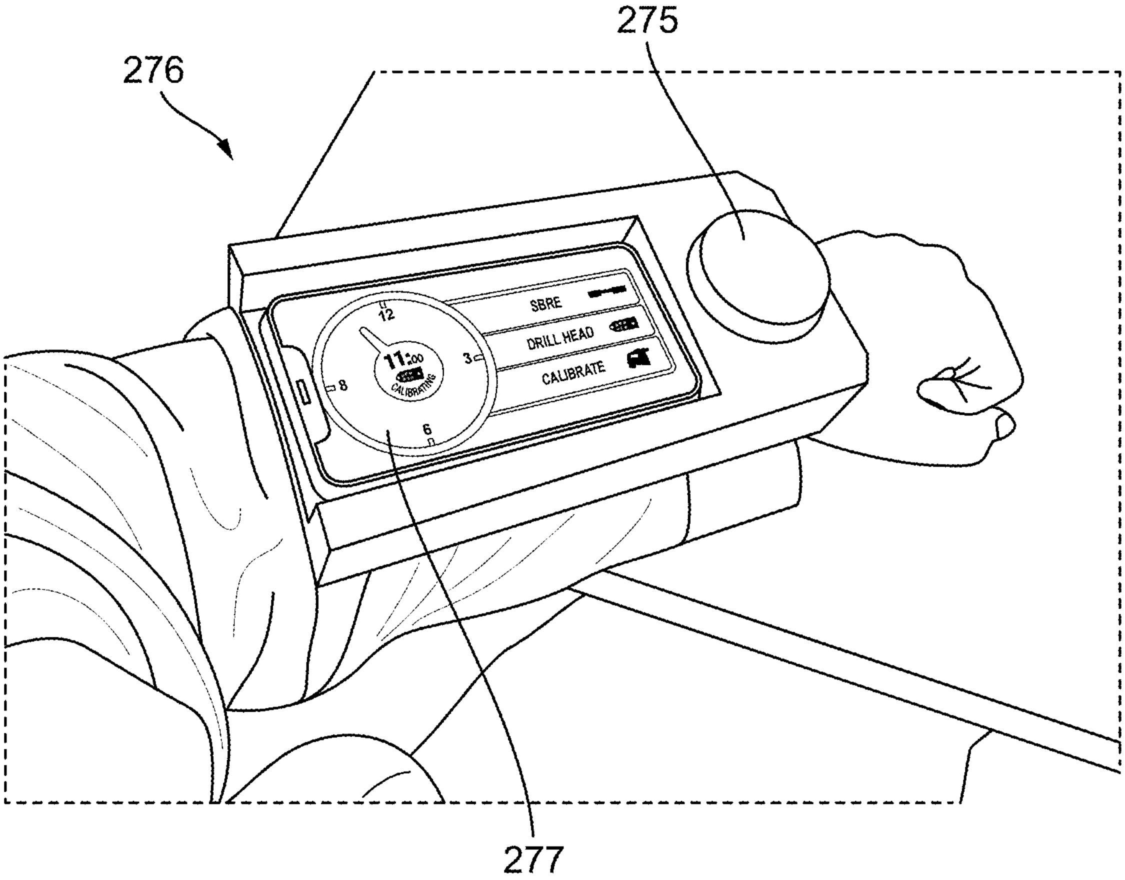
FIG. 28 is a perspective view of a remote device according to an embodiment of the disclosure.
Figure 29:
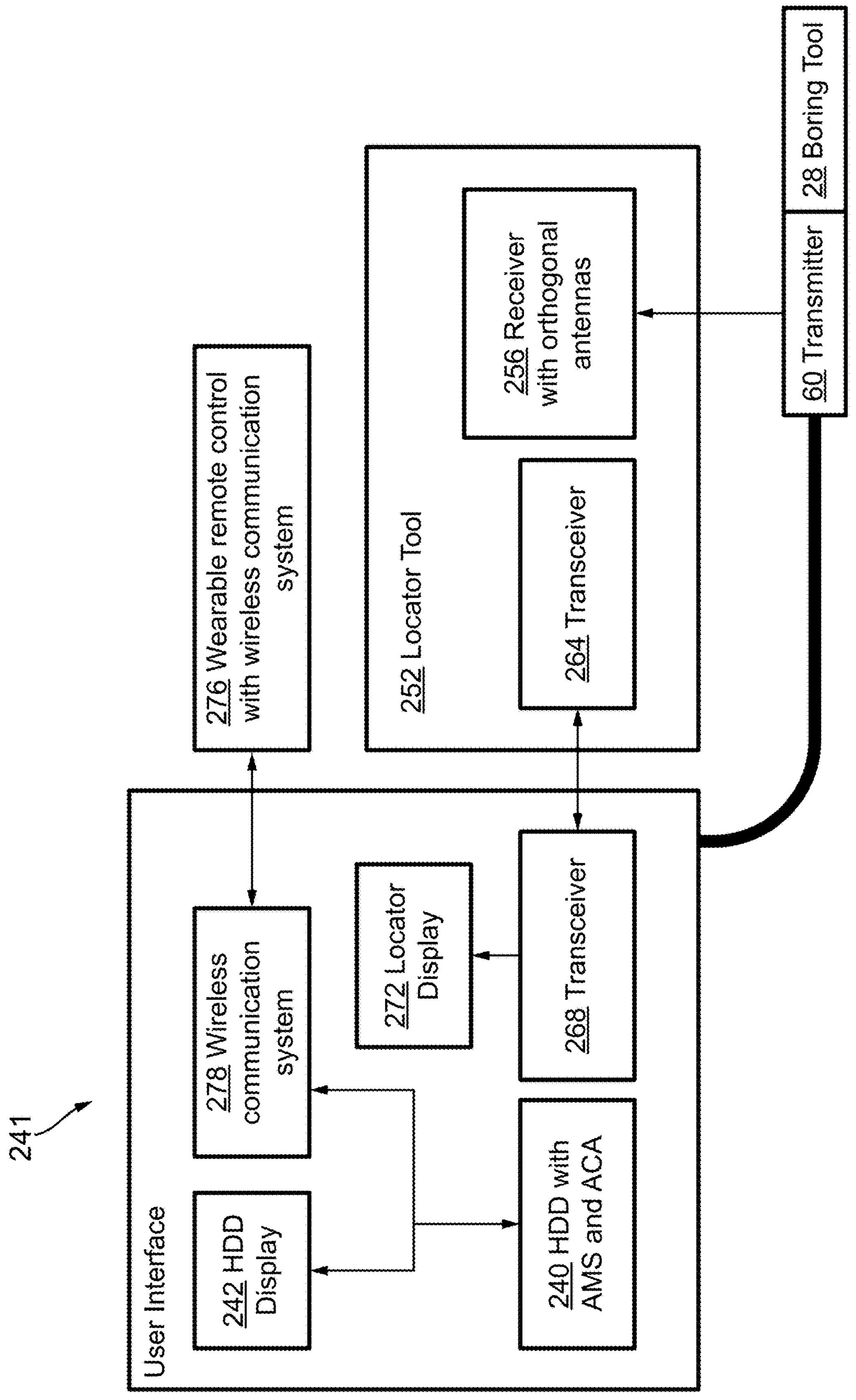
FIG. 29 is a schematic of the system architecture of the horizontal directional drilling control system of FIG. 27 according to an embodiment of the disclosure.

FIGS. 27-29 illustrate another embodiment of a control system 241. The control system 241 is similar to the control system 41 (FIGS. 3 and 4), but the control system 241 includes a remote device 276. Many features of the control system 241 are similar to the features of the control system 41. Accordingly, the preceding description and drawings are relied upon for a disclosure of the features that might not be described in detail here.

The control system 241 includes the drill head 28 having the transmitter 60, a locator tool 252, a user interface having a drill display 242 and a locator display 272, and a remote device 276. The locator tool 252 includes a receiver 256 that is configured to receive information from the transmitter 60, and a transceiver 264 that is configured to communicate with the transceiver 268 of the locator display 272. The drill display 242 is in communication with the controller 240 of the drilling machine 10. The drill display 242 and the controller 240 are connected to a wireless communication system 278 that allows the drill display 242 and the controller 240 to communicate with the remote device 276. The wireless communication system 278 allows the drill display 242 and the controller 240 to communicate with the remote device 276 though a radio link, a Wi-Fi link, or a Bluetooth link.

The remote device 276 is shown in FIG. 28. The remote device 276 is a wearable remote device that can be secured to an operator's arm. The wearable remote device 276 frees the hands of the operator such that the operator can perform other tasks (e.g., control the locator tool). The remote device 276 includes a remote display 277. The remote display 277 is similar to the drill display 242. The remote device 276 further includes a control 275 that allows the operator to interact with the remote display 277. In the illustrated embodiment, the control 275 is a dial/VDC. In some embodiments, the control 275 may be replaced with a different control (e.g., a button, joystick, etc.) that allows the operator to interact with the remote display 277. The remote device 276 further includes a wireless communication system that allows the remote device 276 to communicate with the drill display 242 and the controller 240 such that the operator's interactions with the remote display 277 are communicated to the drill display 242 and the controller 240.

The remote device 276 eliminates the need for two separate operators. Specifically, the remote device 276 allows one operator to perform the calibration of the estimated clock position of the drill head 28 to the measured clock position of the drill head 28 (method 2100A), rather than needing two operators. Additionally, the operator does not need to be positioned at the drilling machine 10 to perform the calibration.

Figure 30:
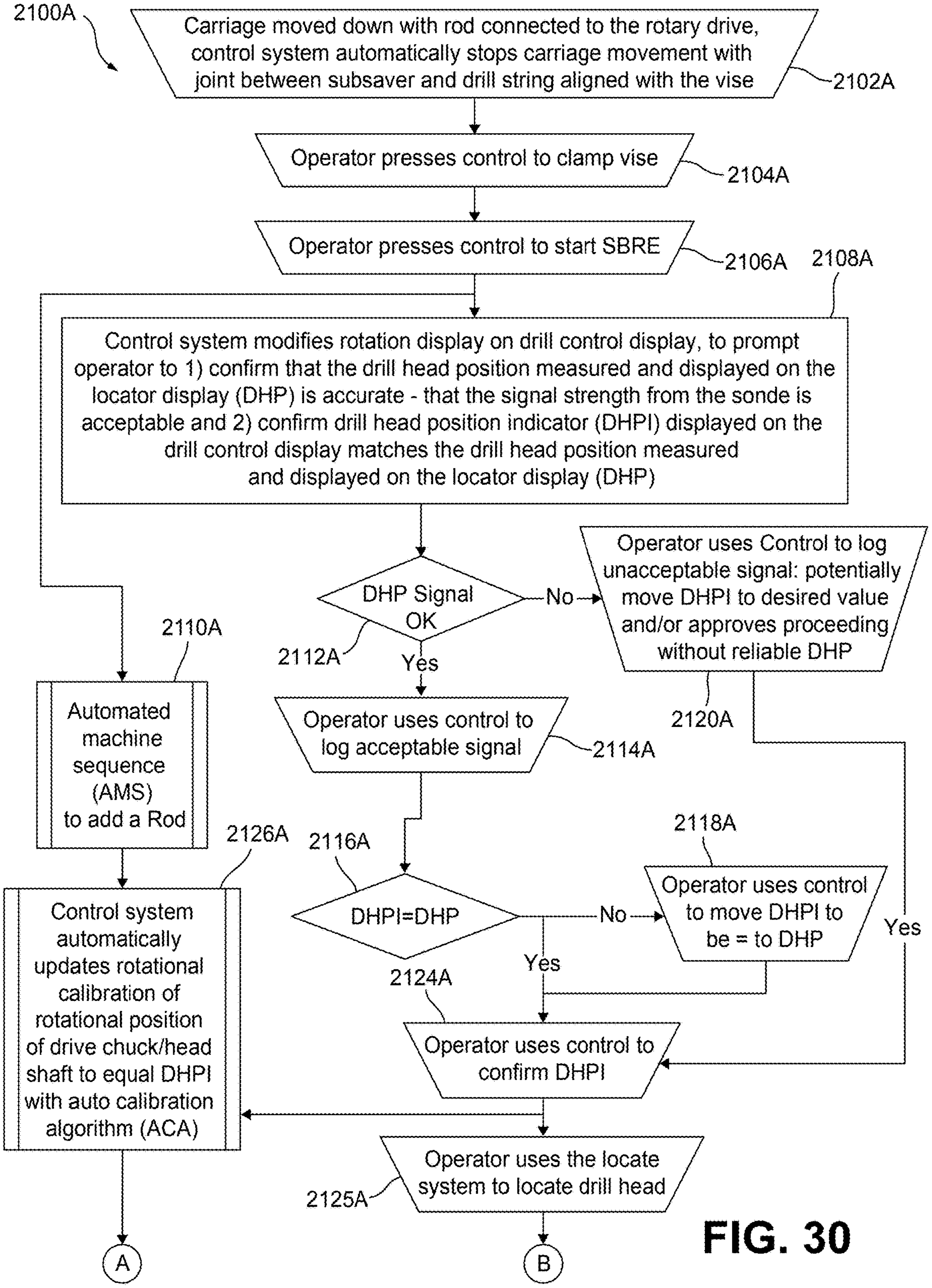
FIG. 30 is flow chart illustrating a calibration method for the horizontal drilling control system of FIG. 27 according to an embodiment of the disclosure.
Figure 30:
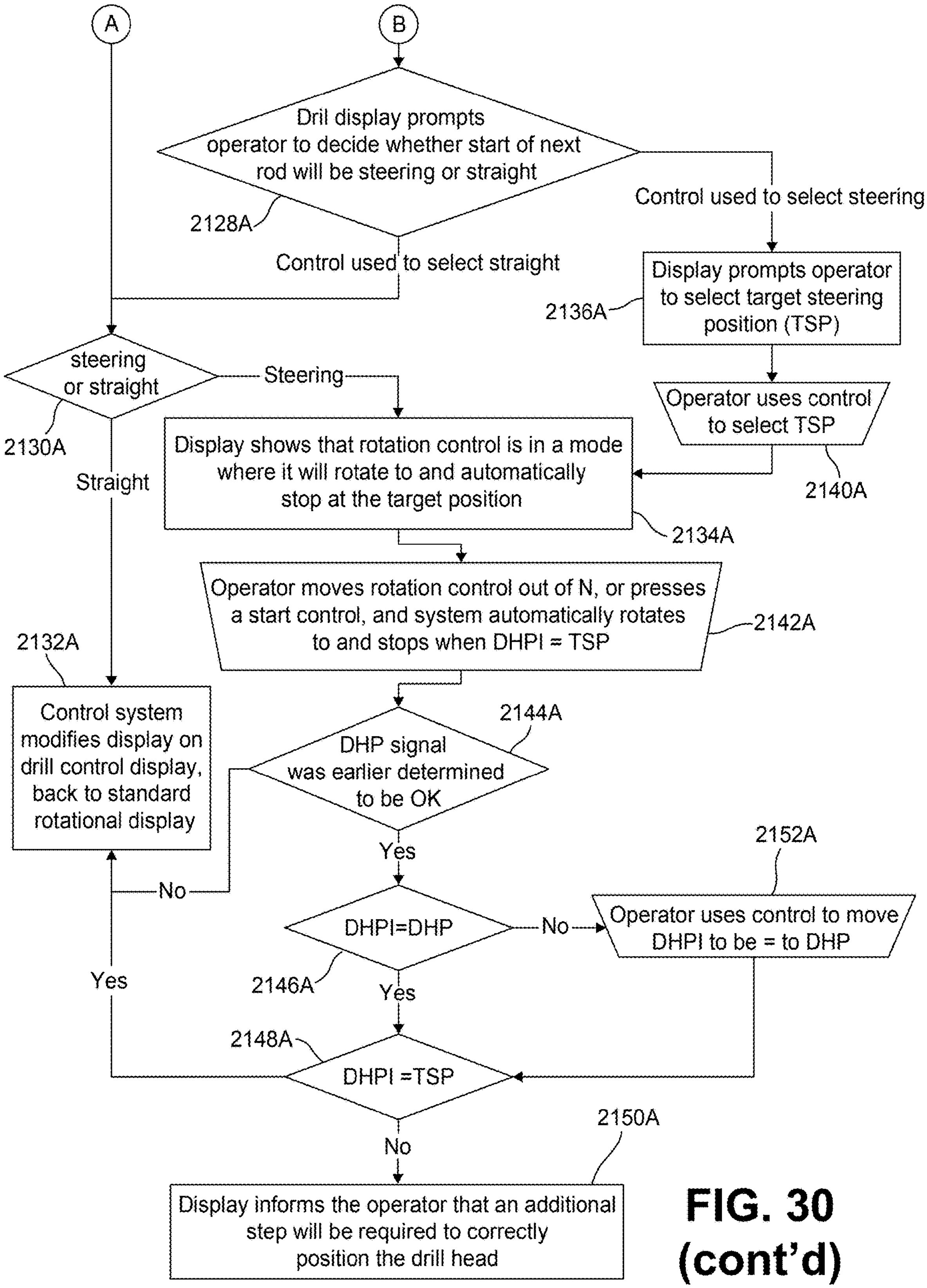

FIG. 30 illustrates a method 2100A for calibrating an estimated position of the drill head 28 to the clock position of the drill head 28 using the control system 241. The method 2100A is similar to the method 1100A (FIG. 5), but the method 2100A utilizes the remote device 276. Many of the steps of the method 2100A are similar to the steps of the method 1100A. Accordingly, the preceding description and drawings are relied upon for a disclosure of the steps that might not be described in detail here.

The method 2100A includes calibrating the data from the drilling machine 10, which is displayed on the drill display 242 and the remote display 277, with the data from the locator tool 252, which is displayed on the locator display 272. The method 2100A further includes automatically moving the drill head 28 to a desired position. The method 2100A is a manual calibration method that includes a first operator positioned away from the drilling machine 10 and positioned at the location above the drill head 28. The first operator may also be controlling the locator tool 252. During the method 2100A, the remote display 277 shows the operator prompts that make it easier to control the drill head orientation by allowing the controller 240 to rotate the drill head 28 to a specified orientation. During the method 2100A, the operator will consider data generated by the drill head locator tool 252, interact with data on the remote display 277 from the controller 240, to enable the controller 240 to automatically rotate the drill head 28 to a desired location.

The method 2100A is similar to the method 1100A, such that only the differences will be discussed in detail. Several of the functions in 1100A require input from the on-machine operator using the VDC. In the method 2100A, the operator uses the control 275 of the remote device 276 to interact with the controller 240. For example, at STEP 2120A, the operator uses the control 275 to log the unacceptable signal; potentially move the DHPI to the desired value; and approves the proceeding without reliable DHPI. Additionally, at STEP 2114A, the operator uses the control 275 to log an acceptable signal. At STEPS 2118A and 2152A, the operator uses the control 275 to move the DHPI to be the same as the DHP. The operator also uses the control 275 to select the Target Steering Position (TSP) (STEP 2136A). In some embodiments, the operator uses the control 275 to set a target distance that drill head 28 should be moved once the drill head 28 is steered to the TSP. Likewise, when straight pushing is desired (e.g., without steering), the operator can use the control 275 to set a target distance.

The method 2100A includes the new STEP 2125A. STEP 2125A is initiated after the operator uses the control to confirm the DHPI (STEP 2124A) and includes using the locator tool 252 (e.g., the locate system) to locate the drill head 28.

Figure 31:
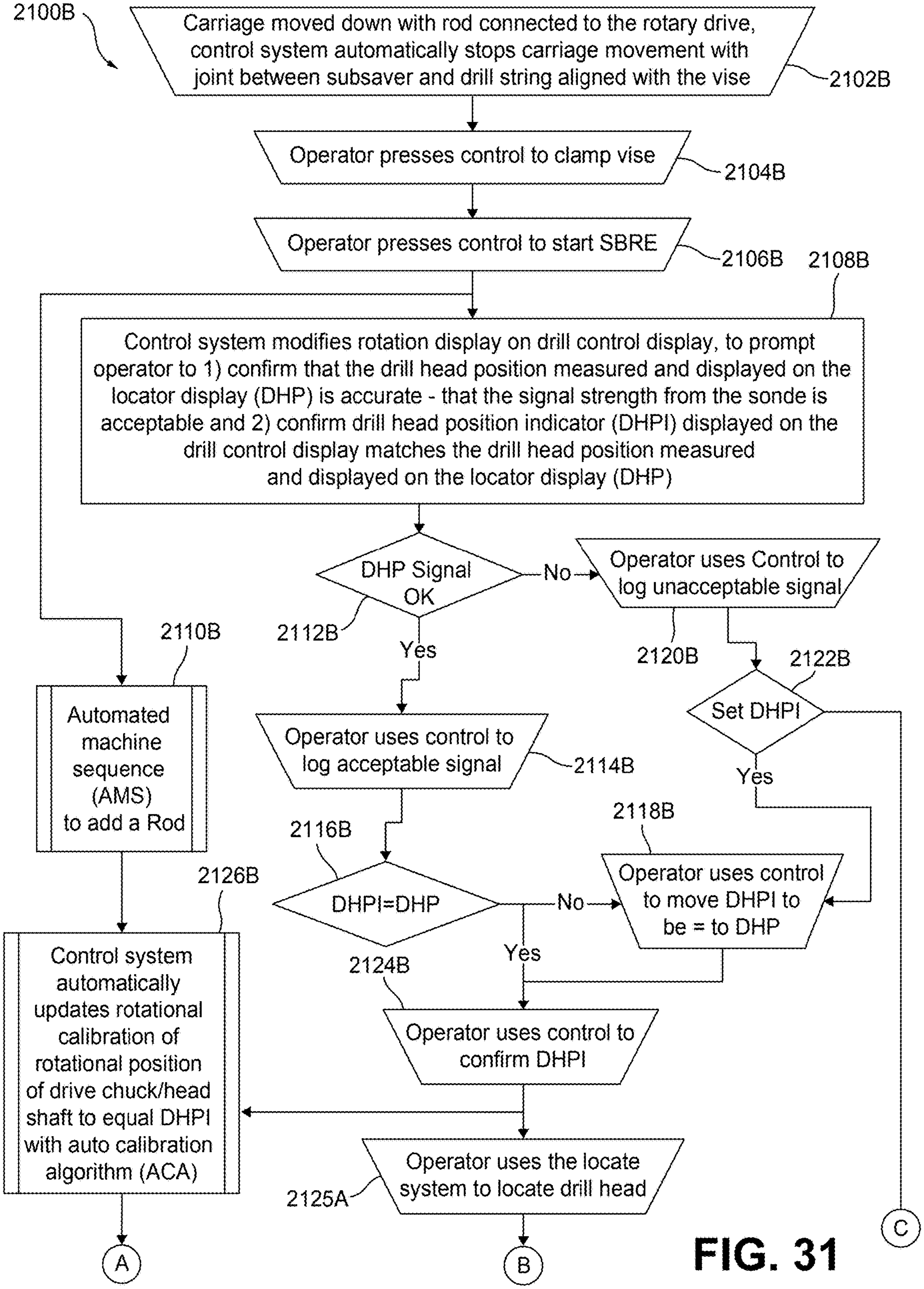
FIG. 31 is another flow chart illustrating a calibration method for the horizontal drilling control system of FIG. 27 according to an embodiment of the disclosure.
Figure 31:
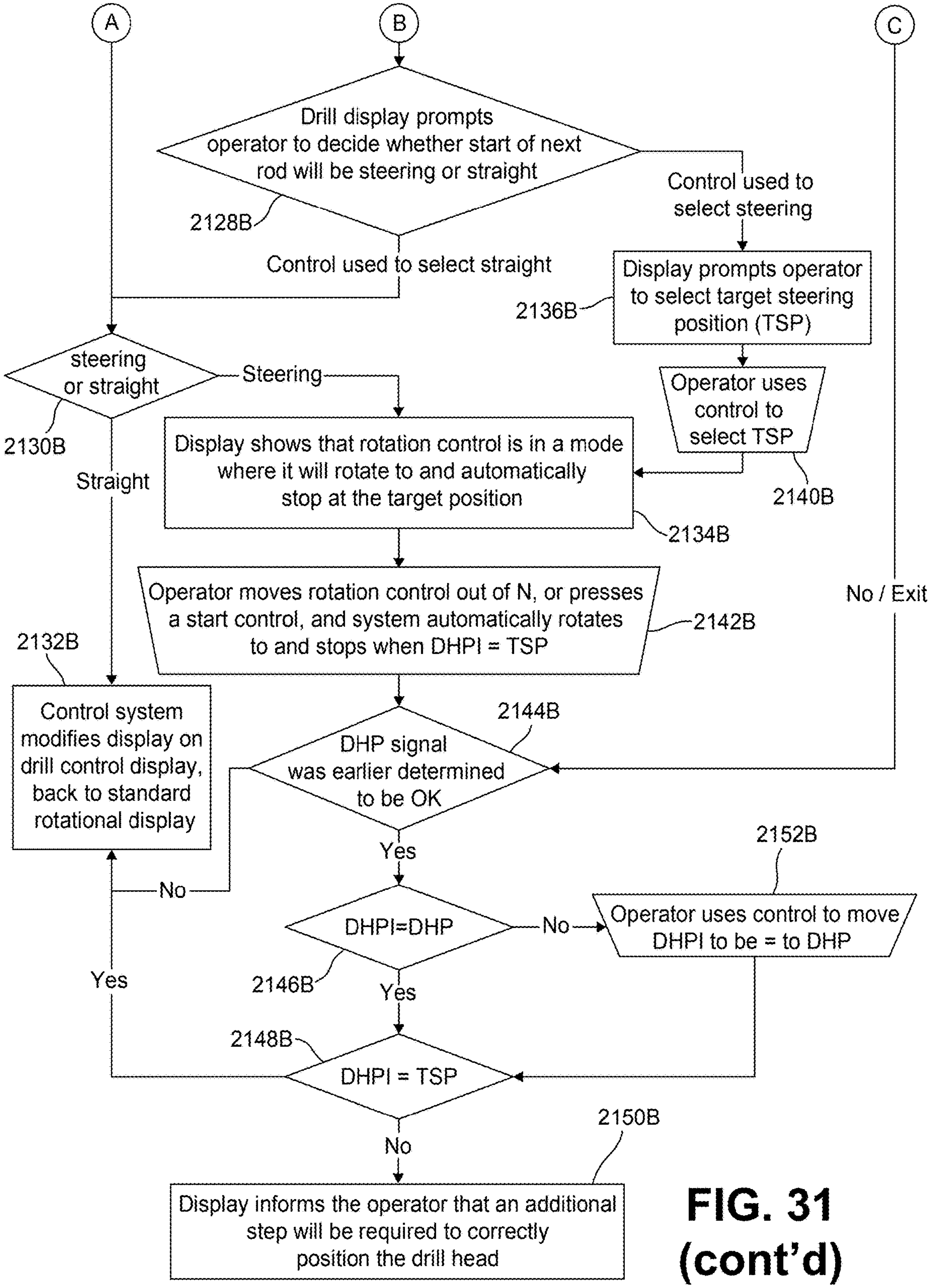

FIG. 31 illustrates a method 2100B for calibrating an estimated position of the drill head 28 to the clock position of the drill head 28. The method 2100B is similar to the method 2100A (FIG. 30), but the method 2100B includes the option to exit the method when the signal from the transmitter 60 is unacceptable. Many of the steps of the method 2100B are similar to the steps of the method 2100A. Accordingly, the preceding description and drawings are relied upon for a disclosure of the steps that might not be described in detail here.

The method 2100B includes additional steps for dealing with an unacceptable signal from the transmitter 60. The method 2100B includes STEPS 2120B, 2122B, and 2118B which are similar to STEPS 1120B, 1122B, and 1118B of method 1100B (FIG. 21).

Figure 32:
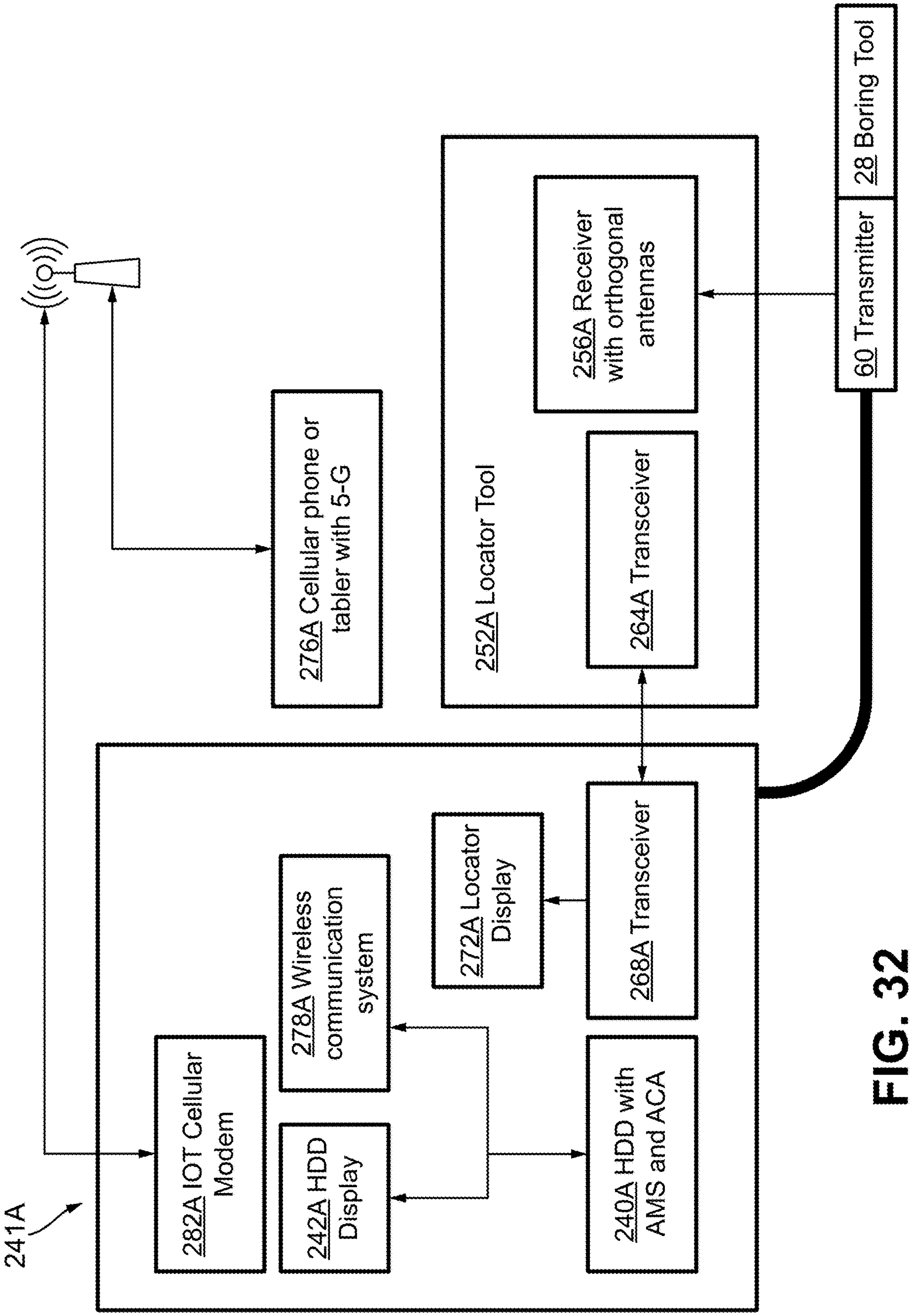
FIG. 32 is another schematic of the system architecture of the horizontal directional drilling control system of FIG. 27 according to an embodiment of the disclosure.

FIG. 32 illustrates a control system 241A. The control system 241A is similar to the control system 241 (FIG. 29), but the control system 241A includes a cellular modem 282A. Many of the features of the control system 241A are similar to the control system 241. Accordingly, the preceding description and drawings are relied upon for a disclosure of the features that might not be described in detail here.

The control system 241A includes the drill head 28, a locator tool 252A, a user interface having a drill display 242A and a locator display 272A, and a remote device 276A. The locator tool 252A includes a receiver 256A configured to receive information from the transmitter 60 and a transceiver 264A configured to communicate with the transceiver 268A of the locator display 272A. The drill display 242A is in communication with the controller 240A of the drilling machine 10. The user interface further includes a wireless communication system 278A and a cellular modem 282A that are connected to the drill display 242A and the controller 240A. The remote device 276A is a cellular phone or tablet with 5-G capabilities. The drill display 242A and the controller 240A can communicate with the remote device 276A wirelessly (e.g., though Wi-Fi or Bluetooth) or through the cellular modem 282A. Communicating through the cellular modem 282A is beneficial when the locator tool 252B is far from the drilling machine 10.

Figure 33:
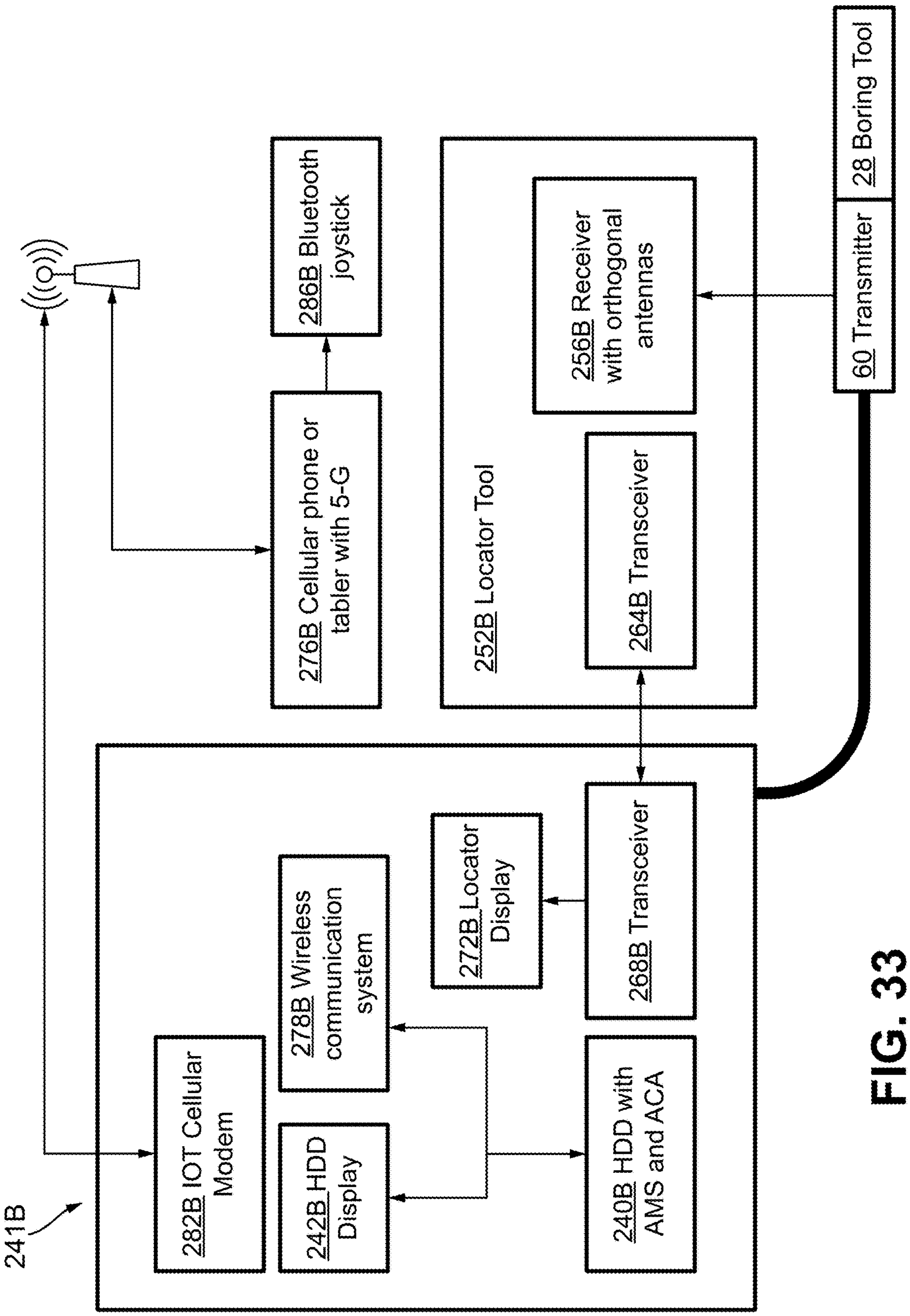
FIG. 33 is yet another schematic of the system architecture of the horizontal directional drilling control system of FIG. 27 according to an embodiment of the disclosure.

FIG. 33 illustrates a control system 241B. The control system 241B is similar to the control system 241A (FIG. 32), but the control system 241B includes a wireless joystick 286B. Many of the features of the control system 241B are similar to the control system 241A. Accordingly, the preceding description and drawings are relied upon for a disclosure of the features that might not be described in detail here.

The control system 241B includes all of the features of the control system 241A and additional includes a wireless joystick 286B. The wireless joystick 286B allows the operator to more easily control the remote device 276B. The wireless joystick 286B may communicate with the remote device 276B with via Bluetooth or Wi-Fi.

Figure 34:
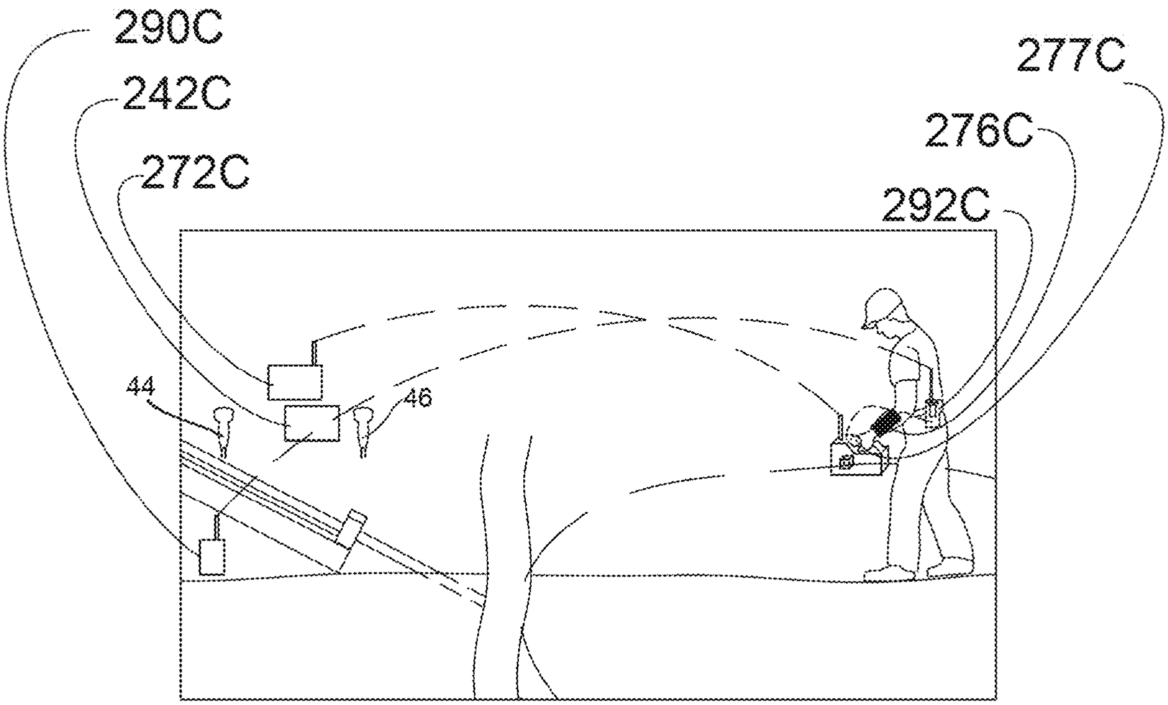
FIG. 34 is a schematic of a horizontal directional drilling system control system according to an embodiment of the disclosure.
Figure 35:
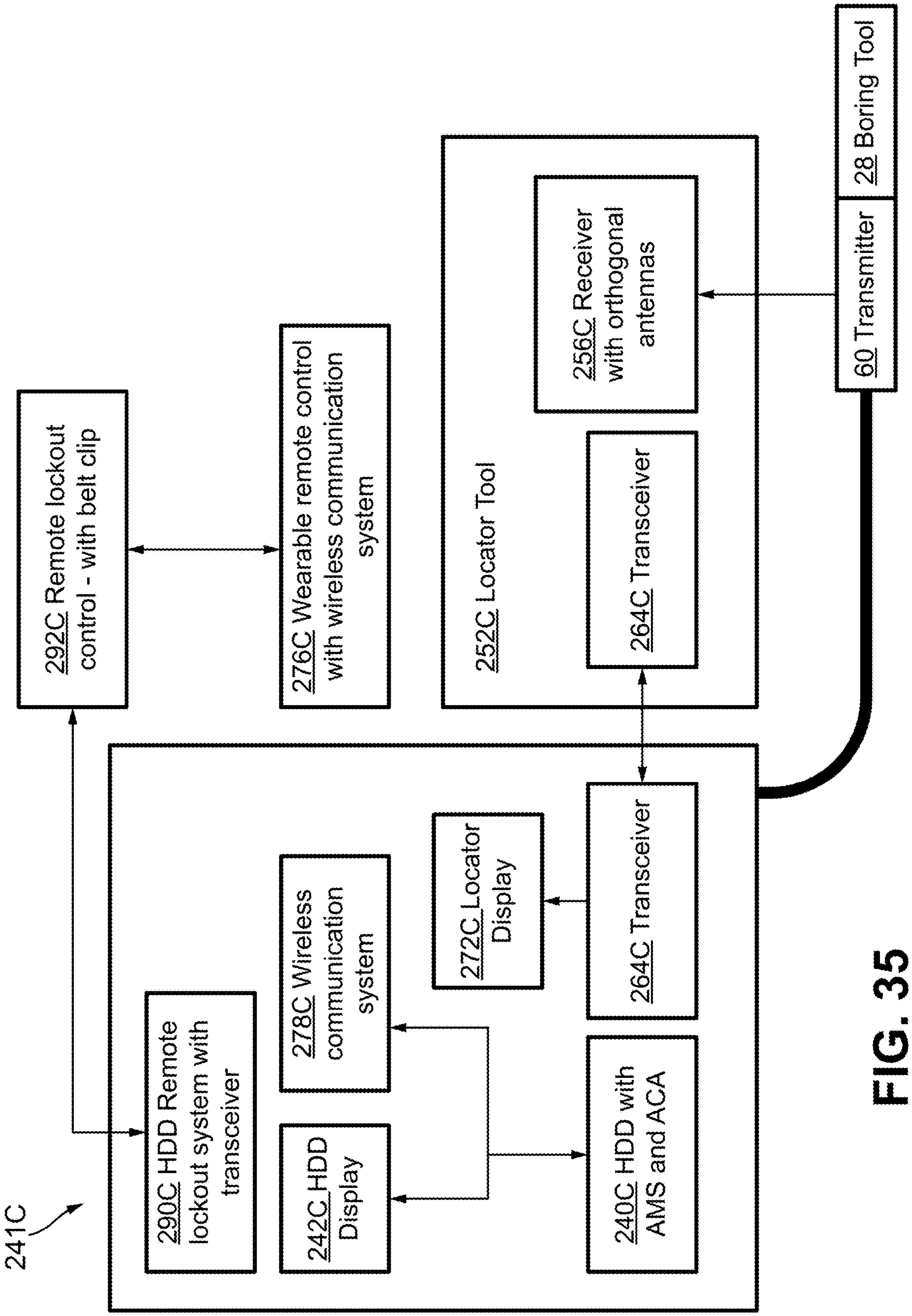
FIG. 35 is a schematic of the system architecture of the horizontal directional drilling control system of FIG. 34 according to an embodiment of the disclosure.

FIGS. 34-35 illustrate a control system 241C. The control system 241C is similar to the control system 241 (FIG. 29), but the control system 241C includes a remote lockout feature. Many of the features of the control system 241B are similar to the control system 241. Accordingly, the preceding description and drawings are relied upon for a disclosure of the features that might not be described in detail here.

The control system 241C includes all the features of the control system 241 and additionally includes a remote lockout control 292C and a remote lockout system 290C with a transceiver. The remote lockout control 292C includes a control and a radio transmitter. In the illustrated embodiment, the remote lockout control 292C also includes a belt clip such that the operator can easily carry and access the remote lockout control 292C. The user interface includes the remote lockout system 290C with the transceiver. The transceiver can receive radio signals from the remote lockout control 292C. The remote lockout system 290C is in communication with the controller 240C to control the drilling machine 10. The remote lockout system 290C and the remote lockout control 292C are used to stop or shutdown (e.g., lockout) the drilling machine 10. This might be useful if the remote operator notices that the drill head 28 has emerged from the ground or if the drill head 28 is close to emerging from the ground. The remote lockout control 292C may be similar to the remote unit described in U.S. Pat. No. 6,766,869, filed on Jun. 25, 2002, which is incorporated by reference herein.

Figure 36:
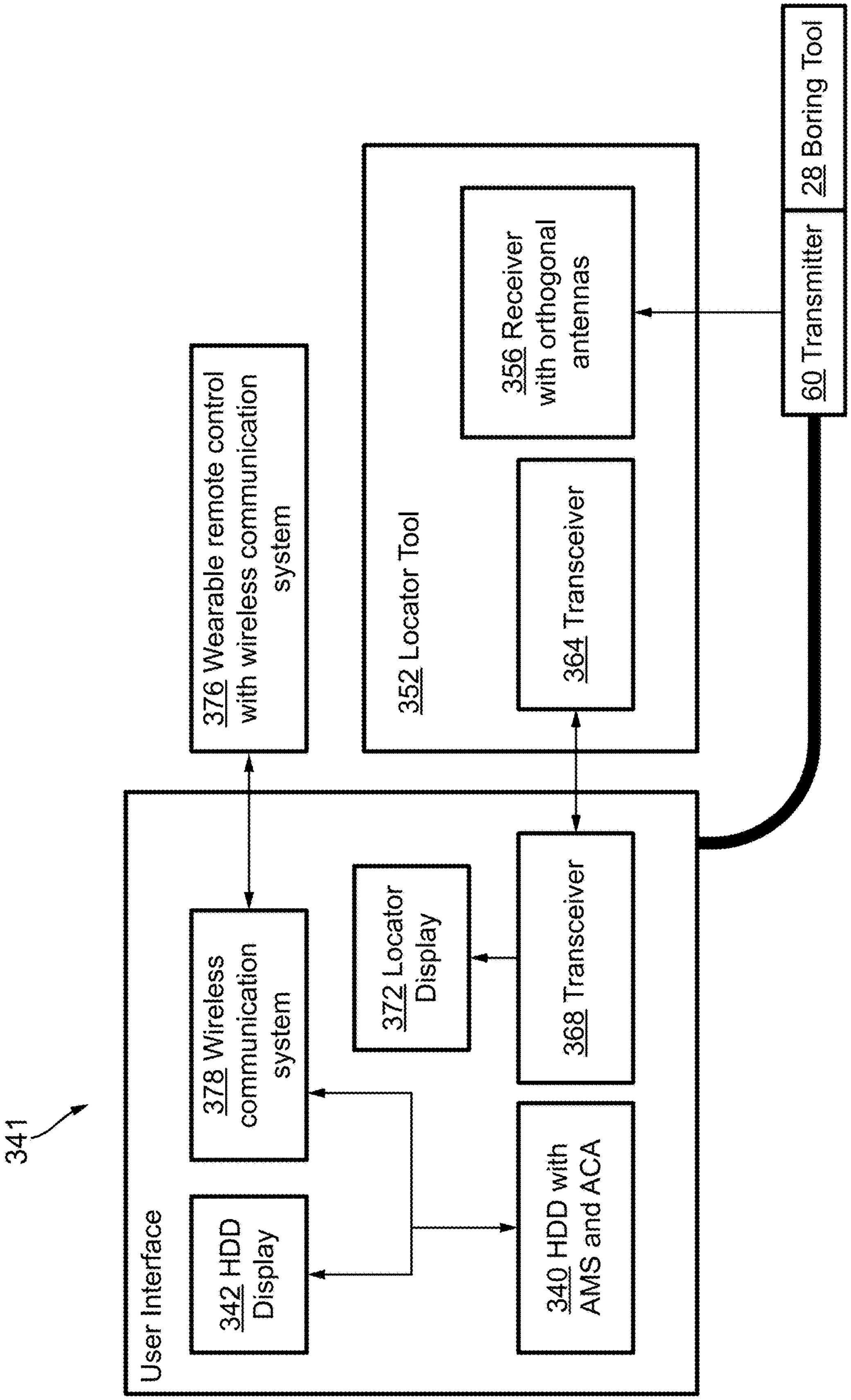
FIG. 36 is a schematic of the system architecture of a horizontal directional drilling control system according to an embodiment of the disclosure.
Figure 37:
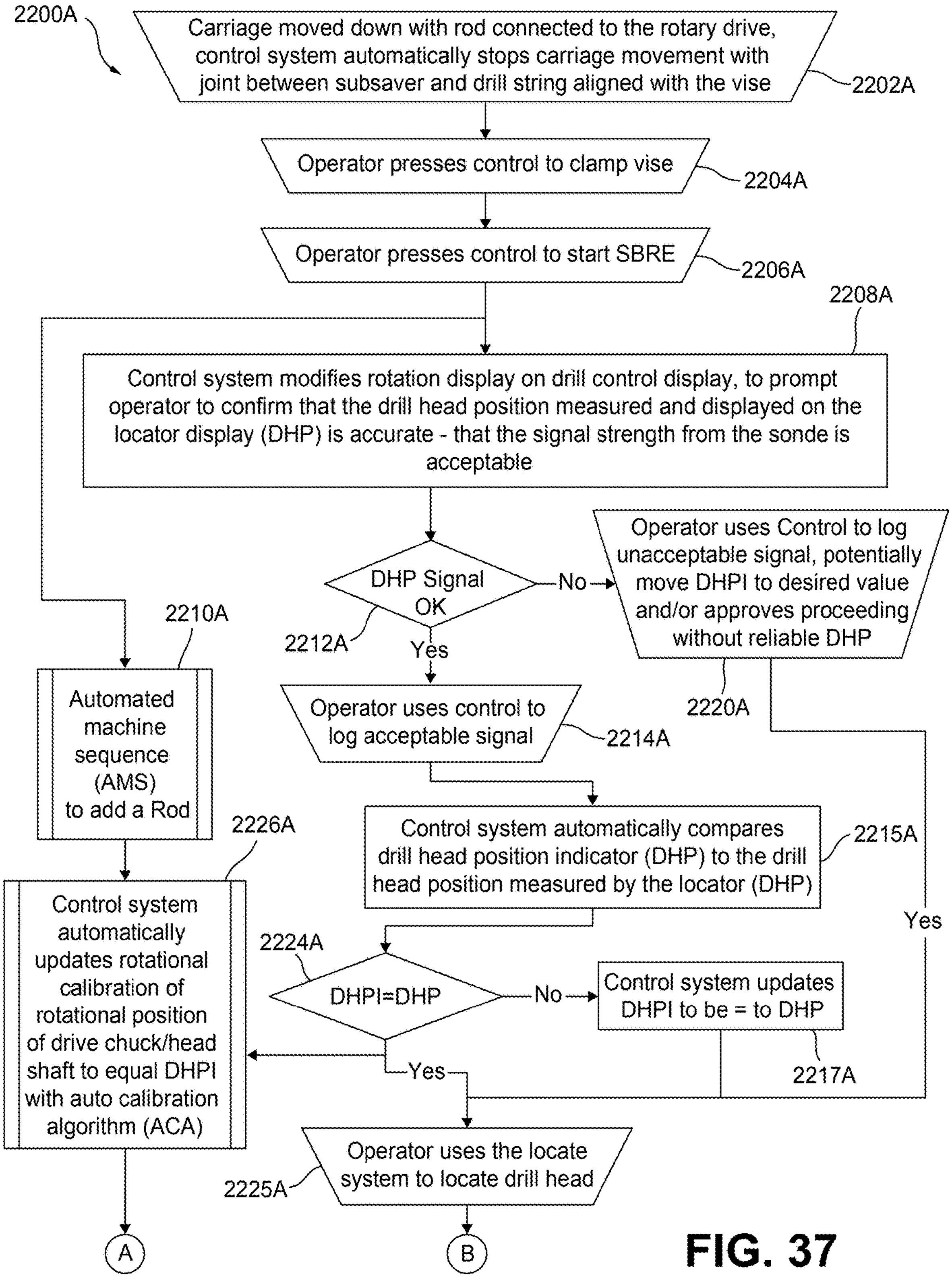
FIG. 37 is flow chart illustrating a calibration method for the horizontal drilling control system of FIG. 36 according to an embodiment of the disclosure.
Figure 37:
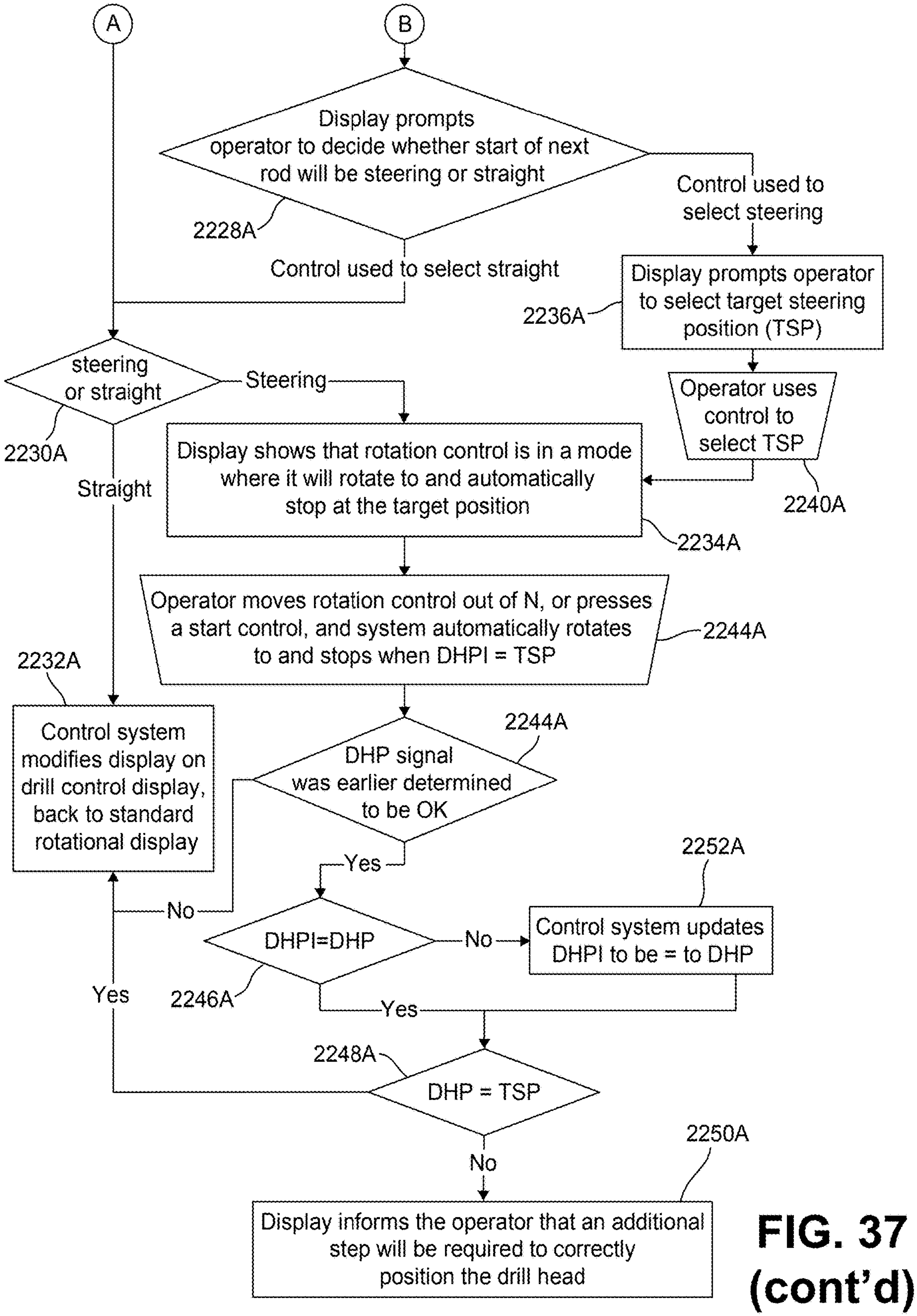

FIGS. 36-37 illustrate a control system 341 and a method 2200A for calibrating the estimated clock position of the drill head 25 to the measured clock position of the drill head 28. The control system 341 and the method 2200A are similar to the control system 241 (FIG. 29) method 2100A (FIG. 30), but the control system 341 is integrated such that the method 2200A allows for automatic calibration. Many of the steps of the method 2200A are similar to the steps of the method 2100A and, many of the features of the control system 341 are similar to the features of the control system 241. Accordingly, the preceding description and drawings are relied upon for a disclosure of the steps and features that might not be described in detail here.

FIG. 36 illustrates the system architecture of the control system 341. The control system 341 includes the drill head 28 having the transmitter 60, a locator tool 352, a user interface having a drill display 342 and a locator display 372, and a remote device 376. The locator tool 352 includes a receiver 356 that is configured to receive information from the transmitter 60 and a transceiver 364 that is configured to communicate with the transceiver 368 of the locator display 372. The drill display 342 is in communication with the controller 340 of the drilling machine 10. The drill display 342 and the controller 340 are connected to a wireless communication system 378 that allows the drill display 342 and the controller 340 to communicate with the remote device 376. The system architecture of the control system 341 is similar to the system architecture of the control system 241, but the transceiver 368 allows the controller 340 to communicate with the locator display 372 such that the controller 340 can communicate with the locator tool 352. For example, the drill head 28 clock position data as generated by the locator tool 352, is available to the controller 340.

FIG. 37 illustrates a method 2200A for calibrating an estimated position of the drill head 28 to the clock position of the drill head 28. The method 2200A includes calibrating the data from the drilling machine 10, which is displayed on the drill display 342, with the data from the locator tool 352, which is displayed on the locator display 372. The method 2200A further includes automatically moving the drill head 28 to a desired position. The method 2200A is an automatic calibration method that includes a first operator positioned remote from the drilling machine 10 and positioned at the location above the drill head 28. The first operator may also be controlling the locator tool 352. During the method 2200A, the drill display 342 shows the operator prompts that make it easier to control the drill head orientation by allowing the controller 340 to rotate the drill head 28 to a specified orientation. During the method 2200A, the operator will consider data generated by the drill head locator tool 352, interact with data on the drill display 342 from the controller 340, to enable the controller 340 to automatically rotate the drill head 28 to a desired location. Additionally, the controller 340 will automatically recalibrate the DHPI.

The method 2200A is similar to the method 2100A, such that only the differences will be discussed in detail. Several of the functions in 2100A that require input from the operator are now done automatically with the controller 340. However, the operator still needs to confirm the signal of the transmitter 60 is acceptable (STEP 2208A) and still needs to select the Target Steering Position (STEP 2240A). In some embodiments, the controller 340 uses artificial intelligence to determine the reliability of the data from the locator tool 352 and if it is acceptable for use.

The method 2200A includes new STEP 2215A where the controller 340 automatically compares the DHPI to the DHP. New STEP 2215A is similar to STEP 1215A of the method 1200A (FIG. 25). Accordingly, the STEP 2115A will not be discussed in detail.

Figure 38:
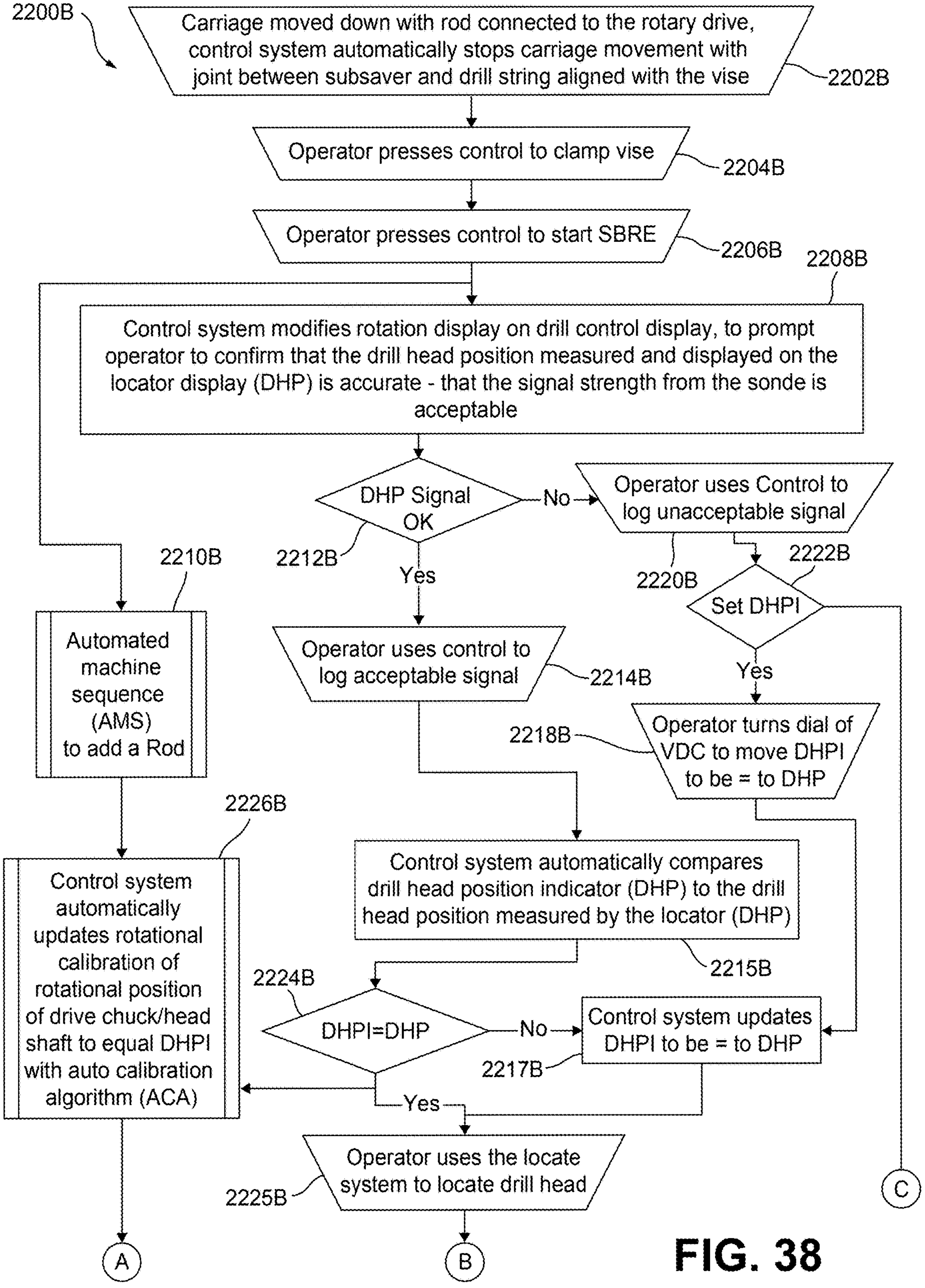
FIG. 38 is another flow chart illustrating a calibration method for the horizontal drilling control system of FIG. 36 according to an embodiment of the disclosure.
Figure 38:
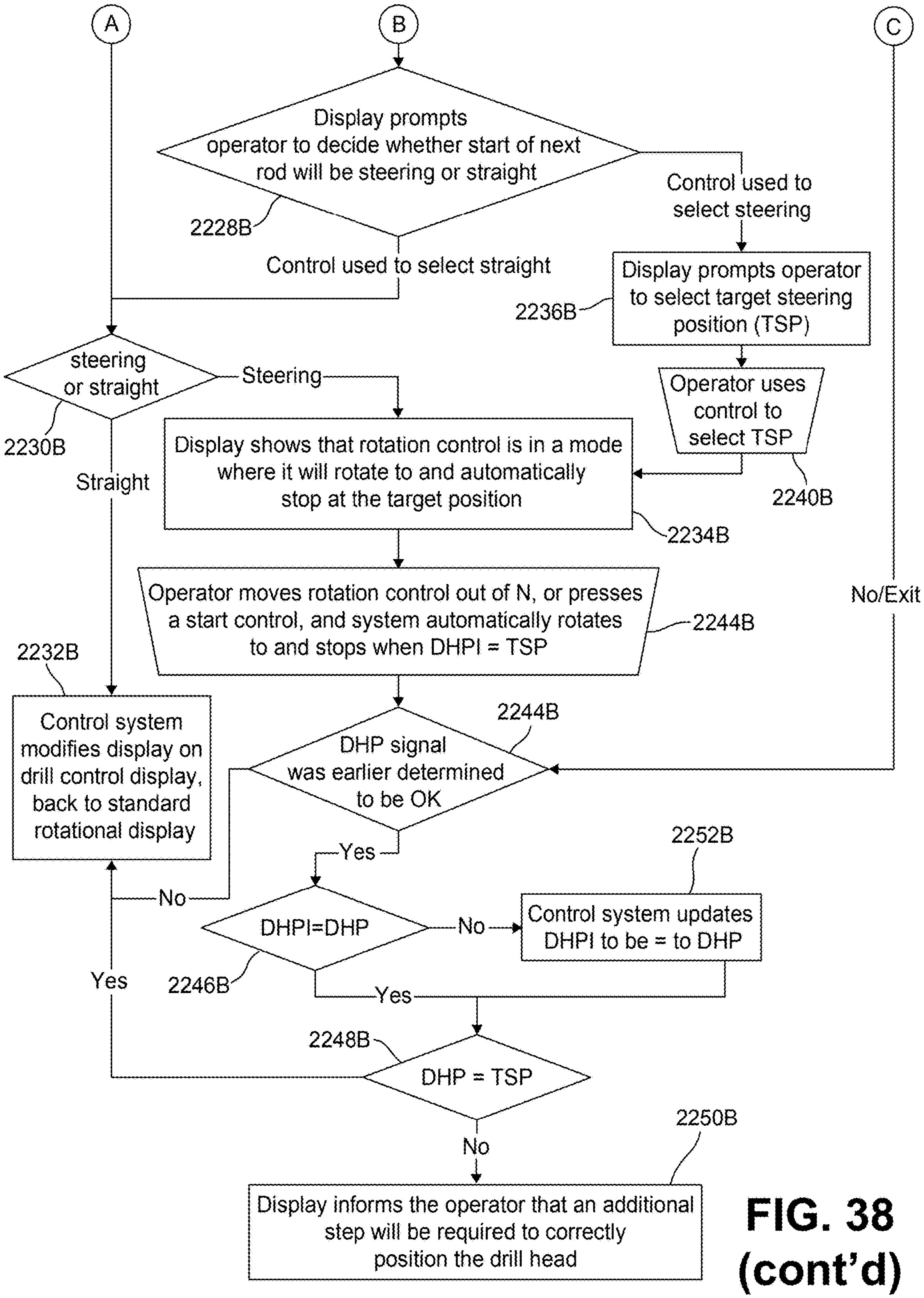

FIG. 38 illustrates a method 2200B for calibrating an estimated position of the drill head 28 to the clock position of the drill head 28. The method 2200B is similar to the method 2200A (FIG. 37), but the method 2200B includes the option to exit the method when the signal from the transmitter 60 is unacceptable. Many of the steps of the method 2200B are similar to the steps of the method 2200A. Accordingly, the preceding description and drawings are relied upon for a disclosure of the steps that might not be described in detail here.

The method 2200B includes additional steps for dealing with an unacceptable signal from the transmitter 60. The method 2200B includes STEPS 2220B, 2222B, and 2218B which are similar to STEPS 1120B, 1122B, and 1118B of method 1100B (FIG. 21). Accordingly, these STEPS will not be discussed in detail.

Figure 39:
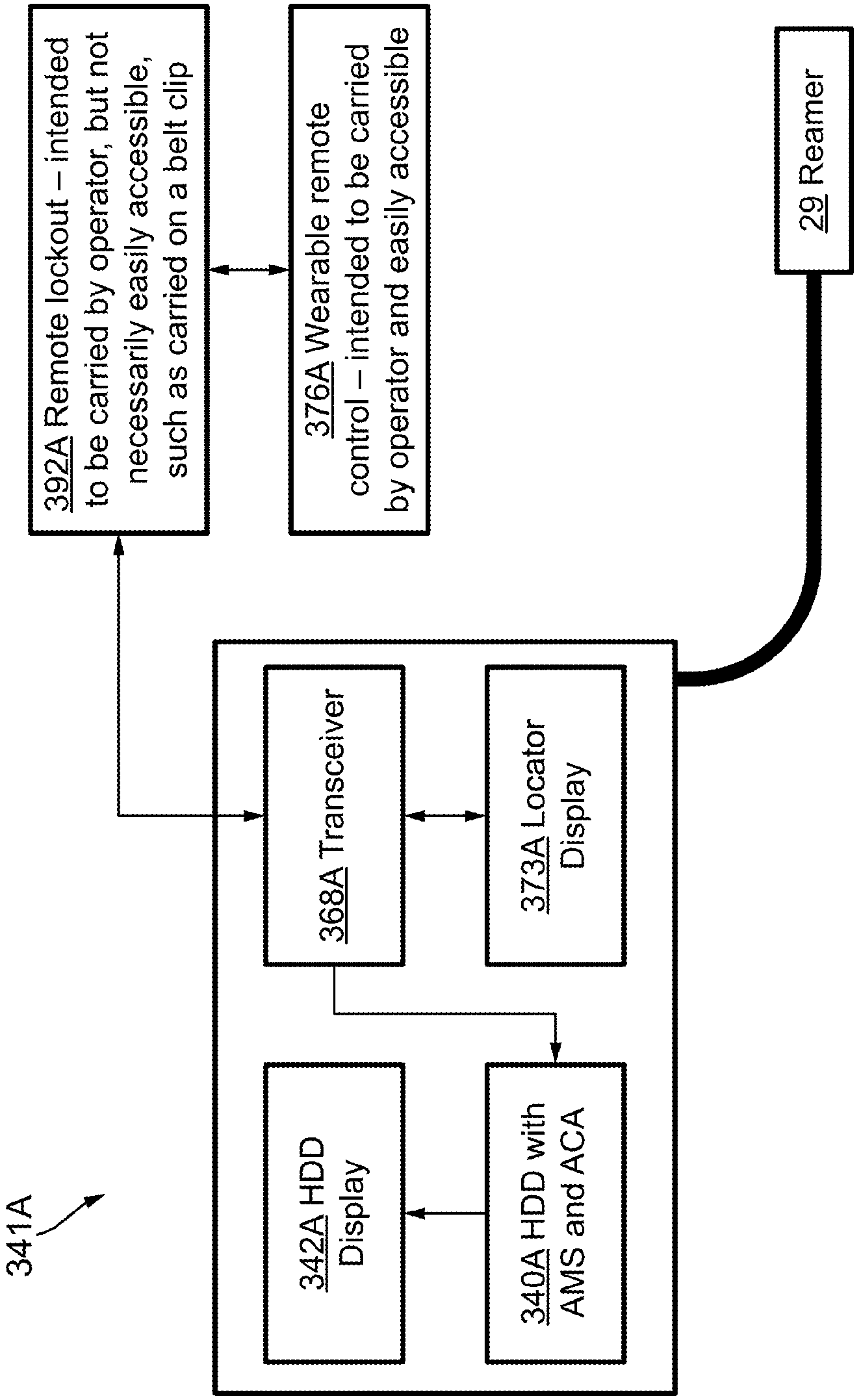
FIG. 39 is a schematic of the system architecture of a horizontal directional drilling control system according to an embodiment of the disclosure for using during backreaming.

FIG. 39 illustrates a control system 341A that includes the remote lockout feature for use during reaming. Many of the features of the control system 341A are similar to the control system 341. Accordingly, the preceding description and drawings are relied upon for a disclosure of the features that might not be described in detail here.

The reaming tool 29 is used after the drill head 28 has created the initial bore. The reaming tool 29 is run through the initial bore in the opposite direction (e.g., toward the drilling machine 10) to increase the size of the bore. During the backreaming process, the locator tool is not in use.

The control system 341A is used to control the drilling machine 10 during the backreaming process. The control system 341A includes a drill display 342A connected to the controller 340A of the drilling machine, a locator display 372A, a transceiver 368A which allows the controller 340A to communicate with the locator display 372A, a remote device 376A, and a remote lockout control 392A. The remote device 376A may be a simple control (e.g., a button or dial). The remote lockout control 392A is in communication with the remote device 376A and the transceiver 368A. The user initiates the remote lockout 392A with the remote device 376A, and the transceiver 368A sends the signal the controller 340A to shut down the drilling machine 10.

Figure 40:
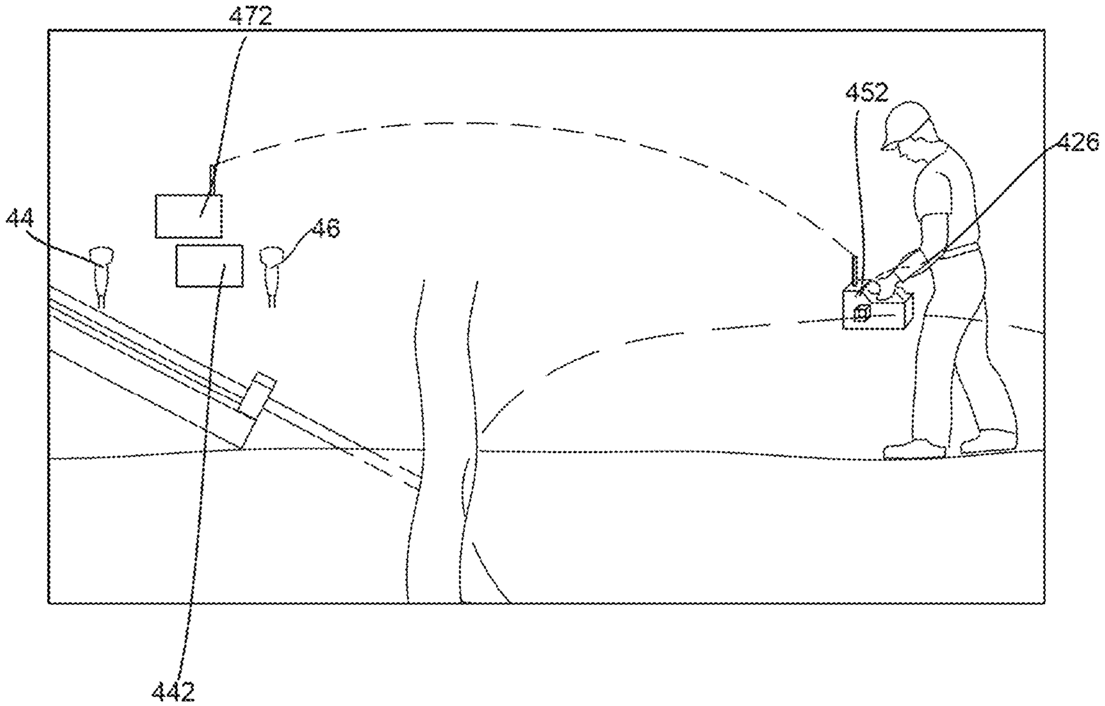
FIG. 40 is a schematic of a horizontal directional drilling system control system according to an embodiment of the disclosure.
Figure 41:
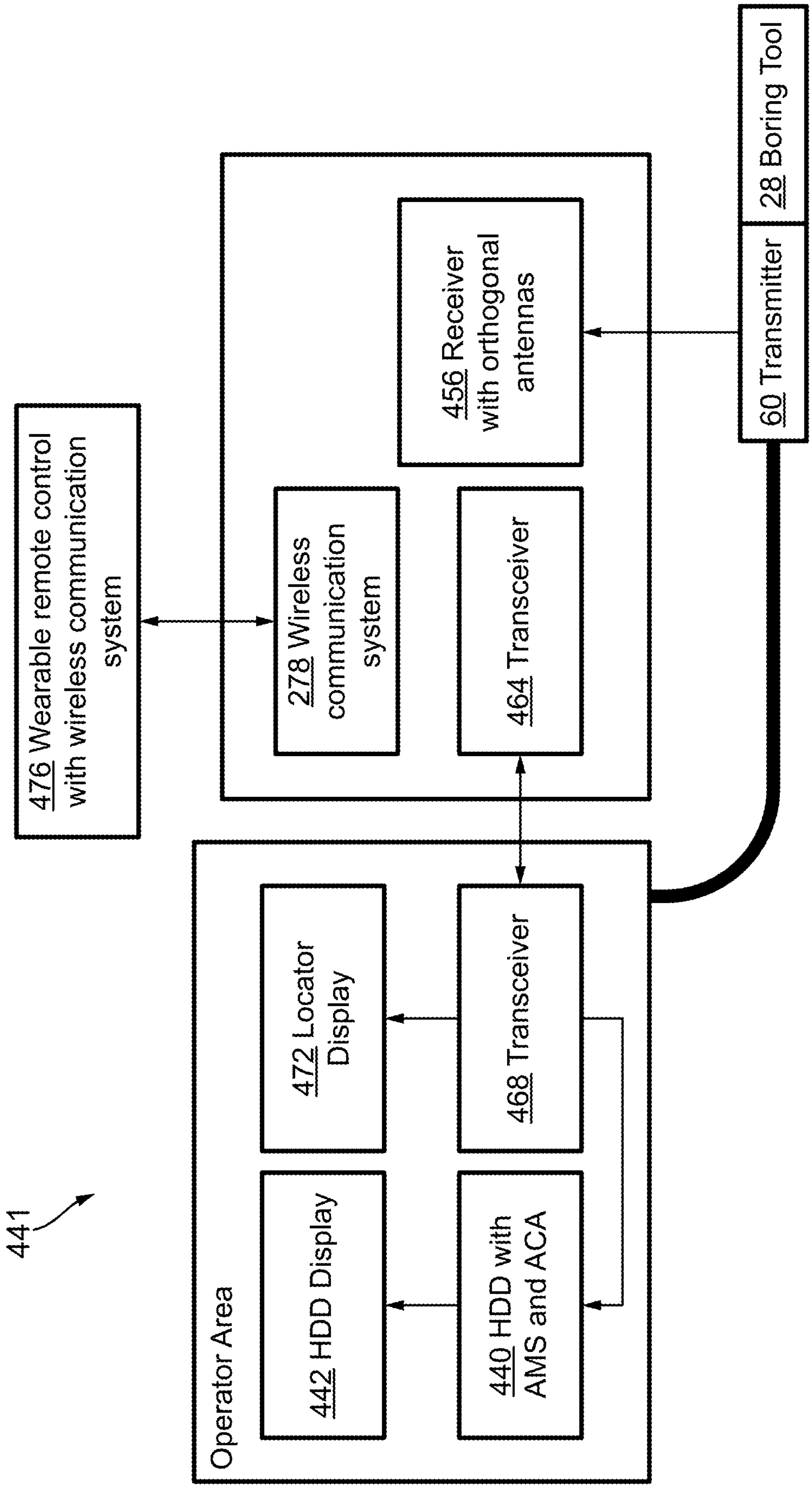
FIG. 41 is schematic of the system architecture of the horizontal directional drilling control system of FIG. 40 according to an embodiment of the disclosure.

FIGS. 40-41 illustrate a control system 441. The control system 441 is similar to the control system 341 (FIG. 36), but the control system 441 includes a remote device 476 connected to the locator tool 452. Many of the features of the control system 441 are similar to the features of the control system 341. Accordingly, the preceding description and drawings are relied upon for a disclosure of the steps and features that might not be described in detail here.

The control system 441 includes all of the features of the control system 341. In the control system 341, the wireless communication system 378 is part of the user interface of the drilling machine 10. In the control system 441, the locator tool 452 has been modified such that the wireless communication system 478 is connected to the locator tool 452. The remote device 476 is configured to communicate with the locator tool 452. The controller 440 communicates with the remote device 476 through the locator tool 452.

Figure 42:
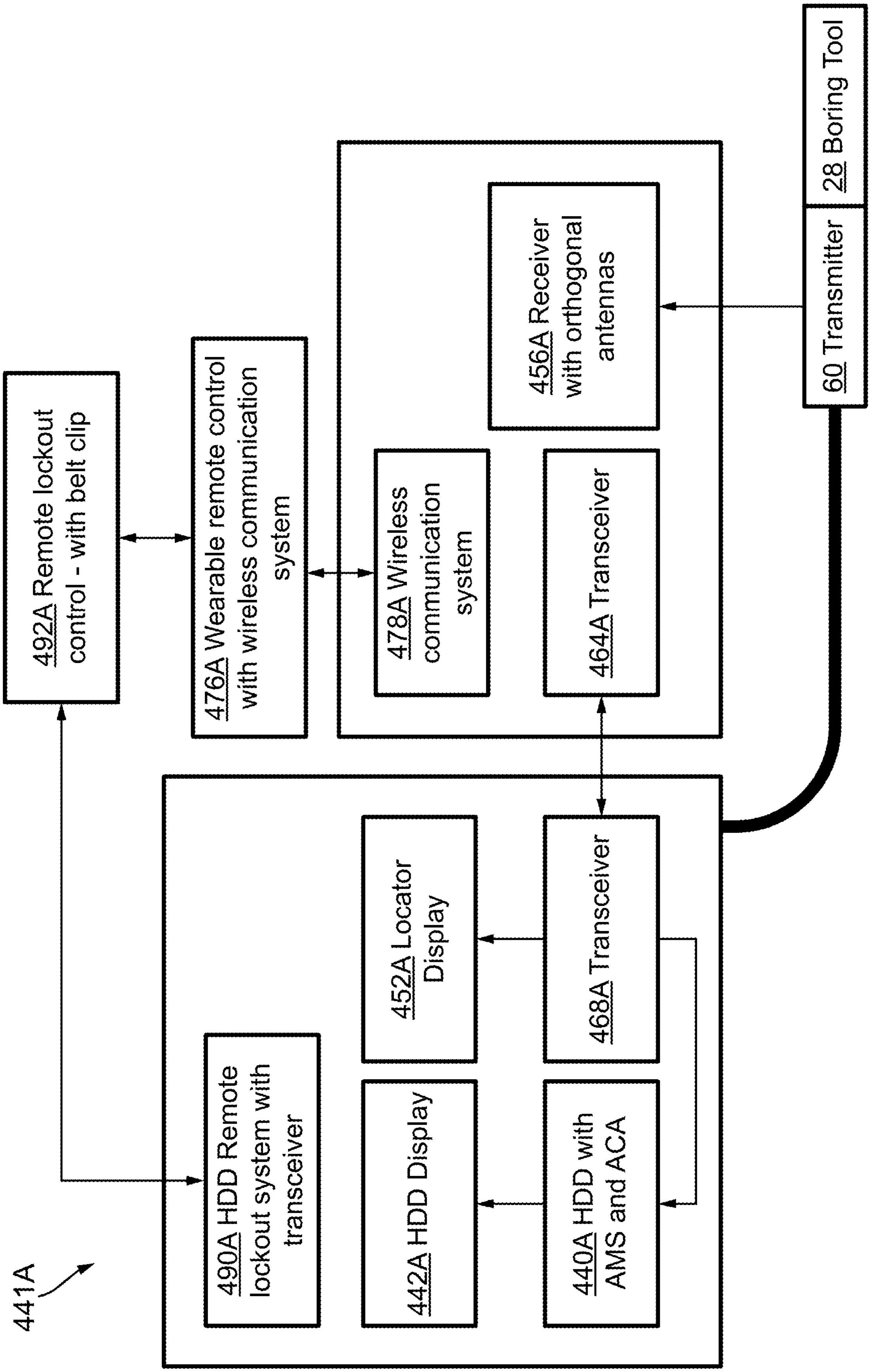
FIG. 42 is another schematic of the system architecture of the horizontal directional drilling control system of FIG. 40 according to an embodiment of the disclosure.

FIG. 42 illustrates a control system 441A. The control system 441A is similar to the control system 441 (FIG. 41), but the control system 441A includes the remote lockout feature. Many of the features of the control system 441A are similar to the control system 441. Accordingly, the preceding description and drawings are relied upon for a disclosure of the features that might not be described in detail here.

The control system 441A includes all of the features of the control system 441 and additionally includes a remote lockout control 492A and a remote lockout system 490A. The remote lockout control 492A and the remote lockout system 490A are similar to the remote lockout control 292C and the remote lockout system 290C.

Figure 43:
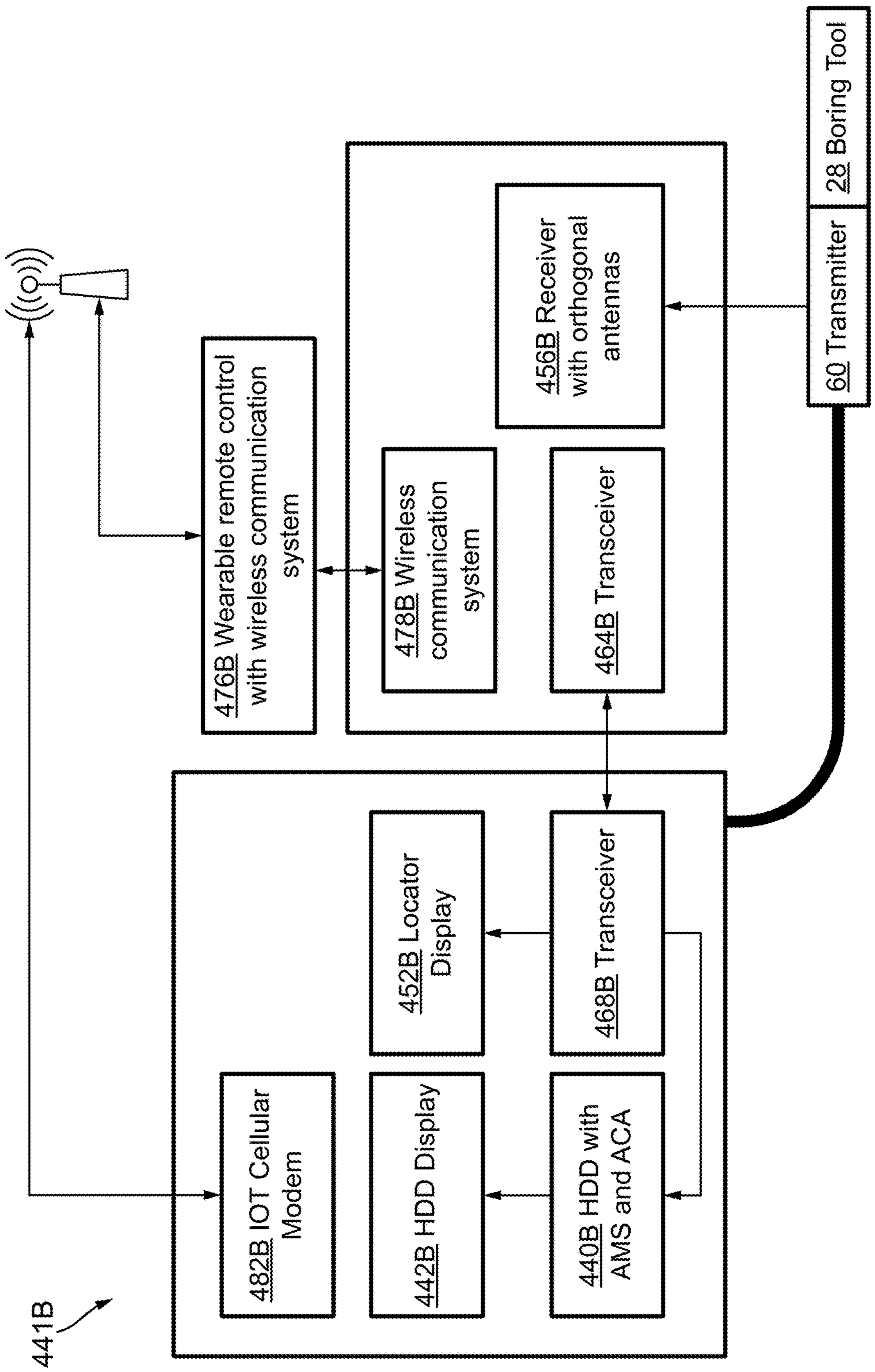
FIG. 43 is yet another schematic of the system architecture of the horizontal directional drilling control system of FIG. 40 according to an embodiment of the disclosure.

FIG. 43 illustrates a control system 441B. The control system 441B is similar to the control system 441 (FIG. 41), but the control system 441B includes a cellular modem 482B. Many of the features of the control system 441B are similar to the control system 441. Accordingly, the preceding description and drawings are relied upon for a disclosure of the features that might not be described in detail here.

The control system 441B includes all of the features of the control system 441 and includes a cellular modem 482B.

The remote device 476B is a cellular phone or tablet with 5-G capabilities. The drill display 442B and the controller 440B can communicate with the remote device 476B wirelessly (e.g., though Wi-Fi or Bluetooth) or through the cellular modem 482B. Communicating through the cellular modem 482B is beneficial when the locator tool 452B is far from the drilling machine 10.

Figure 44:
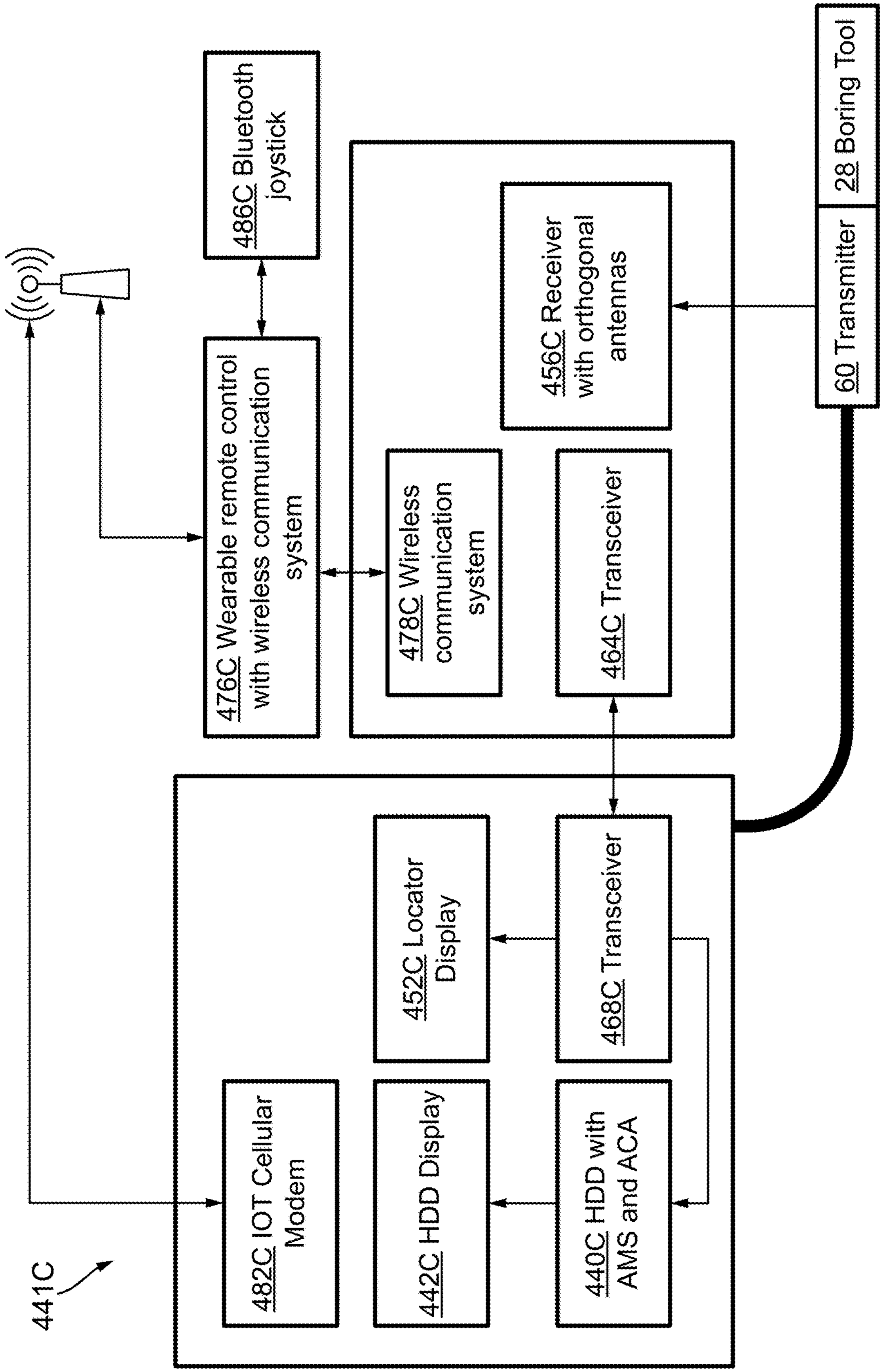
FIG. 44 is still another schematic of the system architecture of the horizontal directional drilling control system of FIG. 40 according to an embodiment of the disclosure.

FIG. 44 illustrates a control system 441C. The control system 441C is similar to the control system 441 (FIG. 41), but the control system 441C includes a wireless joystick 486C. Many of the features of the control system 441C are similar to the control system 441. Accordingly, the preceding description and drawings are relied upon for a disclosure of the features that might not be described in detail here.

The control system 441C includes all the features of the control system 441B and a wireless joystick 486C. The wireless joystick 486C is similar to the wireless joystick 286B. Accordingly, the wireless joystick 486C will not be discussed in detail here.

Figure 45:
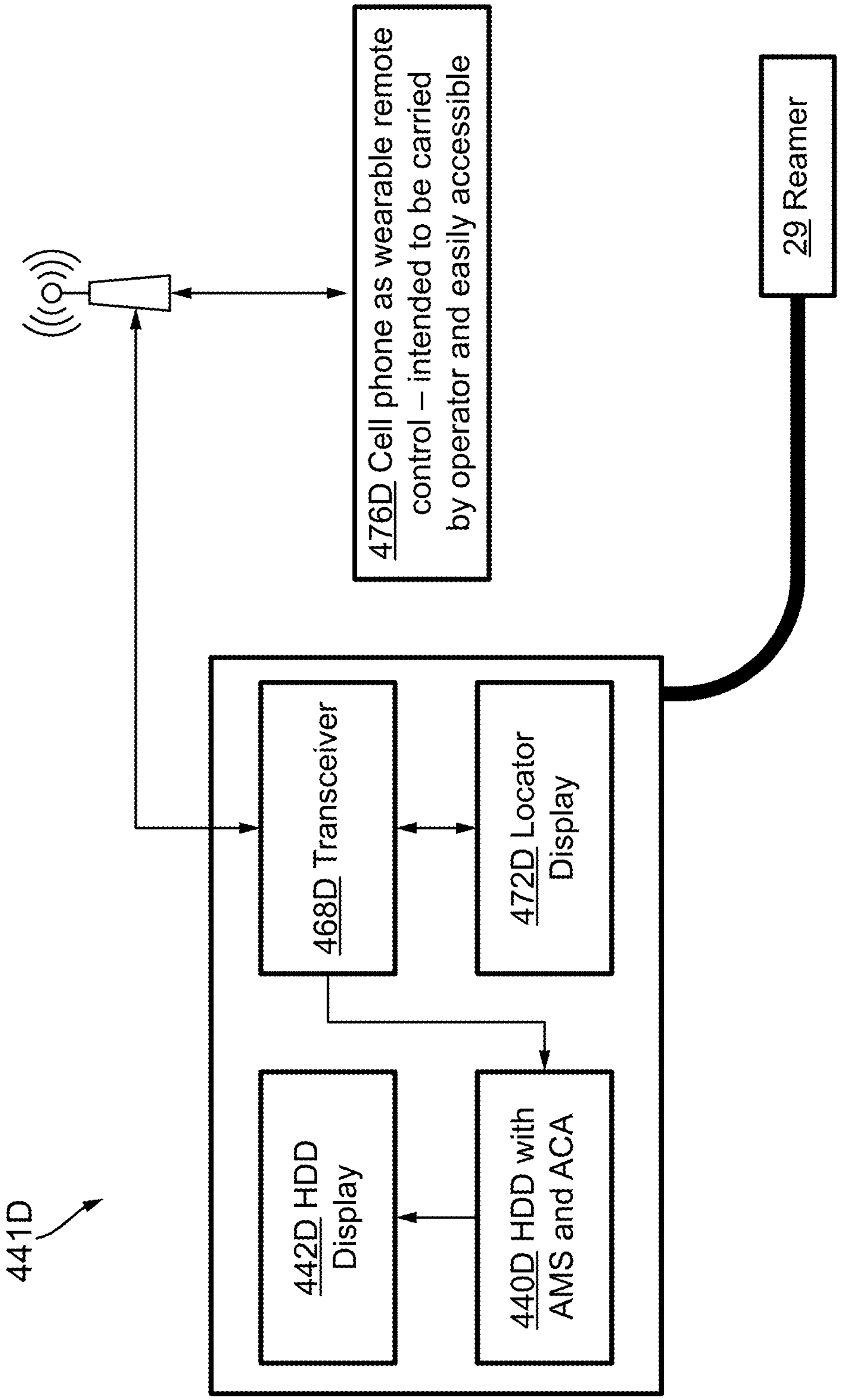
FIG. 45 is a schematic of the system architecture of a horizontal directional drilling control system according to an embodiment of the disclosure for using during backreaming.

FIG. 45 illustrates a control system 441D that is used during the backreaming process. The control system includes a drill display 442D connected to the controller 440D of the drilling machine, a locator display 472D, a transceiver 468D which allows the controller 440D to communicate with the locator display 472D, and a remote device 476D. The remote device 476D is a cell phone that communicates with transceiver 468D via a 5-G network. The remote device 476D can be used to initiate a remote lockout without the use of an additional, separate lockout control device.

Figure 46:
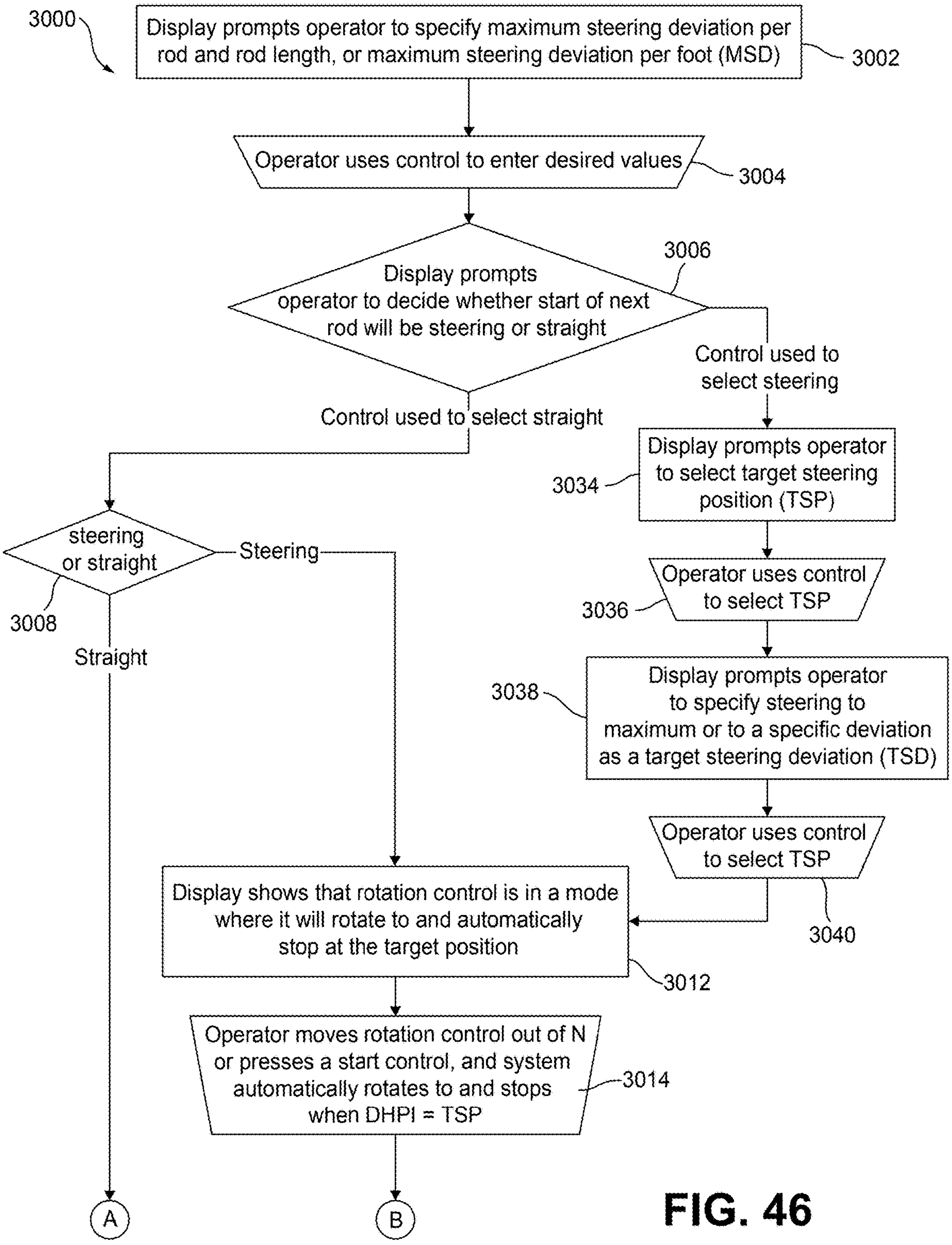
FIG. 46 is a flow chart illustrating a method to adjust the pitch of the drilling head.
Figure 46:
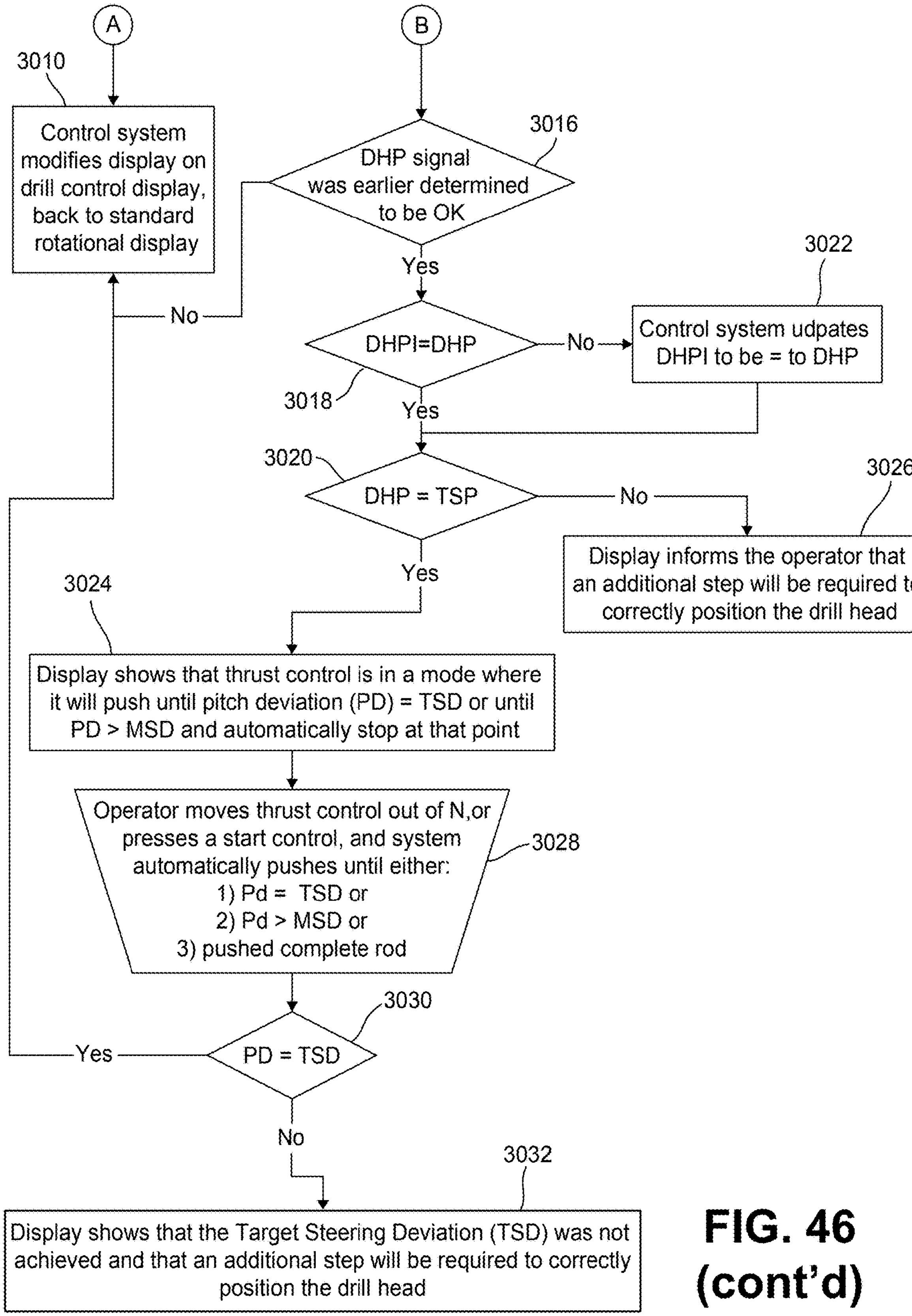

FIG. 46 illustrates a method 3000. The method 3000 is an automated system for changing the pitch of the drill head 28. The method 3000 allows for the remote operator to change the pitch without having to have their sole focus being on the drill display. During the method 3000, operator may be prompted to decide between maximum steering or to steer to a specific deviation. At the start of a project an operator could be prompted to specify a maximum steering rate. This could be defined by a maximum steering deviation per rod. The length of the rods varies, such as ten feet, or fifteen feet, or up to thirty feet. The system could prompt the operator to specify a rod length, and automatically calculate a maximum steering deviation per foot. The operator could alternatively directly enter maximum steering deviation per foot. The method 3000 can be used with any of the control systems discussed above.

The method 3000 is initiated when the display (e.g., the drill display 42 or the remote display 277) prompts the operator to specify the maximum steering deviation (MSD) per rod length or the maximum steering deviation per foot (STEP 3002). At STEP 3004, the operator uses the control (e.g., the VDC 48 or the control 275) to enter the desired MSD values.

The display then prompts the operator to decide whether the start of the next rod will be steering or straight (STEP 3006). If the operator uses the control to select "straight," the drilling machine 10 enters the straight mode (STEP 3008) and the control system (e.g., the controller 40) modifies the display back to the standard rotational display (STEP 3010). The method 3000 is complete and the drilling machine 10 returns to a normal drilling operation.

If the operator uses the control to select "steering," the display prompts the operator to select the Target Steering Position (TSP) (STEP 3034) and the operator uses the control to select the TSP (STEP 3036).

At STEP 3038, the display prompts the operator to specify if they are steering to a maximum or if they are steering to a specific deviation as a target steering deviation (TSD). The operator uses the control to select either the maximum or the TSD (STEP 3040).

At STEP 3012, the display shows that the drilling machine controller is in the rotation control mode and that it will rotate to the target position and automatically stop at the target position. The operator moves the control out of the neutral position (N) to start the automatic rotation system (STEP 3014). The automatic rotation system stops when DHPI matches the TSP.

At STEP 3016, the controller reconfirms that the operator has previously approved the signal of the transmitter 60. If the signal has not been approved, STEP 3010 is initiated such that the steering method 3000 can be restarted. If the signal has been approved, STEP 3018 is initiated.

At STEP 3018, the operator confirms that the DHPI matches the DHP. If the DHPI does not match the DHP the operator can use the control to move the DHPI to match the DHP (STEP 3022).

Once the DHPI matches the DHP, the operator confirms that the DHPI matches the TSP (STEP 3020). If the DHPI matches the TSP, a display shows that the thrust control is in a mode where it will push until the pitch deviation (PD) is the same as the TSD or until the PD is greater than the MSD (STEP 3024). If the DHPI does not match the TSP, a prompt is displayed to the operator that additional steps are required to position the drill head 28 (STEP 3026).

At STEP 3028, the operator moves the thrust control (e.g., the second joystick 46) out of neutral (N) or presses a start control and the system automatically pushes (STEP 3028). The system pushes until 1) PD is the same as TSD; 2) PD is greater than MSD; or 3) the push is complete. If the maximum steering is selected, the pushing would stop if the PD exceeded the MSD. If the maximum is 10% per rod, that would convert to 1% per foot. It is possible that after the first foot, the system could observe a steering rate of more than 1%, and it could stop after pushing 1 foot. If a targeted steering is selected, the pushing would stop when the PD is the same as the TSD. If an operator selected a 5% steering correction for a rod, in the same scenario as above, if the pitch changes more than 1% in the first foot (which exceeds the max steering rate of 1%/foot) the system may automatically stop.

At STEP 3030, the PD and the TSD are compared. If the PD and the TSD match STEP 3010 is initiated. If the PD and the TSD do not match, then a display is shown that the TSD was not achieved and that additional steps will be required to position the drill (STEP 3032).

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

Various features and advantages of the invention are set forth in the following claims.

What is claimed is:

1. A control system for a horizontal directional drill comprising:

a user interface having a first display and a second display;

a locator tool configured to measure a rotational position of a drill head of the horizontal directional drill; and a controller configured to determine an estimated rotational position of the drill head, wherein the first display is in communication with the locator tool and displays information about the measured rotational position of the drill head, wherein the second display is in communication with the controller and displays information about the estimated rotational position of the drill head, wherein the control system further includes means for calibrating the estimated rotational position of the drill head to substantially match the measured rotational position of the drill head.

2. The control system according to claim 1, wherein the means for calibrating includes the controller determining if the estimated rotational position of the drill head substantially matches the measured rotational position of the drill head.

3. The control system according to claim 1, wherein the means for calibrating includes the controller updating the estimated rotational position of the drill head to substantially match the measured rotational position of the drill head.

4. The control system according to claim 1, wherein the means for calibrating includes determining if the estimated rotational position of the drill head substantially matches the measured rotational position of the drill head with an input device on the horizontal directional drill.

5. The control system according to claim 1, wherein the means for calibrating includes updating the estimated rotational position of the drill head to substantially match the measured rotational position of the drill head with an input device on the horizontal directional drill.

6. The control system according to claim 1, wherein the means for calibrating includes determining if the estimated rotational position of the drill head substantially matches the measured rotational position of the drill head with an input device remote from the horizontal directional drill.

7. The control system according to claim 1, wherein the means for calibrating includes updating the estimated rotational position of the drill head to substantially match the measured rotational position of the drill head with an input device remote from the horizontal directional drill.

8. The control system according to claim 1, wherein the user interface includes an input device configured to allow interaction with the second display.

9. The control system according to claim 1, wherein a transceiver is configured to provide communication between the controller and the locator tool.

10. The control system according to claim 1, further comprising a remote device in communication with the controller.

11. The control system according to claim 10, wherein the remote device includes the second display and an input device.

12. The control system according to claim 10, wherein the remote device is a wearable device.

13. The control system according to claim 10, wherein the remote device is configured to wirelessly communicate with the controller via a wireless communication system.

14. The control system according to claim 10, wherein the remote device is a cellular device and is configured to communicate with the controller via a cellular modem.

15. The control system according to claim 10, further comprising a remote joystick that is configured to interact with the remote device.

16. The control system according to claim 1, further comprising a lockout control in communication with the controller, the lockout control configured to initiate a command to shut off the horizontal directional drill.

17. The control system according to claim 1, wherein the controller is further configured to simultaneously perform an automated rod addition sequence.

18. The control system according to claim 1, wherein the control system further includes means for steering the drill head to a target steering position when the estimated rotational position of the drill head matches the measured position of the drill head.

19. The control system according to claim 18, wherein the means for steering the drill head to a target steering position includes setting the target steering position using an input device on the horizontal directional drill.

20. The control system according to claim 18, wherein the means for steering the drill head to the target steering position includes setting the target steering position using an input device remote from the horizontal directional drill.

21. The control system according to claim 18, wherein the means for steering the drill head to the target steering position includes the controller of the horizontal directional drill rotating an output spindle of the horizontal directional drill until the estimated drill head position matches the target steering position.

22. The control system according to claim 1, wherein the control system further includes a means for pushing the drill head a target distance.

23. The control system according to claim 22, wherein the means for pushing the drill head to the target distance includes the controller managing a thrust mechanism of the horizontal directional drill to move the drill head the target distance.

24. The control system according to claim 22, wherein the means for pushing the drill head to the target distance includes setting a target distance using an input device on the horizontal directional drill.

25. The control system according to claim 22, wherein the means for pushing the drill head to the target distance includes setting a target distance using an input device remote from the horizontal directional drill.

* * * * *